(12) United States Patent
Takefumi

(10) Patent No.: US 9,930,352 B2
(45) Date of Patent: Mar. 27, 2018

(54) REDUCING NOISE IN AN INTRAFRAME APPEARANCE CYCLE

(71) Applicant: SONY CORPORATION, Tokyo (JP)

(72) Inventor: Nagumo Takefumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 138 days.

(21) Appl. No.: 14/646,458

(22) PCT Filed: Nov. 29, 2013

(86) PCT No.: PCT/JP2013/082132
§ 371 (c)(1),
(2) Date: May 21, 2015

(87) PCT Pub. No.: WO2014/091943
PCT Pub. Date: Jun. 19, 2014

(65) Prior Publication Data
US 2015/0304672 A1    Oct. 22, 2015

(30) Foreign Application Priority Data

Dec. 14, 2012  (JP) .................................. 2012-273082
Jul. 4, 2013   (JP) .................................. 2013-140859

(51) Int. Cl.
*H04N 19/60*   (2014.01)
*H04N 19/86*   (2014.01)
(Continued)

(52) U.S. Cl.
CPC ........... *H04N 19/44* (2014.11); *H04N 19/117* (2014.11); *H04N 19/159* (2014.11);
(Continued)

(58) Field of Classification Search
None
See application file for complete search history.

(56) References Cited

U.S. PATENT DOCUMENTS 6,546,139 B1 *  4/2003  Kondo ................... H04N 19/00
                                              235/375
6,738,492 B1 *  5/2004  Kondo ................. H04N 19/467
                                              375/E7.089
(Continued)

FOREIGN PATENT DOCUMENTS

JP    2001-224031 A    8/2001
JP       4321626 B     6/2009
(Continued)

OTHER PUBLICATIONS

Chono et al., "Description of video coding technology proposal by NEC Corporation", Joint Collaboration Team on video Coding (JCT-VC) of ITU-U SG16 WP3 and ISO/IEC JTC1/SC29/WG11, Document: JCTVC-A104, Apr. 2010, p. 1-18.*

(Continued)

*Primary Examiner* — Reza Aghevli
(74) *Attorney, Agent, or Firm* — Chip Law Group

(57) ABSTRACT

The present disclosure relates to image processing devices and methods image processing devices and methods that can reduce noise that is recognized in synchronization with an intraframe appearance cycle.

At time t0, the respective pixels are copied from the image that is output at the previous time, and only the pixels denoted by Δ among the pixels in a replacement pattern are replaced. At time t1, the respective pixels are copied from the image that is output at the previous time t0, and only the pixels denoted by X among the pixels in the replacement pattern are replaced. At this point, all the pixels in the image have been replaced with a decoded image. That is, by time t1, which is one time before the time when the decoded image is an intraframe, all the pixels in the image are replaced with the decoded image. The present disclosure can be applied to image processing devices, for example.

9 Claims, 40 Drawing Sheets

(51) Int. Cl.
  H04N 19/50     (2014.01)
  H04N 19/51     (2014.01)
  H04N 19/177    (2014.01)
  H04N 19/124    (2014.01)
  H04N 19/44     (2014.01)
  H04N 19/159    (2014.01)
  H04N 19/117    (2014.01)
  H04N 19/182    (2014.01)

(52) U.S. Cl.
  CPC ......... *H04N 19/177* (2014.11); *H04N 19/182* (2014.11); *H04N 19/50* (2014.11); *H04N 19/51* (2014.11); *H04N 19/60* (2014.11); *H04N 19/86* (2014.11); *H04N 19/124* (2014.11)

(56) References Cited

U.S. PATENT DOCUMENTS

| | | | | |
|---|---|---|---|---|
| 6,804,372 | B1* | 10/2004 | Kondo | G06T 1/0028 382/100 |
| 6,965,697 | B1* | 11/2005 | Kondo | G06T 1/0028 375/E7.255 |
| 2004/0037361 | A1* | 2/2004 | Gudis | H04N 19/61 375/240.27 |
| 2006/0092475 | A1* | 5/2006 | Kaburagi | H04N 1/4092 358/3.27 |
| 2007/0058866 | A1* | 3/2007 | Boyce | H04N 5/262 382/181 |
| 2009/0285479 | A1* | 11/2009 | Hosaki | H04N 1/64 382/166 |

FOREIGN PATENT DOCUMENTS

| | | |
|---|---|---|
| WO | 2005/020585 A  | 3/2005 |
| WO | 2005/020585 A1 | 3/2005 |
| WO | 2005/032142 A  | 4/2005 |
| WO | 2005/032142 A1 | 4/2005 |
| WO | 2005/039188 A  | 4/2005 |
| WO | 2005/039188 A1 | 4/2005 |

OTHER PUBLICATIONS

Keiichi Chono et al., "Description of Video Coding Technology Proposal by NEC Corporation", Joint Collaborative Team on Video Coding (JCT-VC) of ITU-T SG16 WP3 and ISO/IEC JTC1/SC29/WG11, Apr. 15-23, 2010, pp. 19, Document: JCTVC-A104, 1st Meeting, Dresden, DE.

Greg Conklin et al., "Dithering 5-Tap Filter for Inloop Deblocking", Joint Video Team (JVT) of ISO/IEC MPEG & ITU-T VCEG (ISO/IEC JTC1/SC29/WG11 and ITU-T SG16 Q.6), May 6-10, 2002, p. 1-13, Document: JVT-C056, 3rd Meeting: Fairfax, Virginia, USA.

Office Action for JP Patent Application No. 2014-551974, dated Jul. 6, 2017, 05 pages of Office Action and 4 pages of English Translation.

Chono, et al., "Description of Video Coding Technology Proposal by NEC Corporation", Information and Media Processing Laboratories, NEC Corporation, ITU-T SG16WP3 and ISO/IEC JTC/SC29/WG11, Apr. 15-23, 2010.

Conklin, et al., "Dithering 5-tap Filter for Inloop Deblocking", Real Networks Inc, ISO/IEC JTC1/SC29/WG11 and ITU-T SG16 Q.6, May 6-10, 2002.

Office Action for CN Patent Application No. 201380063708.5, dated Oct. 18, 2017, 9 pages of Office Action and 7 pages of English Translation.

Chono, et al., "Description of Video Coding Technology Proposal by NEC Corporation", Joint Collaborative Team on Video Coding (JCT-VC) of ITU-T SG16 WP3 and ISO/IEC JTC1/SC29/WG11, 1st Meeting: Dresden, DE, Apr. 15-23, 2010, 57 pages.

Office Action for JP Patent Application No. 2014-551974, dated Sep. 26, 2017, 7 pages of Office Action and 4 pages of English Translation.

Chono, et al., "Description of Video Coding Technology Proposal by NEC Corporation", Joint Collaborative Team on Video Coding (JCT-VC) of ITU-TSG16 WP3 and ISO/IEC JTC/SC29/WG11, 1st Meeting: Dresden, DE, Apr. 15-23, 2010, 19 pages.

* cited by examiner

FIG. 24

| IMAGE FEATURE QUANTITY | ENCODING PARAMETERS | | | QUANTIZATION VALUE AFTER ADJUSTMENT (QP BEING INPUT) |
|---|---|---|---|---|
| | MB Type | Motion vector | Coded Block Pattern | |
| STATIONARY | Intra | — | — | QP/2 |
| STATIONARY | Inter | ZERO VECTOR | NO COEFFICIENT TRANSMITTED | QP |
| STATIONARY | Inter | NON-ZERO VECTOR | NO COEFFICIENT TRANSMITTED | QP |
| STATIONARY | Inter | NON-ZERO VECTOR | COEFFICIENT TRANSMITTED | QP/2 |
| VICINITY OF MOVING OBJECT BOUNDARY | Intra | — | — | 0 |
| VICINITY OF MOVING OBJECT BOUNDARY | Inter | ZERO VECTOR | NO COEFFICIENT TRANSMITTED | QP |
| VICINITY OF MOVING OBJECT BOUNDARY | Inter | NON-ZERO VECTOR | NO COEFFICIENT TRANSMITTED | QP/2 |
| VICINITY OF MOVING OBJECT BOUNDARY | Inter | NON-ZERO VECTOR | COEFFICIENT TRANSMITTED | QP/4 |
| MOVING OBJECT | Intra | — | — | 0 |
| MOVING OBJECT | Inter | ZERO VECTOR | NO COEFFICIENT TRANSMITTED | QP/2 |
| MOVING OBJECT | Inter | NON-ZERO VECTOR | NO COEFFICIENT TRANSMITTED | QP/4 |
| MOVING OBJECT | Inter | NON-ZERO VECTOR | COEFFICIENT TRANSMITTED | 0 |

REDUCING NOISE IN AN INTRAFRAME APPEARANCE CYCLE

TECHNICAL FIELD

The present disclosure relates to image processing devices and methods, and more particularly, to image processing devices and methods that can reduce noise that is recognized in synchronization with an intraframe appearance cycle.

BACKGROUND ART

Moving image encoding normally involves intraframes for intra-frame encoding, and interframes for inter-frame prediction. Intraframes are normally set every 0.5 to several seconds, and the remaining frames are encoded as interframes. When an interframe is encoded, an intraframe or another interframe is used as a reference destination in inter-frame prediction.

Cyclic noise is sometimes caused by such moving image encoding, and the noise is normally called heartbeat noise. Heartbeat noise is noise that is recognized in synchronization with the intraframe appearance cycle, and, because of the heartbeat noise, an image appears to be changing in a constant cycle. Heartbeat noise tends to be generated more often at locations where there are few moving objects, there is little panning of a camera or the like, and inter-frame prediction is valid in interframes.

For example, after an intraframe appears in the first cycle, encoding that does not involve transmission of DCT coefficients, or skipping, is employed with inter-frame prediction. As for the intraframe that appears in the next cycle, encoding that does not involve transmission of DCT coefficients, or skipping, is also employed with inter-frame prediction.

In a case where images subjected to such encoding are viewed, a visual gap is sometimes felt between an interframe predicted image group 1 after the intraframe that appears in the first cycle and an inter-frame predicted image group 2 after the intraframe that appears in the next cycle. The subjective image degradation due to this gap is the heartbeat noise described herein.

As a technique for reducing this heartbeat noise, there is a technique for reducing the above described visual gap between the predicted image group 1 and the predicted image group 2 with a smoothing filter. For example, the technique disclosed in Patent Document 1 is a method of removing grain noise that overlaps images captured by a camera or the like, and this method can also be used on heartbeat noise.

CITATION LIST

Patent Document

Patent Document 1: JP 4321626 B1

SUMMARY OF THE INVENTION

Problems to be Solved by the Invention

However, when such a temporal-direction smoothing filter is used, the pixel value variation draws the curve shown in FIG. 1, resulting in a visual gap.

FIG. 1 is a diagram showing an example case where the technique disclosed in Patent Document 1 is applied between the predicted image group 1 and the predicted image group 2. The example in FIG. 1 shows that, by the technique disclosed in Patent Document 1, input data indicated by the dashed line can be converted into pixel values indicated by the solid-line, which have been subjected to smoothing in a temporal direction.

The feedback coefficient of the temporal-direction smoothing filter can be made larger to further smooth the variation in the temporal direction. However, the subject region appears as if stationary. When the subject region is viewed as a moving image, a feeling of strangeness that would be felt when still images are successively displayed is caused. Therefore, the process involving the simple smoothing in the temporal direction is not suited to reduction of heartbeat noise.

The present disclosure is made in view of those circumstances, and aims to reduce noise that is recognized in synchronization with the intraframe appearance cycle.

Solutions to Problems

An image processing device of a first aspect of the present disclosure includes: a decoding unit that generates an image by performing a decoding process on a bit stream; and a replacement unit that replaces pixels of the image generated by the decoding unit, using a replacement pattern indicating a pixel value variation distribution.

The replacement pattern is randomly generated.

The cycle of the replacement pattern is determined based on an intraframe appearance cycle.

The image processing device may further include a coefficient limitation unit that performs a clipping process on a coefficient obtained through frequency transform performed on the image having pixels replaced by the replacement unit, using a coefficient obtained through frequency transform performed on the image generated by the decoding unit and a quantization parameter obtained from the bit stream, the coefficient limitation unit reconstructing an image from the coefficient subjected to the clipping process.

The image processing device may further include a noise addition unit that adds noise to the image having pixels replaced by the replacement unit, wherein the coefficient limitation unit performs the clipping process on a coefficient obtained through frequency transform performed on the image having the noise added thereto by the noise addition unit, using the coefficient obtained through the frequency transform performed on the image generated by the decoding unit and the quantization parameter obtained from the bit stream.

The image processing device may further include: a feature quantity detection unit that detects a feature quantity from the image generated by the decoding unit; and a parameter adjustment unit that adjusts the value of the quantization parameter obtained from the bit stream, using the feature quantity detected by the feature quantity detection unit and an encoding parameter obtained from the bit stream, wherein the coefficient limitation unit performs the clipping process on the coefficient obtained through the frequency transform performed on the image having pixels replaced by the replacement unit, using the coefficient obtained through the frequency transform performed on the image generated by the decoding unit and the quantization parameter having the value adjusted by the parameter adjustment unit, the coefficient limitation unit reconstructing an image from the coefficient subjected to the clipping process.

The image processing device may further include a parameter adjustment unit that adjusts the value of the quantization parameter obtained from the bit stream, in accordance with a user operation, wherein the coefficient limitation unit performs the clipping process on the coefficient obtained through the frequency transform performed on the image having pixels replaced by the replacement unit, using the coefficient obtained through the frequency transform performed on the image generated by the decoding unit and the quantization parameter having the value adjusted by the parameter adjustment unit, the coefficient limitation unit reconstructing an image from the coefficient subjected to the clipping process.

The image processing device may further include a storage unit that stores a previous frame image reconstructed by the coefficient limitation unit, wherein the replacement unit replaces pixels of the previous frame image stored in the storage unit with pixels of the image generated by the decoding unit, using the replacement pattern.

The image processing device may further include: a band separation unit that separates the image generated by the decoding unit into a low-frequency image and a high-frequency image; and a band integration unit that integrates the low-frequency image and the high-frequency image separated by the band separation unit, wherein the storage unit stores a previous frame low-frequency image reconstructed by the coefficient limitation unit, the replacement unit replaces pixels of the previous frame low-frequency image stored in the storage unit with pixels of the low-frequency image separated by the band separation unit, using the replacement pattern, the clipping process is performed on a coefficient obtained through frequency transform performed on the low-frequency image having pixels replaced by the replacement unit, using a coefficient obtained through frequency transform performed on the low-frequency image separated by the band separation unit and the quantization parameter obtained from the bit stream, and the low-frequency image being reconstructed from the coefficient subjected to the clipping process, and the band integration unit integrates the low-frequency image reconstructed by the coefficient limitation unit and the high-frequency image.

The image processing device may further include a flat portion processing unit that performs a smoothing process on a flat portion in the image integrated by the band integration unit.

The image processing device may further include a replacement pattern generation unit that generates the replacement pattern, wherein the replacement unit replaces pixels of the image generated by the decoding unit, using the replacement pattern generated by the replacement pattern generation unit.

The image processing device may further include a reception unit that receives the bit stream and the replacement pattern, wherein the decoding unit generates an image by performing the decoding process on the bit stream received by the reception unit, and the replacement unit replaces pixels of the image generated by the decoding unit, using the replacement pattern received by the reception unit.

An image processing method of the first aspect of the present disclosure is implemented in an image processing device, and includes: generating an image by performing a decoding process on a bit stream; and replacing pixels of the generated image, using a replacement pattern indicating a pixel value variation distribution.

An image processing device of a second aspect of the present disclosure includes: a setting unit that sets a replacement pattern indicating a pixel value variation distribution, the replacement pattern being to be used in replacing pixels of an image generated through a decoding process performed on a bit stream; an encoding unit that generates the bit stream by performing an encoding process on an image; and a transmission unit that transmits the bit stream generated by the encoding unit and the replacement pattern set by the setting unit.

An image processing method of the second aspect of the present disclosure is implemented in an image processing device, and includes: setting a replacement pattern indicating a pixel value variation distribution, the replacement pattern being to be used in replacing pixels of an image generated through a decoding process performed on a bit stream; generating the bit stream by performing an encoding process on an image; and transmitting the generated bit stream and the set replacement pattern.

In the first aspect of the present disclosure, a decoding process is performed on a bit stream, and an image is generated. In the generated image, pixels are replaced with the use of a replacement pattern indicating a pixel value variation distribution.

In the second aspect of the present disclosure, a replacement pattern that indicates a pixel value variation distribution and is to be used in replacement in an image obtained through a decoding process performed on a bit stream is set, and an encoding process is performed on an image, to generate the bit stream. The generated bit stream and the set replacement pattern are then transmitted.

Each of the above described image processing devices may be an independent device, or may be an internal block in an image encoding device or an image decoding device.

Effects of the Invention

According to the first aspect of the present disclosure, images can be decoded. Particularly, noise that is recognized in synchronization with an intraframe appearance cycle can be reduced.

According to the second aspect of the present disclosure, images can be encoded. Particularly, noise that is recognized in synchronization with an intraframe appearance cycle can be reduced.

BRIEF DESCRIPTION OF DRAWINGS

FIG. 24 is a diagram for explaining a method of adjusting a quantization value.

MODES FOR CARRYING OUT THE INVENTION

Modes for carrying out the present disclosure (hereinafter referred to as the embodiments) will be described below. Explanation will be made in the following order.
1. First Embodiment (Example Fundamental Structure of a Decoding Device)
2. Second Embodiment (Example Application Structure 1 of a Decoding Device)
3. Third Embodiment (Example Structure of Pattern Setting on the Encoding Side)
4. Fourth Embodiment (Example Structure of a Device of the AVC type)
5. Fifth Embodiment (Example Application Structure 2 of a Decoding Device)
6. Sixth Embodiment (Computer)

First Embodiment

[Example Structure of a Decoding Device]

Figure 1:
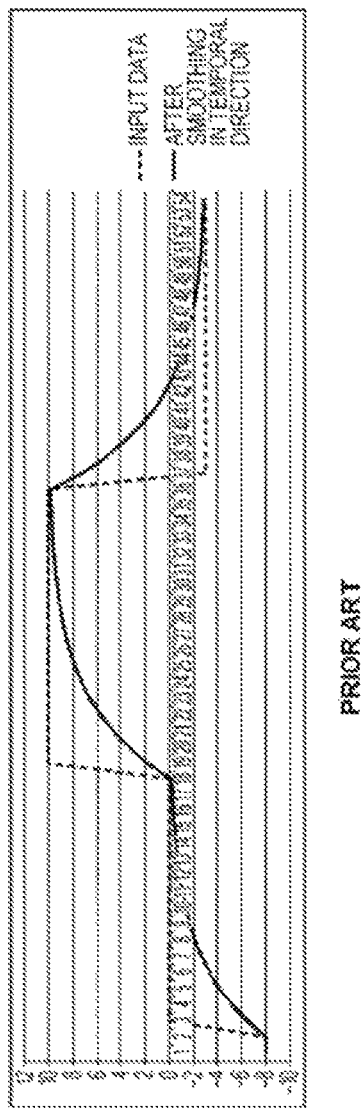
FIG. 1 is a diagram for explaining a conventional technique.
Figure 2:
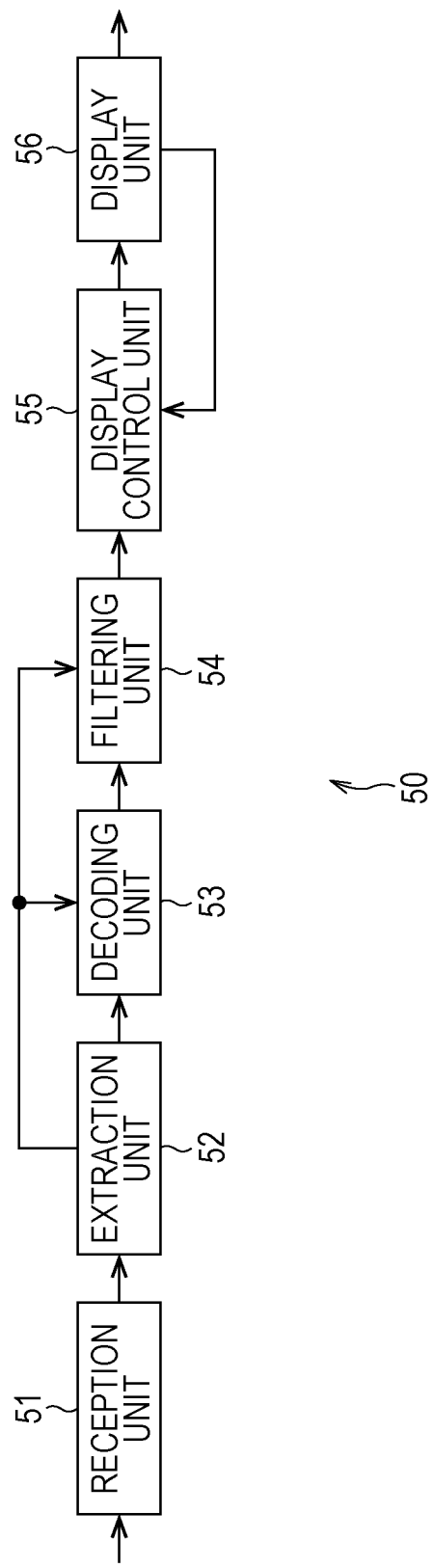
FIG. 2 is a block diagram showing an example structure of a decoding device to which the present technique is applied.

FIG. 2 is a block diagram showing an example structure of a decoding device as an image processing device to which the present technique is applied.

The decoding device 50 in FIG. 2 includes a reception unit 51, an extraction unit 52, a decoding unit 53, a filtering unit 54, a display control unit 55, and a display unit 56.

The reception unit 51 of the decoding device 50 receives an encoded stream transmitted from an encoding device (not shown), and supplies the encoded stream to the extraction unit 52. From the encoded stream supplied from the reception unit 51, the extraction unit 52 extracts an SPS (Sequence Parameter Set), a PPS (Picture Parameter Set), VUI (Video Usability Information) indicating the characteristics (usability) of the image corresponding to encoded data in each sequence, SEI (Supplemental Enhancement Information), encoded data, and the like. The extraction unit 52 supplies the encoded data to the decoding unit 53. The extraction unit 52 also supplies the SPS, the PPS, the VUI, the SEI, and the like to the decoding unit 53 and the filtering unit 54 as necessary. The SPS, the PPS, the VUI, the SEI, and the like may be decoded at the extraction unit 52 as necessary.

The decoding unit 53 refers to the SPS, the PPS, the VUI, the SEI, and the like supplied from the extraction unit 52 as necessary, and decodes the encoded data supplied from the extraction unit 52 by the HEVC method. The decoding unit 53 supplies the decoded image, which is obtained as a result of the decoding, as an output signal to the filtering unit 54. The decoding unit 53 also supplies the encoding parameter obtained as a result of the decoding to the filtering unit 54.

Based on the SPS, the PPS, the VUI, and the SEI supplied from the extraction unit 52, the encoding parameter from the decoding unit 53, and the like, the filtering unit 54 performs filtering on the decoded image supplied from the decoding unit 53, to replace pixels using a replacement pattern indicating a pixel value variation distribution. The filtering unit 54 supplies the image, which has been subjected to the filtering, to the display control unit 55.

The display control unit 55 generates a display image based on the image supplied from the filtering unit (or by a display method designated by the display unit 56 as necessary). The display control unit 55 supplies the generated display image to the display unit 56, to cause the display unit 56 to display the display image.

The display unit 56 displays the display image supplied from the display control unit 55. The display unit 56 notifies the display control unit 55 of a display method that has been set beforehand, or a display method designated by a user among display methods that have been set beforehand.

[Example Structure of the Decoding Unit]

Figure 3:
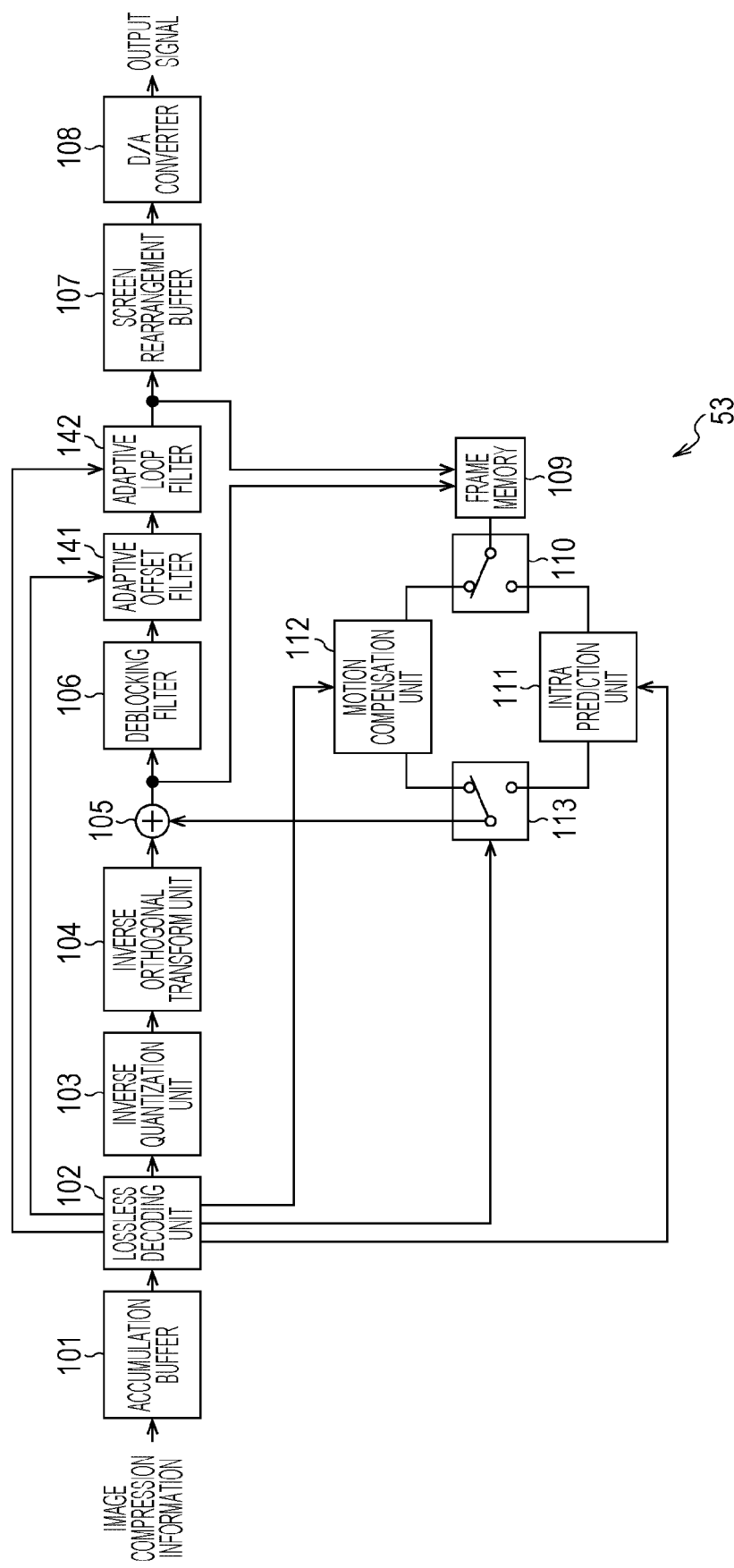
FIG. 3 is a block diagram showing an example structure of the decoding unit.

FIG. 3 is a block diagram showing an example structure of the decoding unit 53 shown in FIG. 2. The decoding unit 53 refers to the SPS, the PPS, the VUI, and the SEI supplied from the extraction unit 52 as necessary, and decodes the encoded data supplied from the extraction unit 52 by the HEVC method.

The decoding unit 53 shown in FIG. 3 includes an accumulation buffer 101, a lossless decoding unit 102, an inverse quantization unit 103, an inverse orthogonal transform unit 104, an addition unit 105, a deblocking filter 106, a screen rearrangement buffer 107, a D/A converter 108, a frame memory 109, a switch 110, an intra prediction unit 111, a motion compensation unit 112, and a switch 113.

An adaptive offset filter 141 and an adaptive loop filter 142 are also provided between the deblocking filter 106, and the screen rearrangement buffer 107 and the frame memory 109.

The accumulation buffer 101 of the decoding unit 53 receives and accumulates encoded from the extraction unit 52 shown in FIG. 2. The accumulation buffer 101 supplies the accumulated encoded data to the lossless decoding unit 102.

The lossless decoding unit 102 obtains quantized coefficients and the encoding parameters used in encoding by performing lossless decoding such as variable-length decoding or arithmetic decoding on the encoded data supplied from the accumulation buffer 101. The lossless decoding unit 102 supplies the quantized coefficients to the inverse quantization unit 103. The lossless decoding unit 102 also supplies the intra prediction unit 111 with intra prediction mode information as an encoding parameter and the like, and supplies the motion compensation unit 112 with a motion vector, information for identifying a reference image, inter prediction mode information, and the like. The lossless decoding unit 102 further supplies the switch 113 with the intra prediction mode information or the inter prediction mode information as an encoding parameter.

The lossless decoding unit 102 supplies offset filter information as an encoding parameter to the adaptive offset filter 141, and supplies a filter coefficient to the adaptive loop filter 142. This encoding parameter is also supplied to the filtering unit 54 in a later stage.

The inverse quantization unit 103, the inverse orthogonal transform unit 104, the addition unit 105, the deblocking filter 106, the frame memory 109, the switch 110, the intra prediction unit 111, and the motion compensation unit 112 decode the quantized coefficients supplied form the lossless decoding unit 102, to generate an image.

Specifically, the inverse quantization unit 103 inversely quantizes the quantized coefficients supplied from the lossless decoding unit 102, and supplies the resultant coefficients to the inverse orthogonal transform unit 104.

The inverse orthogonal transform unit 104 performs inverse orthogonal transform on the coefficients supplied from the inverse quantization unit 103, and supplies the resultant residual error information to the addition unit 105.

The addition unit 105 performs decoding by adding the residual error information supplied as the decoding target image from the inverse orthogonal transform unit 104 to a predicted image supplied from the switch 113. The addition unit 105 supplies the image obtained as a result of the decoding to the deblocking filter 106, and also supplies the image to the frame memory 109. If any predicted image is not supplied from the switch 113, the addition unit 105 supplies the deblocking filter 106 with the residual error information supplied from the inverse orthogonal transform unit 104 as the image obtained as a result of the decoding, and also supplies and stores the image into the frame memory 109.

The deblocking filter 106 performs filtering on the image supplied from the addition unit 105, to remove block distortions. The deblocking filter 106 supplies the resultant image to the adaptive offset filter 141.

The adaptive offset filter 141 includes a buffer that sequentially stores offsets supplied from the lossless decoding unit 102. The adaptive offset filter 141 also performs, for each LCU, an adaptive offset filtering process on the image subjected to the adaptive deblocking filtering process by the deblocking filter 106 based on the offset filter information supplied from the lossless decoding unit 102.

Specifically, in a case where the storage flag included in the offset filter information is "0", the adaptive offset filter 141 performs an adaptive offset filtering process of the kind indicated by type information on the image subjected to the deblocking filtering process for each LCU, using the offset included in the offset filter information.

In a case where the storage flag included in the offset filter information is "1", on the other hand, the adaptive offset filter 141 reads the offset stored at the location indicated by the index included in the offset filter information, from the image subjected to the deblocking filtering process for each LCU. Using the read offset, the adaptive offset filter 141 performs an adaptive offset filtering process of the type indicated by type information. The adaptive offset filter 141 supplies the adaptive loop filter 142 with the image subjected to the adaptive offset filtering process.

Using the filter coefficients supplied from the lossless decoding unit 102, the adaptive loop filter 142 performs, for each LCU, an adaptive loop filtering process on the image supplied from the adaptive offset filter 141. The adaptive loop filter 142 supplies the resultant image to the frame memory 109 and the screen rearrangement buffer 107.

The images accumulated in the frame memory 109 are read as reference images via the switch 110, and are supplied to the motion compensation unit 112 or the intra prediction unit 111.

The screen rearrangement buffer 107 stores the image supplied from the deblocking filter 106 frame by frame. The screen rearrangement buffer 107 rearranges the frames of the stored image in the original displaying order, instead of the encoding order, and supplies the rearranged image to the D/A converter 108.

The D/A converter 108 performs D/A conversion on the frame-based image supplied from the screen rearrangement buffer 107, and outputs an output signal to the filtering unit 54 shown in FIG. 2.

Using the reference image that has been read from the frame memory 109 via the switch 110 and has not been filtered with the deblocking filter 106, the intra prediction unit 111 performs, for each tile and each slice, an intra prediction process in the intra prediction mode indicated by the intra prediction mode information supplied from the lossless decoding unit 102. The intra prediction unit 111 supplies the resultant predicted image to the switch 113.

Based on the reference-image identification information supplied from the lossless decoding unit 102, the motion compensation unit 112 reads the reference image filtered with the deblocking filter 106 from the frame memory 109 via the switch 110 for each tile and each slice. Using the motion vector and the reference image, the motion compensation unit 112 performs a motion compensation process in the optimum inter prediction mode indicated by the inter prediction mode information. The motion compensation unit 112 supplies the resultant predicted image to the switch 113.

When the intra prediction mode information is supplied from the lossless decoding unit 102, the switch 113 supplies the predicted image supplied from the intra prediction unit 111 to the addition unit 105. When the inter prediction mode information is supplied from the lossless decoding unit 102, on the other hand, the switch 113 supplies the predicted image supplied from the motion compensation unit 112 to the addition unit 105.

[Description of Cyclic Noise]

Moving image encoding normally involves intraframes for intra-frame encoding, and interframes for inter-frame prediction. Intraframes are normally set every 0.5 to several seconds, and the remaining frames are encoded as interframes. When an interframe is encoded, an intraframe or another interframe is used as a reference destination in inter-frame prediction.

Cyclic noise is sometimes caused by such moving image encoding, and the noise is normally called heartbeat noise. Heartbeat noise is noise that is recognized in each GOP in synchronization with the intraframe appearance cycle, and, because of the heartbeat noise, an image appears to be changing in a constant cycle. Heartbeat noise tends to be generated more often when noise overlaps locations (or still images) where there are few moving objects, there is little panning of a camera or the like, and inter-frame prediction is valid in interframes.

For example, there are regions where the signal component does not vary in a temporal direction, and only the noise component varies. In the intraframe that appears in the first cycle, texture and noise are encoded. In the inter-frame prediction thereafter, the signal component does not vary in the temporal direction, and noise is crushed by compression. As a result, a copy from a reference frame is generated. In the intraframe that appears in the next cycle, texture and noise are encoded; therefore, the image looks as if it has suddenly changed. The subjective image degradation due to this visual gap is the heartbeat noise described herein.

Heartbeat noise may be generated not by an overlap of noise with a still image but by a temporal change in the quantization scale or the intra prediction mode at the time of intraframe encoding.

As a conventional technique for reducing this visual gap or heartbeat noise, a technique involving a temporal-direction smoothing filter is disclosed in Patent Document 1.

[Description of a Conventional Method]

Figure 4:
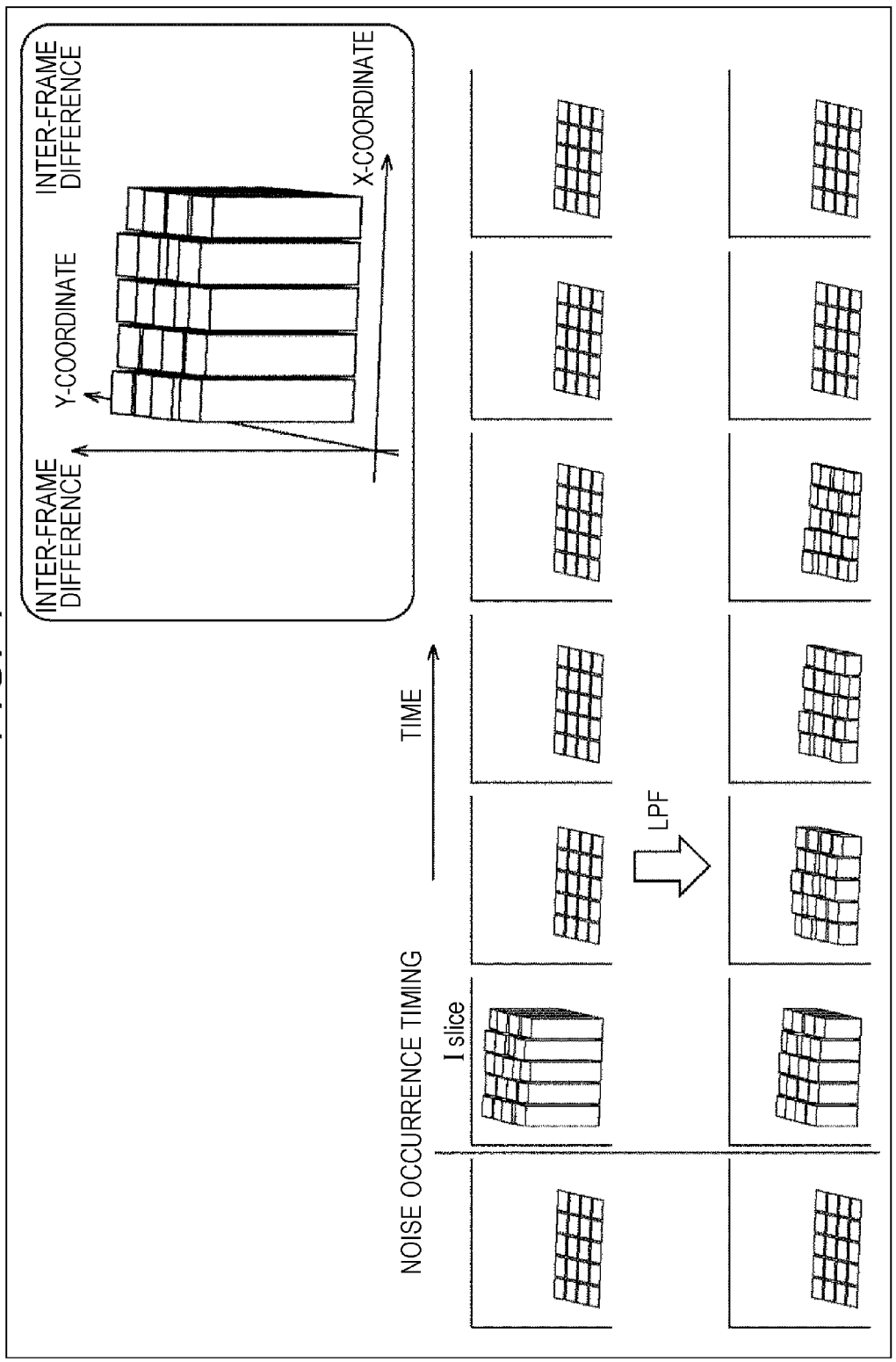
FIG. 4 is a diagram for explaining a conventional technique.

Referring now to FIG. 4, a conventional method is described.

The example in FIG. 4 shows graphs of inter-frame differences of the respective frames before and after LPF (Low-Pass Filtering, or smoothing) in an image having heartbeat noise generated therein. In each graph, the abscissa axis indicates the X-coordinate of the frame, the oblique axis extending forward and backward indicates the Y-coordinate of the frame, and the ordinate axis indicates an inter-frame difference, as shown in an upper right portion of the drawing.

Prior to the LPF, there is a large inter-frame difference between an I-slice (or an intraframe) and the frame located before the I-slice timewise, and the other frames have very small inter-frame differences.

After the LPF, on the other hand, the inter-frame difference between the intraframe and the frame located before the intraframe timewise is smaller than that prior to the LPF, and the inter-frame difference is dispersed over several frames located behind the intraframe.

As described above, even if LPF or smoothing is performed in the temporal direction, the inter-frame difference still remains.

[Outline of the Present Technique]

Figure 5:
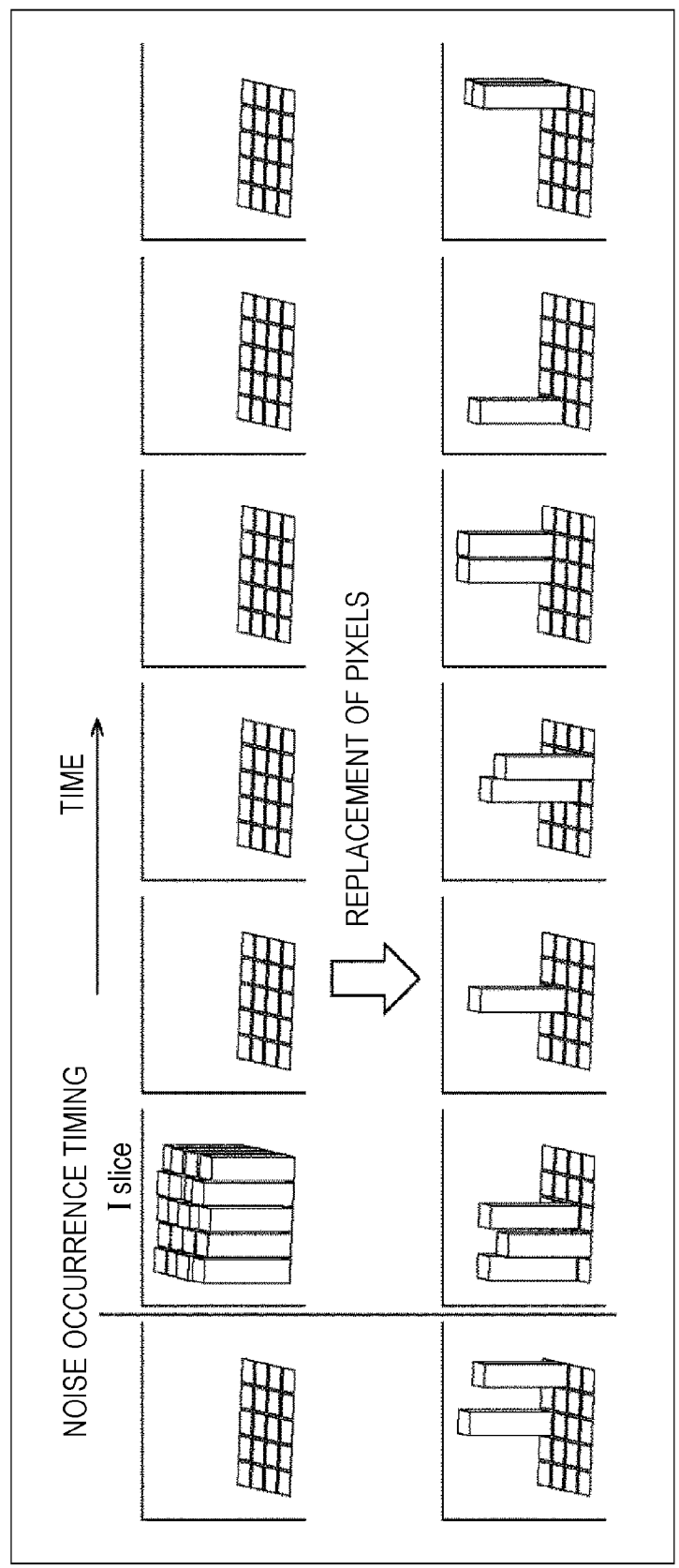
FIG. 5 is a diagram for explaining an outline of the present technique.

According to the present technique, pixels are replaced, and the portions of inter-frame difference occurrences are randomly arranged (or dispersed) in temporal and spatial directions, so that the inter-frame differences become uniform, as shown in FIG. 5.

The example in FIG. 5 shows graphs of inter-frame differences of the respective frames before and after pixel replacement according to the present technique in an image having heartbeat noise generated therein. In each graph, the abscissa axis indicates the X-coordinate of the frame, the oblique axis extending forward and backward indicates the Y-coordinate of the frame, and the ordinate axis indicates an inter-frame difference, as in the graphs in FIG. 4.

Prior to the pixel replacement, there is a large inter-frame difference between an I-slice (or an intraframe) and the frame located before the I-slice timewise, and the other frames have very small inter-frame differences, as described above with reference to FIG. 4.

After the pixel replacement, on the other hand, the portions of inter-frame difference occurrences are randomly arranged in temporal and spatial directions, so that the portions of inter-frame difference occurrences are dispersed over the respective frames including the intraframe, as shown in FIG. 5.

Accordingly, the inter-frame differences can be made uniform, and noise that is recognized in synchronization with heartbeat noise or the intraframe appearance cycle can be reduced.

[Example of Pixel Replacement]

Figure 6:
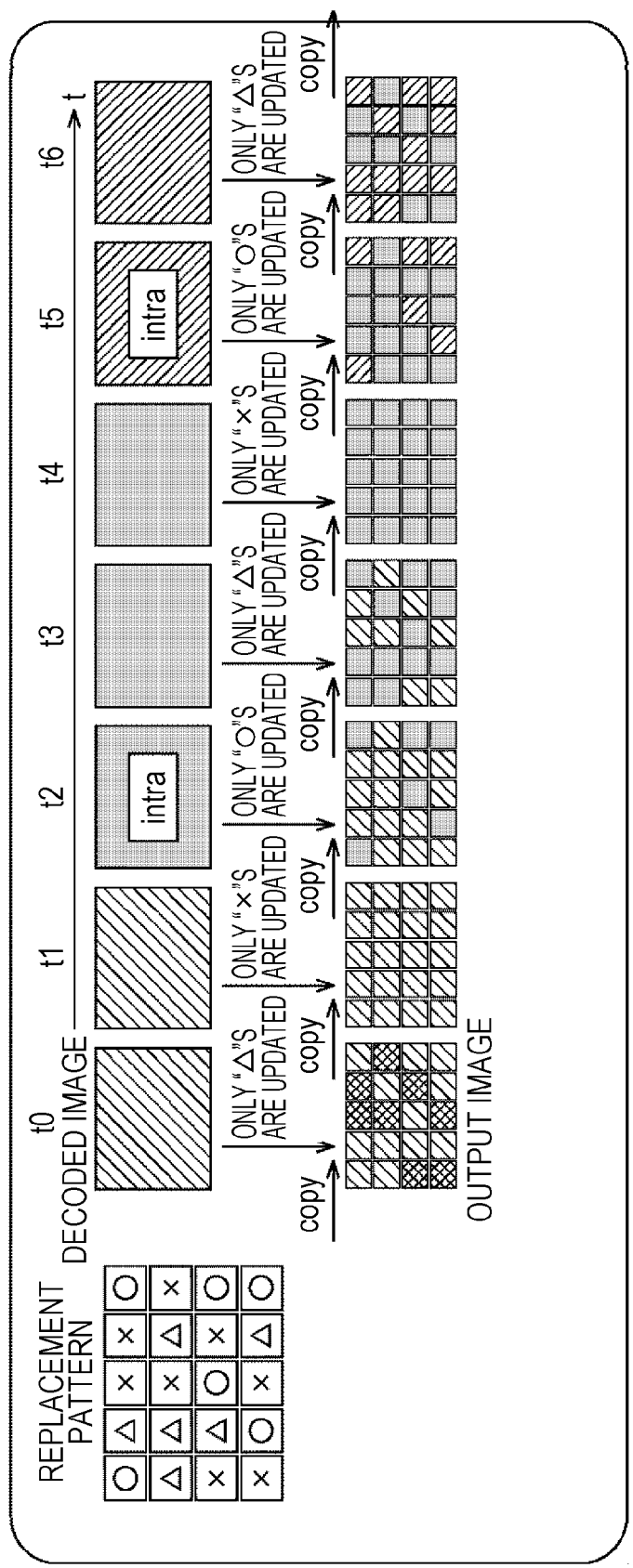
FIG. 6 is a diagram showing an example of pixel replacement according to the present technique.

FIG. 6 is a diagram showing an example of pixel replacement according to the present technique.

According to the present technique, pixel values are replaced with a current frame (a decoded image) only at update times that are set beforehand by a replacement pattern, and the other pixels carry the corresponding pixel values of the previous frame.

In the example shown in FIG. 6, the respective pixels of a decoded image are replaced in accordance with a replacement pattern formed with three update times denoted by ◯, Δ, and X, as shown in a left portion of the drawing. All the pixels in an image are replaced through replacement performed at the three update times. That is, the three times coincides with the intraframe appearance cycle.

Specifically, at time t0, the respective pixels are copied from the image that is output at the previous time, and only the pixels denoted by Δ among the pixels in the replacement pattern are replaced. At time t1, the respective pixels are copied from the image that is output at the previous time t0, and only the pixels denoted by X among the pixels in the replacement pattern are replaced. At this point, all the pixels in the image have been replaced with the decoded image. That is, by time t1, which is one time before the time when the decoded image is an intraframe, all the pixels in the image are replaced with the decoded image.

At time t2 when the decoded image is an intraframe, the respective pixels are copied from the image that is output at the previous time t1, and only the pixels denoted by ◯ among the pixels in the replacement pattern are replaced. At time t3, the respective pixels are copied from the image that is output at the previous time t2, and only the pixels denoted by Δ among the pixels in the replacement pattern are replaced.

At time t4, the respective pixels are copied from the image that is output at the previous time t3, and only the pixels denoted by X among the pixels in the replacement pattern are replaced. At this point, all the pixels in the image have been replaced with the decoded image. That is, by time t4, which is one time before the time when the decoded image is an intraframe, all the pixels in the image are replaced with the decoded image.

Further, at time t5 when the decoded image is an intraframe, the respective pixels are copied from the image that is output at the previous time t4, and only the pixels denoted by O among the pixels in the replacement pattern are replaced. At time t6, the respective pixels are copied from the image that is output at the previous time t5, and only the pixels denoted by Δ among the pixels in the replacement pattern are replaced.

Although not shown in the drawing, at time t7 and later, only the pixels designated in the replacement pattern are replaced in the same manner as above.

[Another Example of Pixel Replacement]

Figure 7:
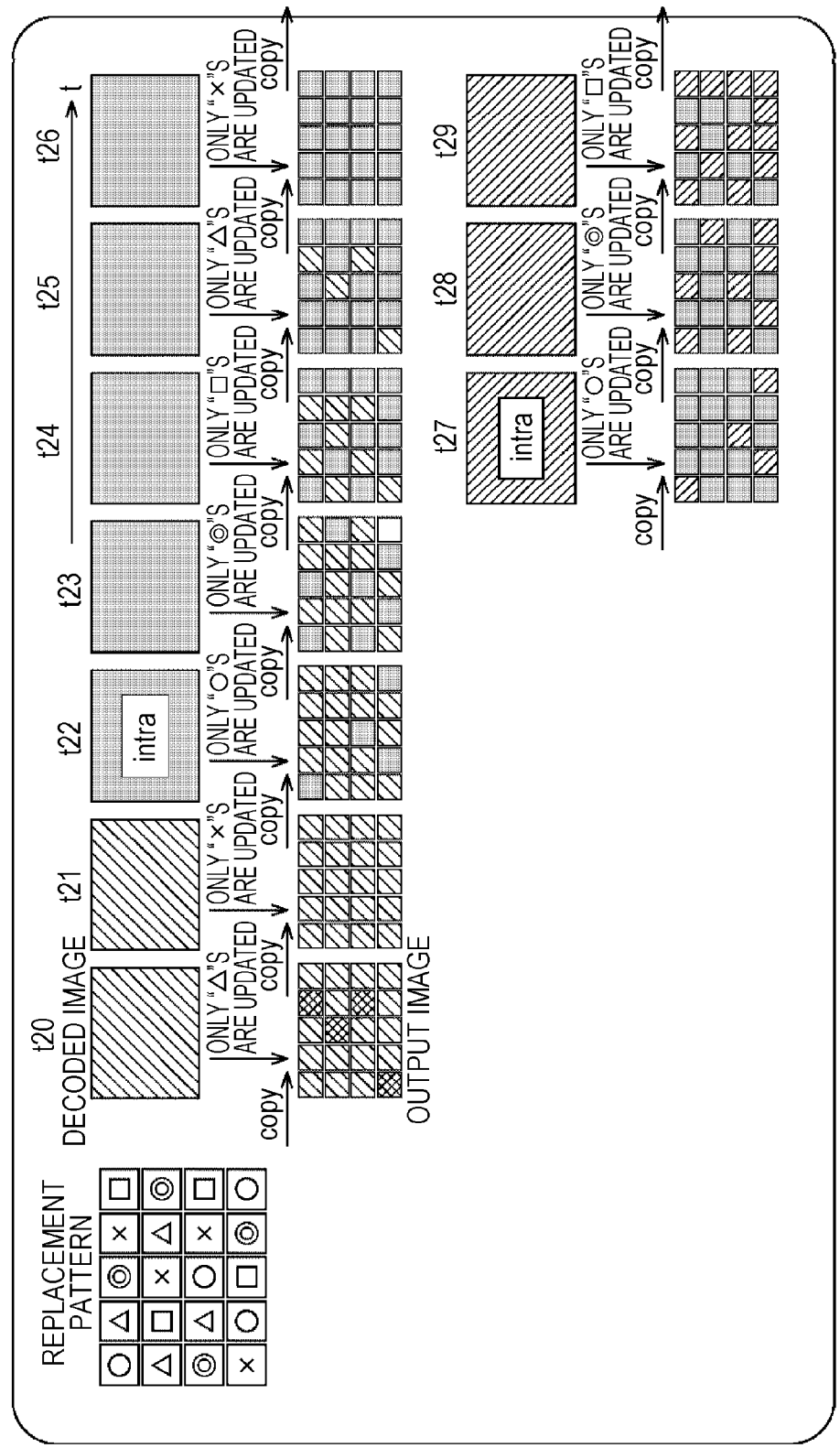
FIG. 7 is a diagram showing another example of pixel replacement according to the present technique.

FIG. 7 is a diagram showing another example of pixel replacement according to the present technique.

In the example shown in FIG. 7, the respective pixels of a decoded image are replaced in accordance with a replacement pattern formed with five update times denoted by ○, ⊙, □, Δ, and X as shown in a left portion of the drawing. All the pixels in an image are replaced through replacement performed at the five update times. That is, the five times coincide with the intraframe appearance cycle.

At time t20, the respective pixels are copied from the image that is output at the previous time, and only the pixels denoted by Δ among the pixels in the replacement pattern are replaced. At time t21, the respective pixels are copied from the image that is output at the previous time t20, and only the pixels denoted by X among the pixels in the replacement pattern are replaced. At this point, all the pixels in the image have been replaced with the decoded image. That is, by time t21, which is one time before the time when the decoded image is an intraframe, all the pixels in the image are replaced with the decoded image.

At time t22 when the decoded image is an intraframe, the respective pixels are copied from the image that is output at the previous time t21, and only the pixels denoted by ○ among the pixels in the replacement pattern are replaced. At time t23, the respective pixels are copied from the image that is output at the previous time t22, and only the pixels denoted by ⊙ among the pixels in the replacement pattern are replaced.

At time t24, the respective pixels are copied from the image that is output at the previous time t23, and only the pixels denoted by □ among the pixels in the replacement pattern are replaced. At time t25 when the decoded image is an intraframe, the respective pixels are copied from the image that is output at the previous time t24, and only the pixels denoted by Δ among the pixels in the replacement pattern are replaced.

At time t26, the respective pixels are copied from the image that is output at the previous time t25, and only the pixels denoted by X among the pixels in the replacement pattern are replaced. At this point, all the pixels in the image have been replaced with the decoded image. That is, by time t26, which is one time before the time when the decoded image is an intraframe, all the pixels in the image are replaced with the decoded image.

Further, at time t27 when the decoded image is an intraframe, the respective pixels are copied from the image that is output at the previous time t26, and only the pixels denoted by ○ among the pixels in the replacement pattern are replaced. At time t28, the respective pixels are copied from the image that is output at the previous time t27, and only the pixels denoted by ⊙ among the pixels in the replacement pattern are replaced. At time t29, the respective pixels are copied from the image that is output at the previous time t28, and only the pixels denoted by □ among the pixels in the replacement pattern are replaced.

Although not shown in the drawing, at time t30 and later, only the pixels designated in the replacement pattern are replaced in the same manner as above.

In the present technique, pixel values are replaced with a current frame (a decoded image) only at update times that are set beforehand by a replacement pattern, and the other pixels carry the corresponding pixel values of the previous frame. In the replacement pattern, the update time cycle is set so as to coincide with the intraframe appearance cycle.

Accordingly, noise that is generated in synchronization with the intraframe appearance cycle can be reduced. Meanwhile, the background and the like do not become completely stationary, but slightly change to appear natural. Furthermore, unsteadiness in flat portions and the like is corrected.

However, due to the above described pixel replacement process, moving object portions are broken in the decoded image. Therefore, a moving object region protection process is performed according to the present technique.

[Description of Moving Object Region Protection According to the Present Technique]

Figure 8:
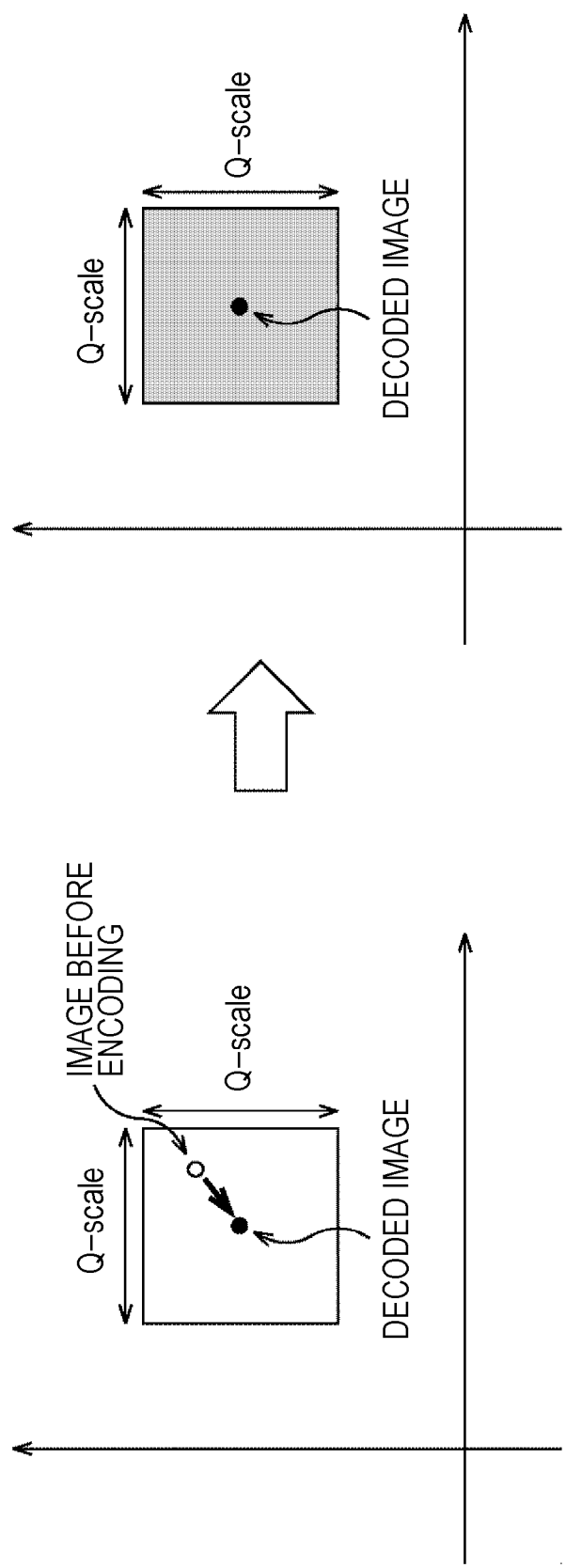
FIG. 8 is a diagram for explaining moving object region protection according to the present technique.
Figure 9:
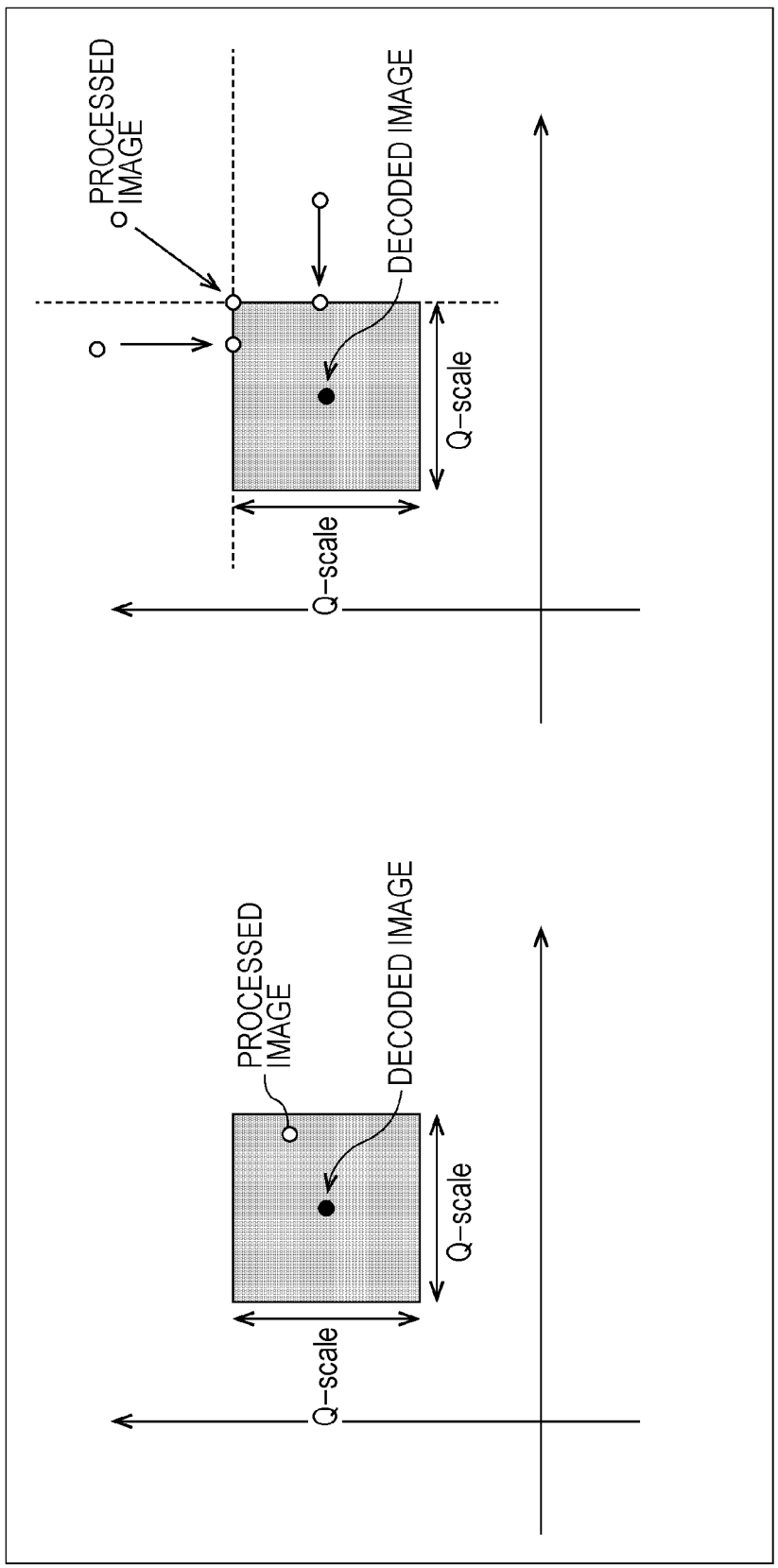
FIG. 9 is a diagram for explaining moving object region protection according to the present technique.

Referring now to FIGS. 8 and 9, moving object region protection according to the present technique is described.

According to the present technique, pixels with greatly different pixel values are replaced with the original image, and the processed result is kept at the pixels with sufficiently close pixel values, so as to cope with the above described moving object portions.

If threshold processing is performed only with difference values of pixels in this case, the processing becomes difficult.

FIGS. 8 and 9 schematically show two-dimensional examples of decoded images and images yet to be encoded.

As shown in the left side of FIG. 8, when an image yet to be encoded is quantized (encoded) with a Q-scale value, the decoded image is located at the center of the Q-scale.

Therefore, as shown in the right side of FIG. 8, only the location of the decoded image is recognized from the decoding side, but it is not clear where the image yet to be encoded (the true image) is located. However, it is possible to estimate the range in which the image yet to be encoded is located. That is, the Q-scale range is the range in which the image to be encoded may be located in this case.

In view of the above, a processed image located within the Q-scale value range from the decoded image might have the true value; therefore, the processed image remains at the location as shown in the left side of FIG. 9.

On the other hand, a processed image located outside the Q-scale range is projected onto the range in which the image to be encoded can be located (within the Q-scale range), as shown in the right side of FIG. 9.

In practice, comparison is performed not two-dimensionally but in the DCT coefficient dimension as described later with reference to FIG. 14, the DCT coefficients are clipped, IDCT conversion is performed, and an image is output. Although DCT coefficients are described in this embodiment, it is possible to determine an approximate solution, using frequency transform involving a small amount of calculation, such as Hadamard transform.

In this manner, moving object portions can be prevented from breaking due to pixel replacement, and moving object regions can be protected.

Figure 10:
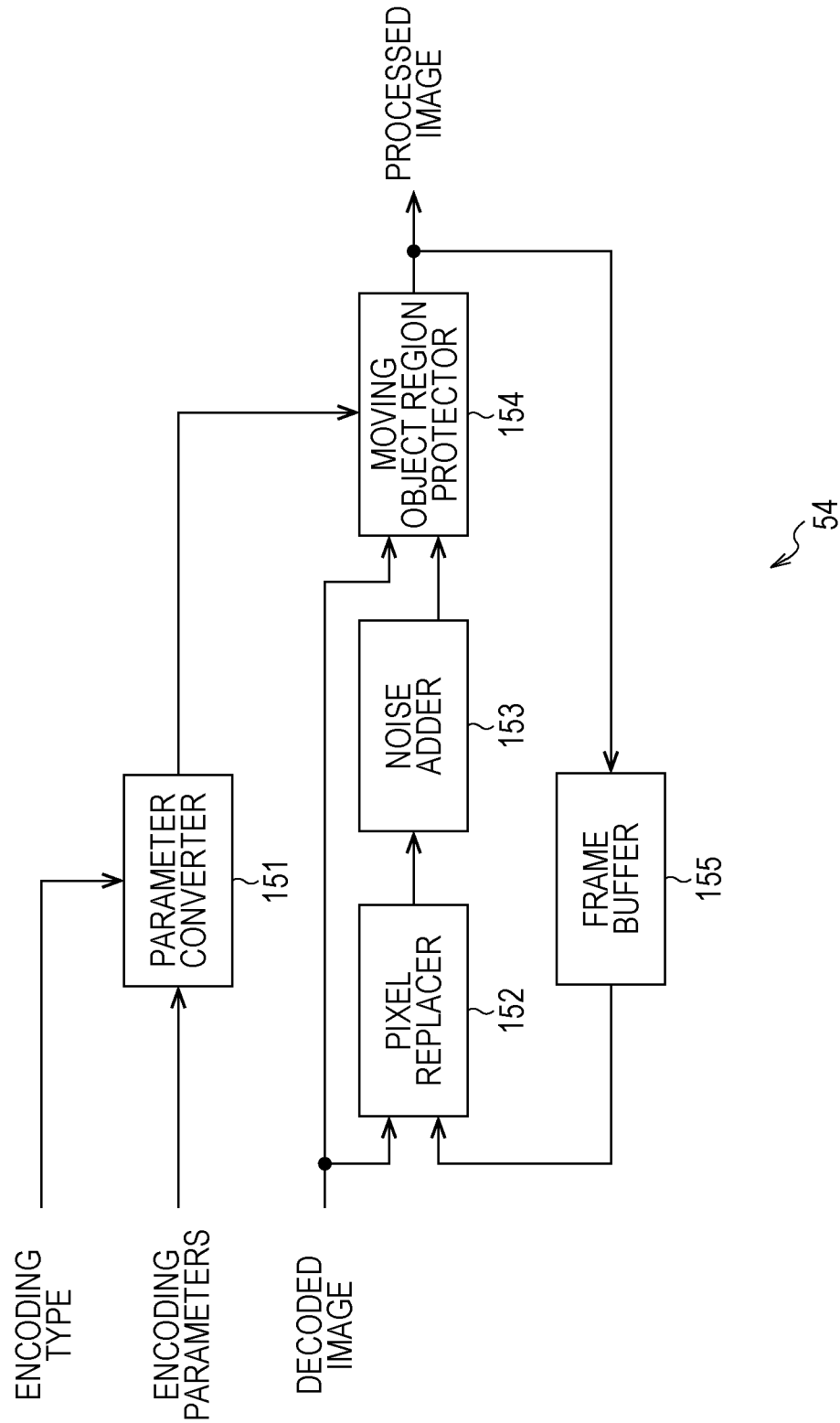
FIG. 10 is a block diagram showing an example structure of the filtering unit.

The filtering unit 54 that performs the above described process is designed as shown in FIG. 10.

[Example Structure of the Filtering Unit]

FIG. 10 is a block diagram showing an example structure of the filtering unit that performs the above described process.

In the example shown in FIG. 10, the filtering unit 54 shown in FIG. 2 is designed to include a parameter converter 151, a pixel replacer 152, a noise adder 153, a moving object region protector 154, and a frame buffer 155.

An encoding type from outside and encoding parameters from the decoding unit 53 shown in FIG. 2 are input to the parameter converter 151.

In accordance with the encoding type indicating the type of the encoding used in encoded stream generation, the parameter converter 151 converts the encoding parameters (particularly, the quantization scale) of the decoding unit 53. The parameter converter 151 supplies the converted encoding parameters to the moving object region protector 154.

A decoded image from the decoding unit 53 is input to the pixel replacer 152 and the moving object region protector 154. The processed image of the previous frame accumulated in the frame buffer 155 is also input to the pixel replacer 152. A noise-added processed image from the noise adder 153 is also supplied to the moving object region protector 154.

The pixel replacer 152 performs the pixel replacement process described above with reference to FIGS. 6 and 7. Specifically, the pixel replacer 152 performs initialization at the start of the process, and generates an image replacement pattern for the respective pixels of the image based on a replacement cycle that has been set from outside. Using the generated replacement pattern, the pixel replacer 152 performs a process of replacing the pixels of the processed image of the previous frame with the pixels of the decoded image in a constant cycle. The pixel replacer 152 supplies the processed image to the noise adder 153.

The noise adder 153 adds noise to the processed image from the pixel replacer 152, and supplies the noise-added processed image to the moving object region protector 154.

The moving object region protector 154 performs the moving object region protection process described above with reference to FIGS. 8 and 9. Specifically, using a QP (quantization value) as a parameter from the parameter converter 151 and the DCT coefficients of the noise-added image, the moving object region protector 154 performs a clipping process on the DCT coefficients generated from the decoded image, or performs a coefficient limitation process.

The DCT coefficients on which the coefficient limitations have been put are then subjected to IDCT conversion and are reconstructed into an image, and are then output as a processed image to the display control unit 55 in the next stage. The processed image from the moving object region protector 154 is to be used in the next frame; therefore, it is also supplied to the frame buffer 155.

At the start of the process, the frame buffer 155 performs initialization with an appropriate value such as the pixel value of the initial frame of the decoded image, for example. The frame buffer 155 also temporarily accumulates the processed image from the moving object region protector 154 for the use in the next frame, and supplies the processed image to the pixel replacer 152 when the next frame is processed.

Although the noise adder 153 is provided between the pixel replacement unit 152 and the moving object region protector 154 in the example shown in FIG. 10, the noise adder 153 may be excluded. In that case, the pixels subjected to the replacement process by the pixel replacer 152 are input to the moving object region protector 154.

[Example Structure of the Parameter Converter]

Figure 11:
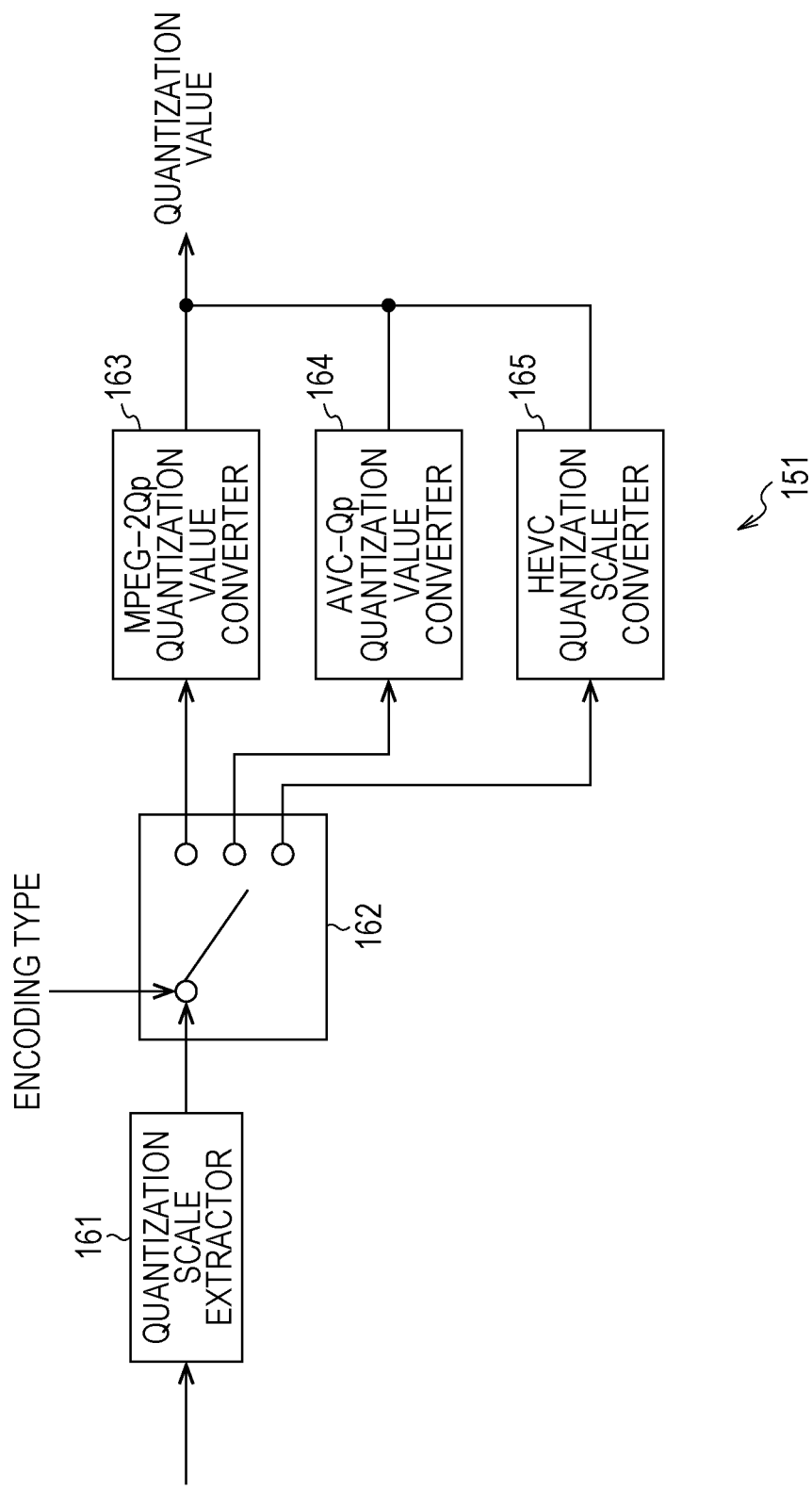
FIG. 11 is a block diagram showing an example structure of the parameter converter.

FIG. 11 is a block diagram showing an example structure of the parameter converter. The parameter converter 151 generates the parameters to be used by the moving object region 154 in accordance with the encoding parameters and the encoding type of the input stream.

In the example shown in FIG. 11, the parameter converter 151 is designed to include a quantization scale value extractor 161, a selector 162, an MPEG-2 QP quantization value converter 163, an AVC-Qp quantization value converter 164, and an HEVC quantization scale converter 165.

The quantization scale value extractor 161 extracts the quantization scale value from the encoding parameters supplied from the decoding unit 53, and supplies the extracted quantization scale value to the selector 162.

The selector 162 supplies the quantization scale value to a converter (not shown) compatible with the encoding type indicating the type of the encoding used in generation of an encoded stream supplied from outside.

Specifically, in a case where the encoding type indicates MPEG2, the selector 162 supplies the quantization scale value to the MPEG-2 QP quantization value converter 163. In a case where the encoding type indicates AVC, the selector 162 supplies the quantization scale value to the AVC-Qp quantization value converter 164. In a case where the encoding type indicates HEVC, the selector 162 supplies the quantization scale value to the HEVC quantization scale converter 165.

The MPEG-2 QP quantization value converter 163, the AVC-Qp quantization value converter 164, and the HEVC quantization scale converter 165 each convert the input quantization scale value into the quantization value to be used by the moving object region protector 154 in a later stage to quantize the DCT coefficients. The MPEG-2 QP quantization value converter 163, the AVC-Qp quantization value converter 164, and the HEVC quantization scale converter 165 supply the converted quantization value to the moving object region protector 154

If the DCT being used in the moving object region protector 154 in a later stage and the DCT used in the encoding differ from each other in size or accuracy, the MPEG-2 QP quantization value converter 163, the AVC-Qp quantization value converter 164, and the HEVC quantization scale converter 165 also adjust the DCT sizes or accuracies.

[Example Structure of the Pixel Replacer]

Figure 12:
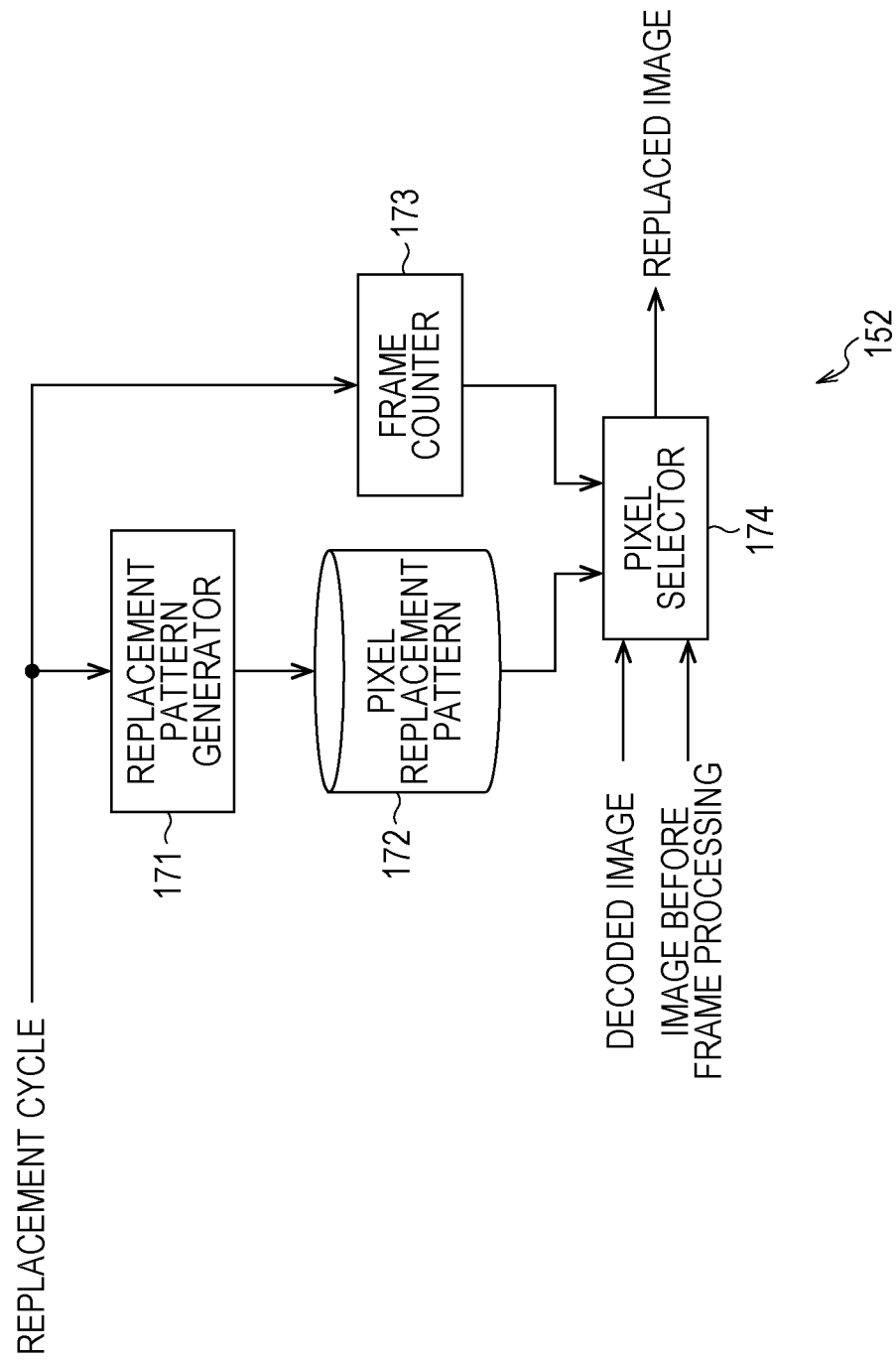
FIG. 12 is a block diagram showing an example structure of the pixel replacer.

FIG. 12 is a block diagram showing an example structure of the pixel replacer.

In the example shown in FIG. 12, the pixel replacer 152 is designed to include a replacement pattern generator 171, a pixel replacement pattern recording buffer 172, a frame counter 173, and a pixel selector 174.

A pixel replacement cycle is supplied from outside (not shown) to the replacement pattern generator 171 and the frame counter 173. The pixel replacement cycle is the intraframe appearance cycle (GOP cycle) or is longer than the intraframe appearance cycle, for example.

The replacement pattern generator 171 operates only at the time of initialization at the start of a process, and generates a pixel replacement pattern for the respective pixels of the image based on the replacement cycle that has been set from outside. The replacement pattern generator 171 records the generated pixel replacement pattern into the pixel replacement pattern recording buffer 172.

The pixel replacement pattern is randomly generated. Specifically, the pixel replacement pattern is generated by generating random integers for the respective pixels, dividing the values by the replacement cycle supplied from outside, and assigning the remainders to the respective pixels, as shown in the following equation (1).

[Mathematical Formula 1]

$$\text{for}(i,j)$$

$$\text{Replacement pattern}(i,j)=\text{rand}(\ )\%\text{ replacement cycle}$$

$$\text{end} \quad (1)$$

Therefore, the pixel replacement pattern is generated by assigning values 0 through (replacement cycle−1) to the respective pixels. If it is difficult for the pixel replacement pattern recording buffer 172 to hold the pixel replacement pattern, a pixel replacement pattern may be generated from pseudo-random numbers such as an M-sequence every time a pixel replacement pattern is used.

The following equations (2) show an example of the pixel replacement pattern using pseudo-random numbers.

[Mathematical Formula 2]

$$\text{Seed}=\text{initial value}$$

$$\text{for}(i,j)$$

$$\text{Replacement pattern}(i,j)=\text{Seed }\%\text{ replacement cycle}$$

$$\text{Seed}=M\text{-sequence}(\text{Seed})$$

$$\text{end} \quad (2)$$

As for the random numbers to be used in generating the pixel replacement pattern, it is necessary to select such random numbers that the pixel replacement pattern to be generated will have no spatial correlations. This is because, if spatially-correlated random numbers are selected, the pixel replacement pattern might be visually recognized in the result of the process, and the subjective image quality is degraded.

The frame counter 173 resets the internal counter at the start of the process, increments the counter value by "1" every time one image is processed, and supplies the pixel selector 174 with the remainder obtained by dividing the value of the internal counter by the value of the replacement cycle. That is, the frame counter 173 periodically outputs a value between 0 and (replacement cycle−1) to the pixel selector 174.

The frame counter 173 performs a process expressed by the following equations (3) frame by frame.

[Mathematical Formula 3]

$$\text{Counter}=\text{Counter}+1$$

$$\text{Output value}=\text{Counter }\%\text{ Replacement cycle} \quad (3)$$

A decoded image from the decoding unit 53 and a processed image of the previous frame from the frame buffer 155 are input to the pixel selector 174. The pixel replacement pattern from the pixel replacement pattern recording buffer 172 and a replacement number indicating the value indicated by the internal counter of the frame counter 173 are also supplied to the pixel selector 174.

The pixel selector 174 compares a value in the pixel replacement pattern set for the respective pixels with the replacement number supplied from the frame counter 173, selects the corresponding pixel of the decoded image as an output pixel value if the value matches the replacement number from the decoded image, and outputs the output pixel value to the noise adder 153. In a case where the value in the pixel replacement pattern does not match the replacement number supplied from the frame counter 173, the pixel selector 174 selects the corresponding pixel as an output pixel value from the results of the process performed on the previous frame, and outputs the output pixel value to the noise adder 153.

As described above, the pixel replacer 152 performs a process of replacing pixels in a constant cycle, using a pixel pattern that is set in advance. Accordingly, excess smoothing of pixel variations can be prevented while heartbeat noise is reduced.

[Example Structure of the Noise Adder]

Figure 13:
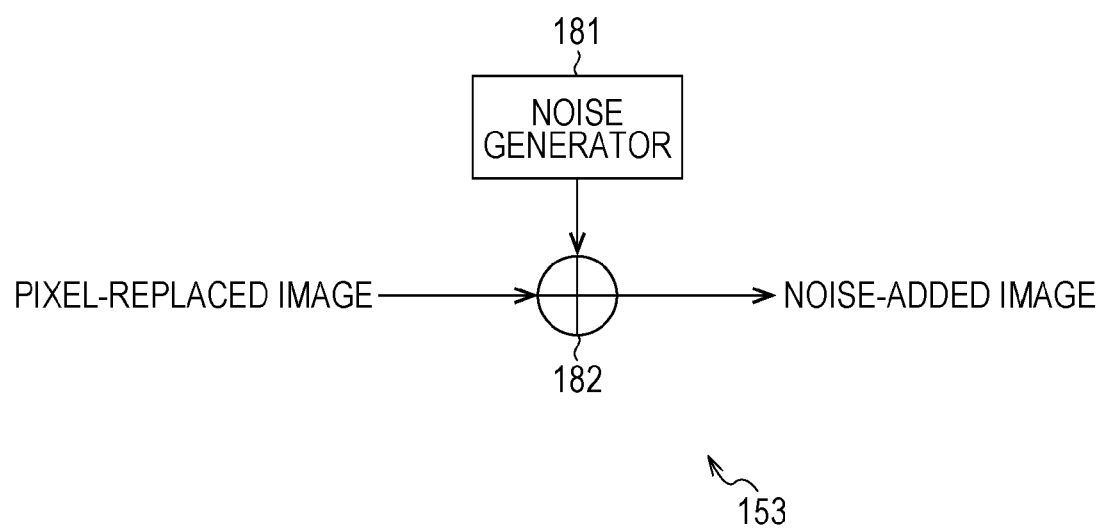
FIG. 13 is a block diagram showing an example structure of the noise adder.

FIG. 13 is a block diagram showing an example structure of the noise adder.

In the example shown in FIG. 13, the noise adder 153 is designed to include a noise generator 181 and an adder 182.

The noise generator 181 generates Gaussian noise, and outputs the generated noise to the adder 182. The noise to be generated at the noise generator 181 may be any noise as long as it is spatially random, and a distribution, intensity, and the like can be arbitrarily set by a user taking overall image quality into consideration.

A pixel-replaced image from the pixel replacer 152 is input to the adder 182. The adder 182 adds the noise supplied from the noise generator 181 to the input pixel-replaced image, and supplies the noise-added image to the moving object region protector 154.

[Example Structure of the Moving Object Region Protector]

Figure 14:
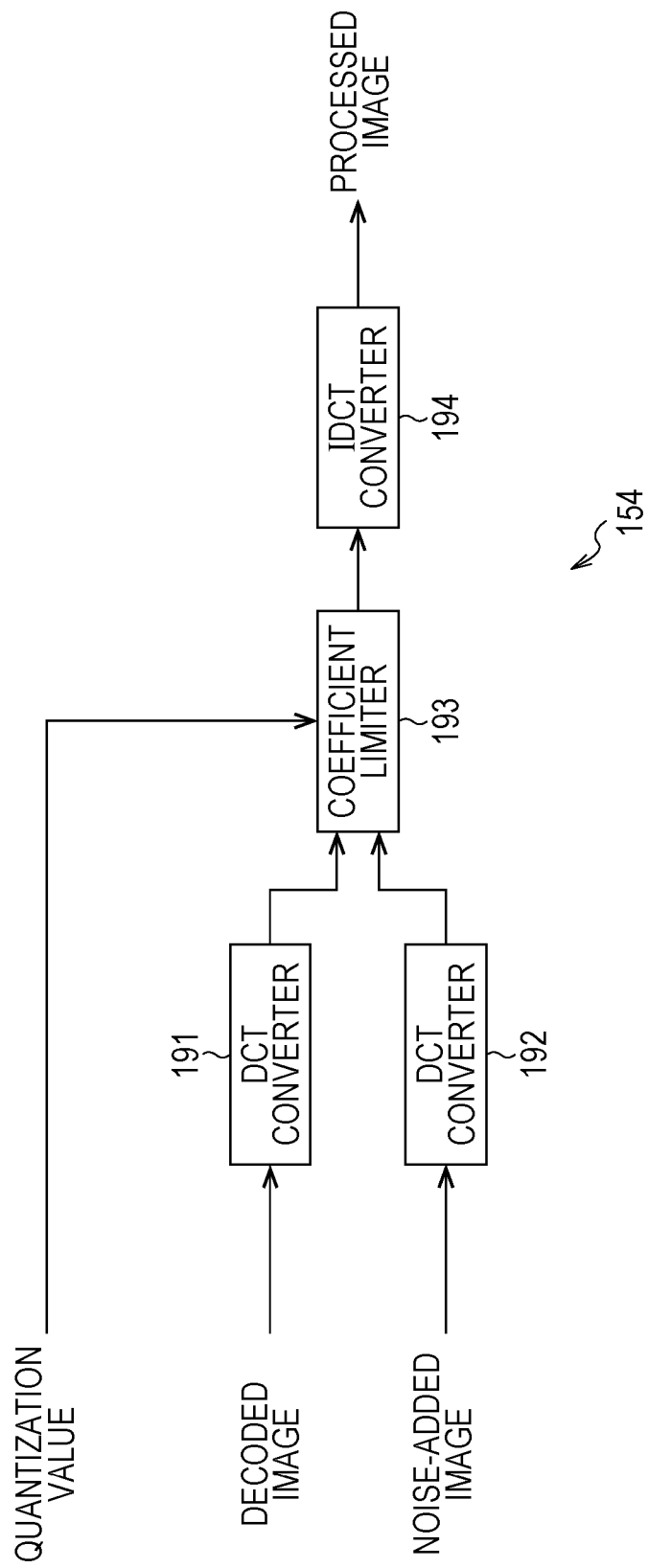
FIG. 14 is a block diagram showing an example structure of the moving object region protector.

FIG. 14 is a block diagram showing an example structure of the moving object region protector.

In the example shown in FIG. 14, the moving object region protector 154 is designed to include a DCT converter 191, a DCT converter 192, a coefficient limiter 193, and an IDCT converter 194. Although Hadamard transform is used in the moving object region protector 154, for example, frequency transform may be used as described above with reference to FIG. 9.

A decoded image from the decoding unit 53 is supplied to the DCT converter 191. A noise-added image from the noise adder 153 is supplied to the DCT converter 192. A quantization value from the parameter converter 151 is supplied to the coefficient limiter 193.

The DCT converter 191 performs DCT conversion on each block of a certain size in the supplied decoded image, generates DCT coefficients, and supplies the generated DCT coefficients to the coefficient limiter 193.

The DCT converter 192 performs DCT conversion on each block of a certain size in the supplied noise-added image, generates DCT coefficients, and supplies the generated DCT coefficients to the coefficient limiter 193.

Using a QP (quantization value) as a parameter from the parameter converter 151 and the DCT coefficients of the noise-added image, the coefficient limiter 193 performs a clipping process on the DCT coefficients generated from the decoded image, or performs a coefficient limitation process.

Specifically, the coefficient limiter 193 performs a clipping process so that the DCT coefficients generated from the noise-added image can fall within the ±QP/2 ranges of the DCT coefficients generated from the decoded image. This process can be expressed by the following equation (4).

[Mathematical Formula 4]

Clipped coefficient=min(max(noise-added image, decoded image coefficient−$QP$/2),decoded image coefficient+$QP$/2)     (4)

The coefficient limiter 193 outputs the DCT coefficients, on which the coefficient limitations have been put, to the IDCT converter 194.

The IDCT converter 194 performs IDCT conversion on the DCT coefficients supplied from the coefficient limiter 193, reconstructs an image, and outputs the reconstructed image as a result of the process to the display control unit 55 and the frame buffer 155.

[Operation of the Decoding Device]

Figure 15:
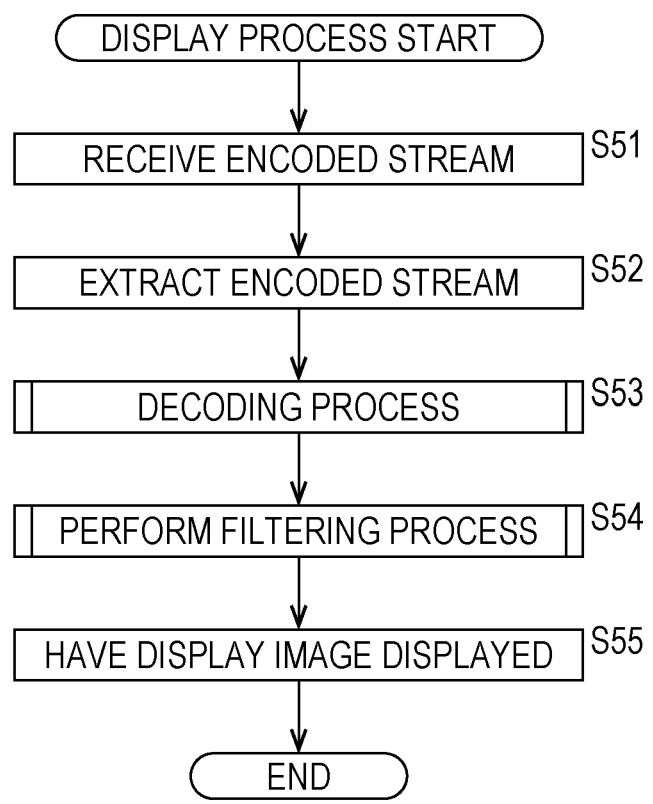
FIG. 15 is a flowchart for explaining a display process to be performed by the decoding device shown in FIG. 2.

Referring now to the flowchart in FIG. 15, a display process to be performed by the decoding device 50 is described.

In step S51, the reception unit 51 of the decoding device 50 receives an encoded stream transmitted from an encoding device (not shown), and supplies the encoded stream to the extraction unit 52.

In step S52, the extraction unit 52 extracts parameters such as an SPS, a PPS, VUI, and SEI, encoded data, and the like from the encoded stream supplied from the reception unit 51. The extraction unit 52 supplies the encoded data to the decoding unit 53. The extraction unit 52 also supplies the SPS, the PPS, the VUI, the SEI, and the like to the decoding unit 53 and the filtering unit 54 as necessary.

In step S53, the decoding unit 53 refers to the SPS, the PPS, the VUI, the SEI, and the like supplied from the extraction unit 52 as necessary, and performs a decoding process to decode the encoded data supplied from the extraction unit 52 by the HEVC method. This decoding process will be described later in detail with reference to FIG. 16. The decoding unit 53 supplies the filtering unit 54 with the decoded image subjected to the decoding process and the encoding parameters used in the encoding.

In step S54, based on the SPS, the PPS, the VUI, and the SEI supplied from the extraction unit 52, and the encoding parameters and the like supplied from the decoding unit 53, the filtering unit 54 performs pixel-replacing filtering on the decoded image supplied as an output signal from the decoding unit 53, using a replacement pattern indicating a pixel value variation distribution. This filtering process will be described later in detail with reference to FIG. 17. The filtering unit 54 supplies the image, which has been subjected to the filtering, to the display control unit 55.

In step S55, based on the image supplied from the filtering unit 54, the display control unit 55 generates a display image, and supplies the generated display image to the display unit 56, to cause the display unit 56 to display the display image. The process then comes to an end.

[Example of the Decoding Process]

Figure 16:
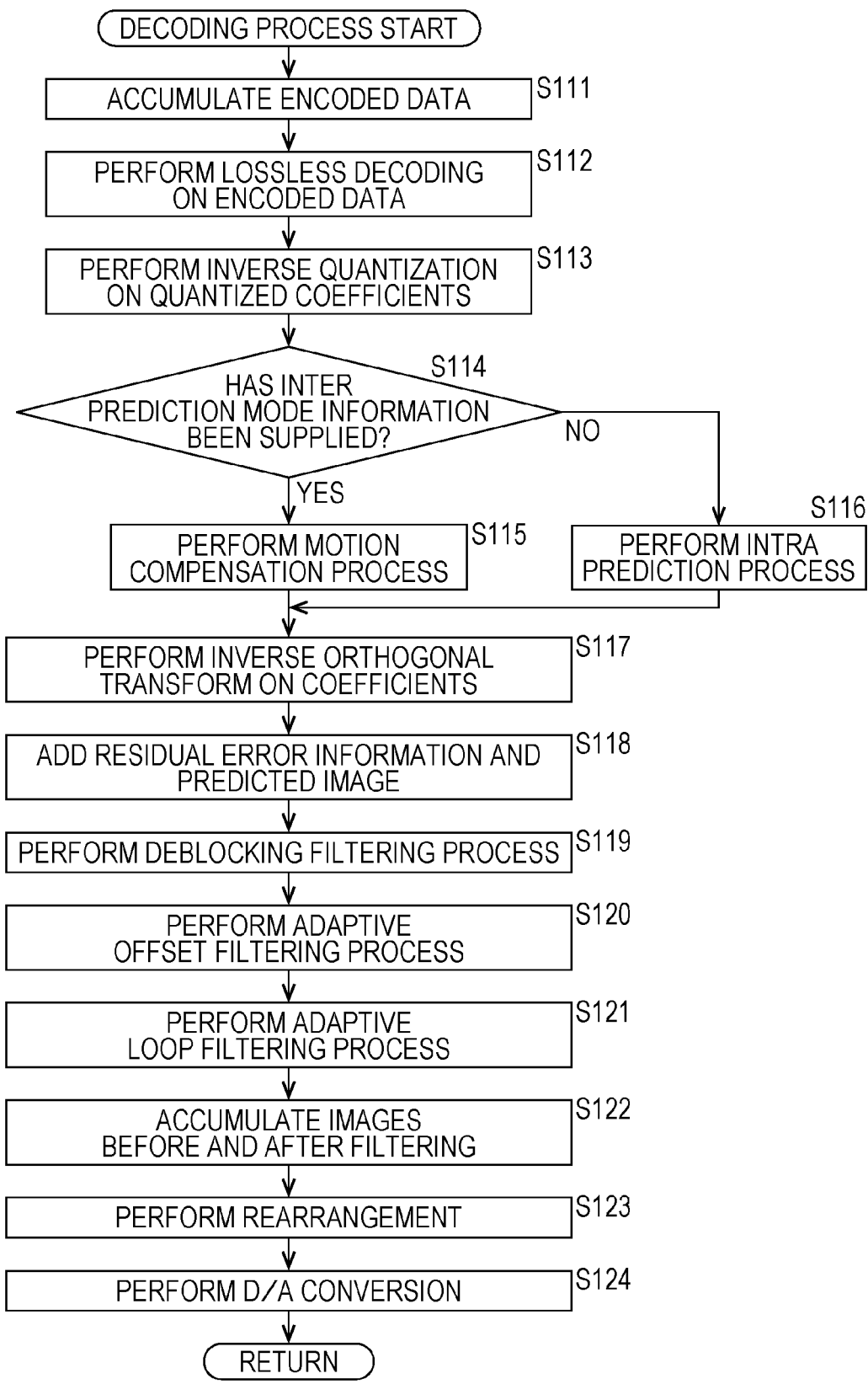
FIG. 16 is a flowchart for explaining a decoding process.

FIG. 16 is a flowchart for specifically explaining the decoding process in step S53 in FIG. 15.

In step S111 in FIG. 16, the accumulation buffer 101 of the decoding unit 53 receives and accumulates frame-based encoded data from the extraction unit 52 shown in FIG. 2. The accumulation buffer 101 supplies the accumulated encoded data to the lossless decoding unit 102. It should be noted that the procedures in steps S112 through S124 described below are carried out for each CU, for example.

In step S112, the lossless decoding unit 102 performs lossless decoding on the encoded data supplied from the accumulation buffer 101, to obtain quantized coefficients and encoding parameters. The lossless decoding unit 102 supplies the quantized coefficients to the inverse quantization unit 103. The lossless decoding unit 102 also supplies the intra prediction unit 111 with intra prediction mode information as an encoding parameter and the like supplied from the accumulation buffer 101, and supplies the motion compensation unit 112 with a motion vector, inter prediction mode information, information for identifying a reference image, and the like. The lossless decoding unit 102 further supplies the switch 113 with the intra prediction mode information or the inter prediction mode information as an encoding parameter supplied from the accumulation buffer 101.

The lossless decoding unit 102 further supplies the adaptive offset filter 141 with offset filter information as an encoding parameter supplied from the accumulation buffer 101, and supplies the adaptive loop filter 142 with a filter coefficient. The encoding parameters are also supplied to the filtering unit 54 in a later stage.

In step S113, the inverse quantization unit 103 inversely quantizes the quantized coefficients supplied from the lossless decoding unit 102, and supplies the resultant coefficients to the inverse orthogonal transform unit 104.

In step S114, the motion compensation unit 112 determines whether the inter prediction mode information has been supplied from the lossless decoding unit 102.

If it is determined in step S114 that the inter prediction mode information has been supplied, the process moves on to step S115.

In step S115, based on the motion vector, the inter prediction mode information, and the reference-image identification information supplied from the lossless decoding unit 102, the motion compensation unit 112 reads the reference image filtered with the deblocking filter 106, and performs a motion compensation process. The motion compensation unit 112 supplies the resultant predicted image to the addition unit 105 via the switch 113, and the process then moves on to step S117.

If it is determined in step S114 that the inter prediction mode information has not been supplied, or that the intra prediction mode information has been supplied to the intra prediction unit 111, the process moves on to step S116.

In step S116, using the reference image that has been read from the frame memory 109 via the switch 110 and has not been filtered with the deblocking filter 106, the intra prediction unit 111 performs an intra prediction process in the intra prediction mode indicated by the intra prediction mode information. The intra prediction unit 111 supplies the predicted image generated as a result of the intra prediction process to the addition unit 105 via the switch 113, and the process then moves on to step S117.

In step S117, the inverse orthogonal transform unit 104 performs inverse orthogonal transform on the coefficients supplied from the inverse quantization unit 103, and supplies the resultant residual error information to the addition unit 105.

In step S118, the addition unit 105 adds the residual error information supplied from the inverse orthogonal transform unit 104 to the predicted image supplied from the switch 113. The addition unit 105 supplies the resultant image to the deblocking filter 106, and also supplies the resultant image to the frame memory 109.

In step S119, the deblocking filter 106 performs filtering on the image supplied from the addition unit 105, to remove block distortions. The deblocking filter 106 supplies the resultant image to the adaptive offset filter 141.

In step S120, the adaptive offset filter 141 performs, for each LCU, an adaptive offset filtering process on the image subjected to the deblocking filtering process by the deblocking filter 106 based on the offset filter information supplied from the lossless decoding unit 102. The adaptive offset filter 141 supplies the adaptive loop filter 142 with the image subjected to the adaptive offset filtering process.

In step S121, using the filter coefficients supplied from the lossless decoding unit 102, the adaptive loop filter 142 performs, for each LCU, an adaptive loop filtering process on the image supplied from the adaptive offset filter 141. The adaptive loop filter 142 supplies the resultant image to the frame memory 109 and the screen rearrangement buffer 107.

In step S122, the frame memory 109 accumulates the unfiltered image supplied from the addition unit 105 and the filtered image supplied from the deblocking filter 106. The images accumulated in the frame memory 109 are supplied as reference images to the motion compensation unit 112 or the intra prediction unit 111 via the switch 110.

In step S123, the screen rearrangement buffer 107 stores the image supplied from the deblocking filter 106 frame by frame, rearranges the frames of the stored image in the original displaying order, instead of the encoding order, and supplies the rearranged image to the D/A converter 108.

In step S124, the D/A converter 108 performs D/A conversion on the frame-based image supplied from the screen rearrangement buffer 107, and outputs the image as an output signal to the filtering unit 54 shown in FIG. 2. The process then returns to step S53 in FIG. 15, and moves on to step S54.

[Example of the Filtering Process]

Figure 17:
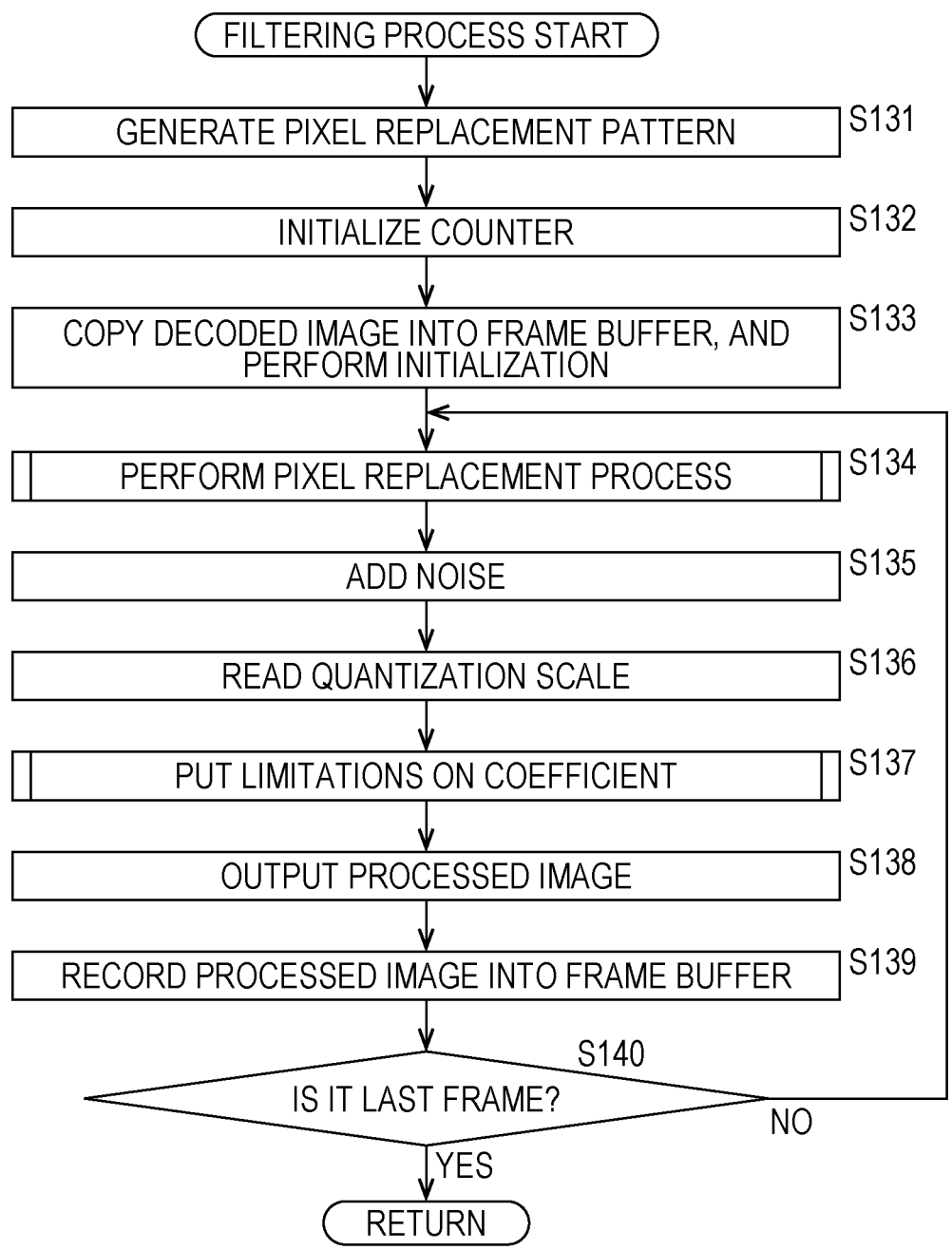
FIG. 17 is a flowchart for explaining a filtering process to be performed by the filtering unit shown in FIG. 10.

Referring now to the flowchart in FIG. 17, the filtering process in step S54 in FIG. 15 is described.

A pixel replacement cycle is supplied from outside (not shown) to the replacement pattern generator 171 and the frame counter 173. In step S131, the replacement pattern generator 171 generates a pixel replacement pattern for the respective pixels of the image based on the replacement cycle that has been set from outside. The replacement pattern generator 171 records the generated pixel replacement pattern into the pixel replacement pattern recording buffer 172.

In step S132, the frame counter 173 performs initialization (a reset process) on the internal counter.

In step S133, the frame buffer 155 performs initialization by copying the pixel value of the initial frame of the decoded image, for example.

In step S134, the pixel selector 174 performs a pixel replacement process. This pixel replacement process will be described later in detail with reference to FIG. 18. Through the procedure in step S134, a pixel-replaced image is output to the noise adder 153.

In step S135, the adder 182 of the noise adder 153 adds noise supplied from the noise generator 181 to the input pixel-replaced image, and supplies the noise-added image to the moving object region protector 154.

In step S136, the parameter converter 151 reads the quantization scale value from the encoding parameters supplied from the decoding unit 53. In accordance with the encoding type, the parameter converter 151 converts the input quantization scale value into the quantization value to be used by the moving object region protector 154 in a later stage to quantize DCT coefficients. The converted quantization value is supplied to the moving object region protector 154.

In step S137, the moving object region protector 154 puts limitations on coefficients, to protect moving object regions. This coefficient limitation process will be described later in detail with reference to FIG. 19. The DCT coefficients on which coefficient limitations have been put through the procedure in step S137 are then subjected to IDCT conversion, and an image is reconstructed.

In step S138, the moving object region protector 154 outputs the reconstructed processed image to the display control unit 55 shown in FIG. 2. In step S139, the processed image is recorded into the frame buffer 155.

In step S140, the pixel replacer 152 determines whether the frame being currently processed is the last frame. If the frame being currently processed is determined not to be the last frame in step S140, the process returns to step S134, and the procedures thereafter are repeated.

If the frame being currently processed is determined to be the last frame in step S140, the filtering process shown in FIG. 17 is ended, and the process returns to step S54 in FIG. 15 and then moves on to step S55.

[Example of the Pixel Replacement Process]

Figure 18:
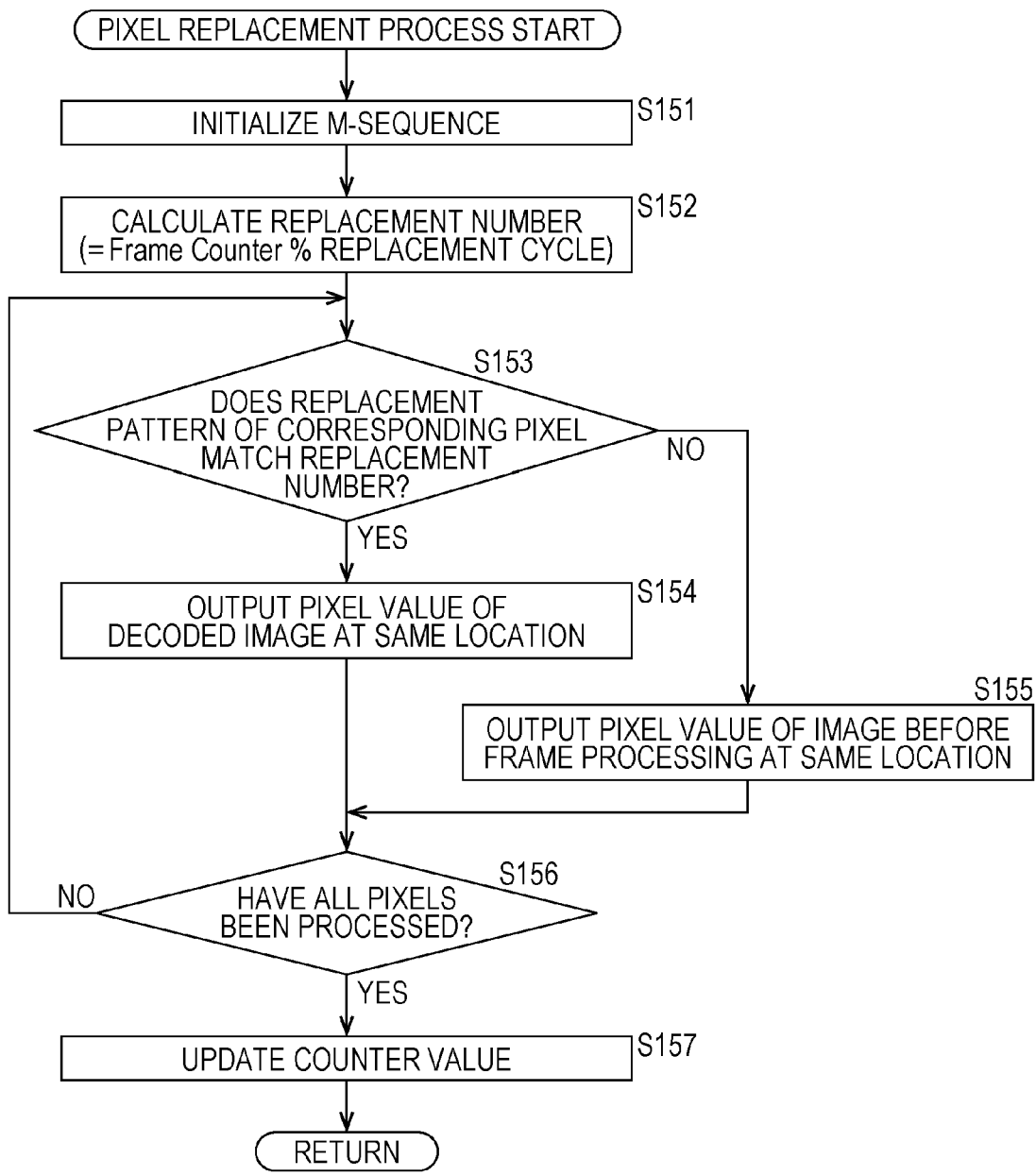
FIG. 18 is a flowchart for explaining a pixel replacement process.

Referring now to the flowchart in FIG. 18, the pixel replacement process in step S134 in FIG. 17 is described. It should be noted that this pixel replacement process is an example where a pixel replacement pattern is generated from pseudo-random numbers such as an M-sequence every time a pixel replacement pattern is used.

A decoded image from the decoding unit 53 and a processed image of the previous frame from the frame buffer 155 are input to the pixel selector 174 of the pixel replacer 152. A pixel replacement pattern from the pixel replacement pattern recording buffer 172 is also supplied to the pixel selector 174.

In step S151, the pixel selector 174 initializes the M-sequence in the pixel replacement pattern. In step S152, the frame counter 173 calculates a replacement number that is the remainder obtained when dividing the internal counter value by the value of the replacement cycle, and supplies the calculated replacement number to the pixel selector 174.

In step S153, the pixel selector 174 determines whether the replacement pattern of the corresponding pixel matches the replacement number.

If the replacement pattern of the corresponding pixel is determined to match the replacement number in step S153, the process moves on to step S154. In step S154, the pixel selector 174 outputs the pixel value of the decoded image at the same location to the noise adder 153.

If the replacement pattern of the corresponding pixel is determined not to match the replacement number in step S153, the process moves on to step S155. In step S155, the pixel selector 174 outputs the pixel value of the processed image of the previous frame at the same location to the noise adder 153.

After step S154 or S155, the process moves on to step S156. In step S156, the pixel selector 174 determines whether all the pixels in the frame have been processed. If it is determined in step S156 that not all the pixels have been processed, the process returns to step S153, and the procedures thereafter are repeated.

If it is determined in step S156 that all the pixels have been processed, the process moves on to step S157. In step S157, the frame counter 173 updates the internal counter value, and the process then returns to step S134 in FIG. 17 and moves on to step S135.

[Example of the Coefficient Limiting Process]

Figure 19:
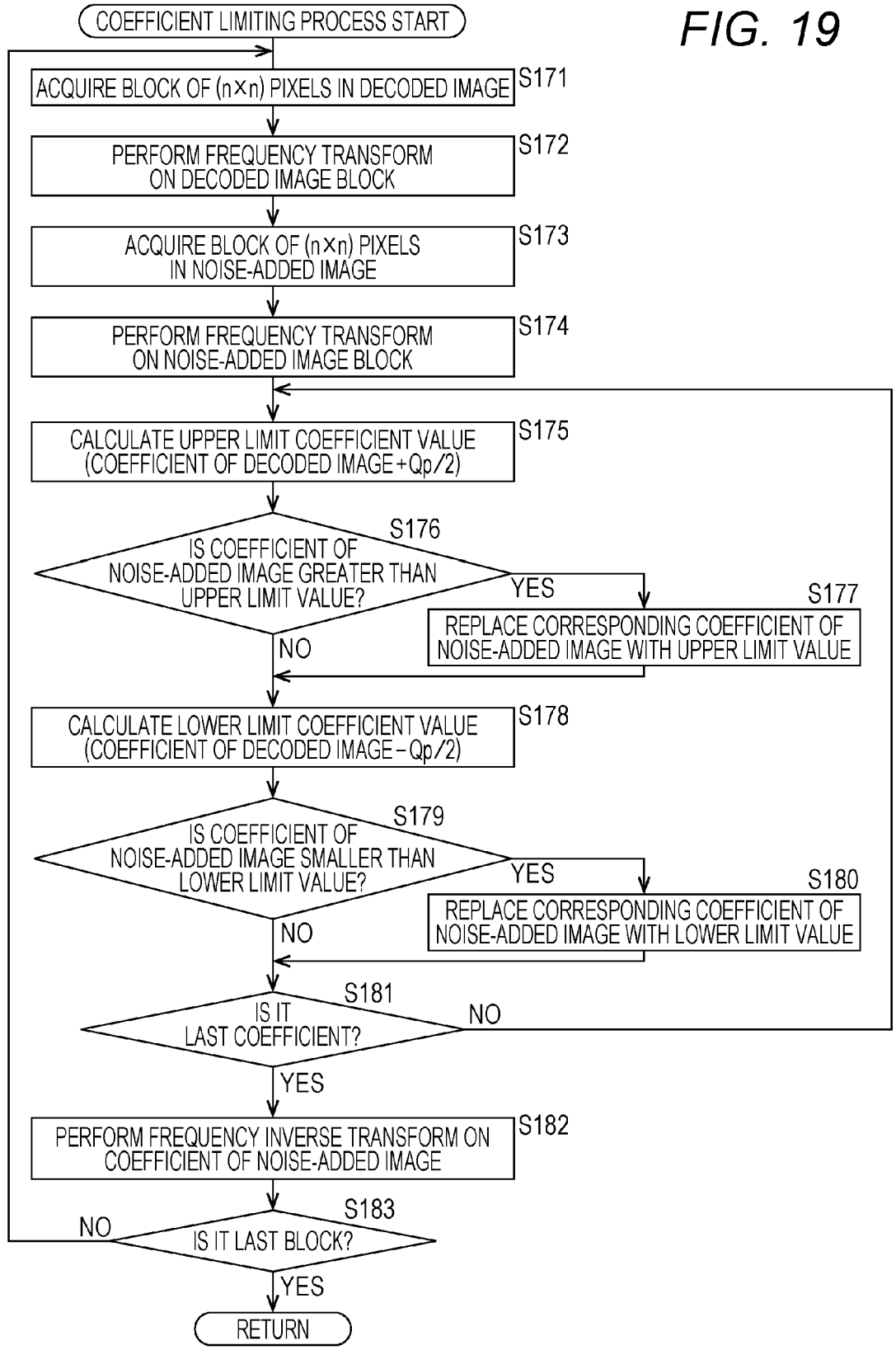
FIG. 19 is a flowchart for explaining a coefficient limiting process.

Referring now to the flowchart in FIG. 19, the coefficient limiting process in step S137 in FIG. 17 is described.

A decoded image from the decoding unit 53 is supplied to the DCT converter 191. A noise-added image from the noise adder 153 is supplied to the DCT converter 192. A quantization value QP from the parameter converter 151 is supplied to the coefficient limiter 193.

In step S171, the DCT converter 191 acquires a block of (n×n) pixels of the decoded image. In step S172, the DCT converter 191 performs frequency transform on the decoded image block, and generates a DCT coefficient of the decoded image. The DCT coefficient of the decoded image is supplied to the coefficient limiter 193.

In step S173, the DCT converter 192 acquires a block of (n×n) pixels of the noise-added image. In step S174, the DCT converter 192 performs frequency transform on the noise-added image block, and generates a DCT coefficient of the noise-added image. The DCT coefficient of the noise-added image is supplied to the coefficient limiter 193.

In step S175, the coefficient limiter 193 calculates the upper limit coefficient value (the DCT coefficient of the decoded image+QP/2). In step S176, the coefficient limiter 193 determines whether the DCT coefficient of the noise-added image is greater than the upper limit coefficient value calculated in step S175.

If the DCT coefficient of the noise-added image is determined to be greater than the upper limit coefficient value in step S176, the process moves on to step S177. In step S177, the coefficient limiter 193 replaces the DCT coefficient of the noise-added image with the upper limit coefficient value.

If the DCT coefficient of the noise-added image is determined to be smaller than the upper limit coefficient value in step S176, the process skips step S177 and moves on to step S178.

In step S178, the coefficient limiter 193 calculates the lower limit coefficient value (the DCT coefficient of the decoded image−QP/2). In step S179, the coefficient limiter 193 determines whether the DCT coefficient of the noise-added image is smaller than the lower limit coefficient value calculated in step S178.

If the DCT coefficient of the noise-added image is determined to be smaller than the lower limit coefficient value in step S179, the process moves on to step S180. In step S180, the coefficient limiter 193 replaces the DCT coefficient of the noise-added image with the lower limit coefficient value.

If the DCT coefficient of the noise-added image is determined to be greater than the lower limit coefficient value in step S179, the process skips step S180 and moves on to step S181.

In step S181, the coefficient limiter 193 determines whether the DCT coefficient being currently processed is the last DCT coefficient. If the DCT coefficient being currently processed is determined not to be the last DCT coefficient in step S181, the process returns to step S175, and the procedures thereafter are repeated.

If the DCT coefficient being currently processed is determined to be the last DCT coefficient in step S181, the coefficient limiter 193 outputs the DCT coefficient of the noise-added image to the IDCT converter 194, and the process moves on to step S182.

In step S182, the IDCT converter 194 performs inverse frequency transform on the DCT coefficient of the noise-added image supplied from the coefficient limiter 193.

In step S183, the DCT converters 191 and 192 determine whether the block being currently processed is the last block. If the block being currently processed is determined to be the last block in step S183, the coefficient limiting process is ended.

If the block being currently processed is determined not to be the last block in step S183, the process returns to step S171, and the procedures thereafter are repeated.

As described above, the respective pixels of an image are replaced with the use of a pixel replacement pattern generated based on the intraframe appearance cycle. Accordingly, noise that is generated in synchronization with the intraframe appearance cycle can be reduced. Meanwhile, the background and the like do not become completely stationary, but slightly change to appear natural. Furthermore, unsteadiness in flat portions and the like is corrected.

As a clipping process is performed on DCT coefficients, moving object portions can be prevented from breaking due to pixel replacement, and moving object regions can be protected.

Furthermore, noise is added to a pixel-replaced image, and a clipping process is performed on DCT coefficients of the noise-added image. Through the clipping process, excess noise is not added, but an appropriate amount of noise is added. Accordingly, image quality can be further improved.

Second Embodiment

[Example Structure of the Filtering Unit]

Figure 20:
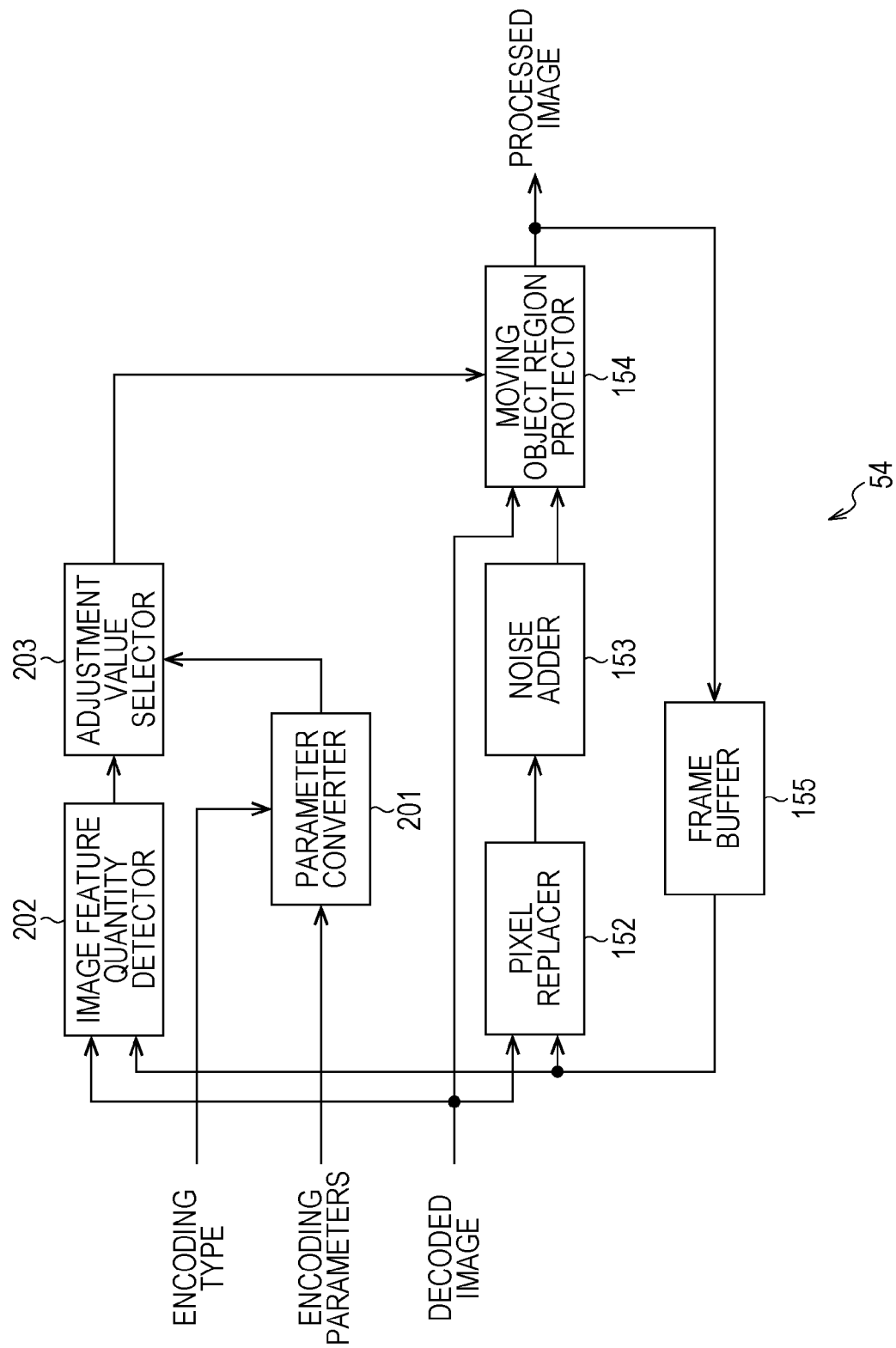
FIG. 20 is a block diagram showing another example structure of the filtering unit.

FIG. 20 is a block diagram showing another example structure of the filtering unit. The filtering unit 54 shown in FIG. 20 detects motion in an image, and information about the motion is used in protecting a moving object region.

The filtering unit 54 shown in FIG. 20 differs from the filtering unit 54 shown in FIG. 10 in that the parameter converter 151 is replaced with a parameter converter 201, and an image feature quantity detector 202 and an adjustment value selector 203 are added. Like the filtering unit 54 shown in FIG. 10, the filtering unit 54 shown in FIG. 20 includes a pixel replacer 152, a noise adder 153, a moving object region protector 154, and a frame buffer 155.

Specifically, an encoding type from outside and encoding parameters from the decoding unit 53 are input to the parameter converter 201. The parameter converter 201 extracts not only a quantization scale but also encoding parameters that can be used in detecting a moving object other than a quantization scale, and performs encoding parameter correction in accordance with the encoding type.

As the encoding parameters, a macroblock type, a motion vector, a coded block pattern, and the like are extracted.

A converted quantization value and the corrected encoding parameters are supplied to the adjustment value selector 203.

In the example shown in FIG. 20, a decoded image from the decoding unit 53 is supplied not only to the pixel replacer 152 and the moving object region protector 154, but also to the image feature quantity detector 202. A processed image of the previous frame from the frame buffer 155 is supplied not only to the pixel replacer 152 but also to the image feature quantity detector 202.

Using the decoded image from the decoding unit 53 and the processed image of the previous frame from the frame buffer 155, the image feature quantity detector 202 calculates image feature quantities corresponding to the DCT size of the moving object region protector 154. The image feature quantity detector 202 supplies the calculated feature quantities to the adjustment value selector 203.

The adjustment value selector 203 adjusts the quantization value supplied from the parameter converter 201, using the image feature quantities from the image feature quantity detector 202, the encoding parameters from the parameter converter 201, and user set values and the like that are set through an operating unit (not shown) or the like. The adjustment value selector 203 supplies the adjusted quantization value to the moving object region protector 154.

[Example Structure of the Parameter Converter]

Figure 21:
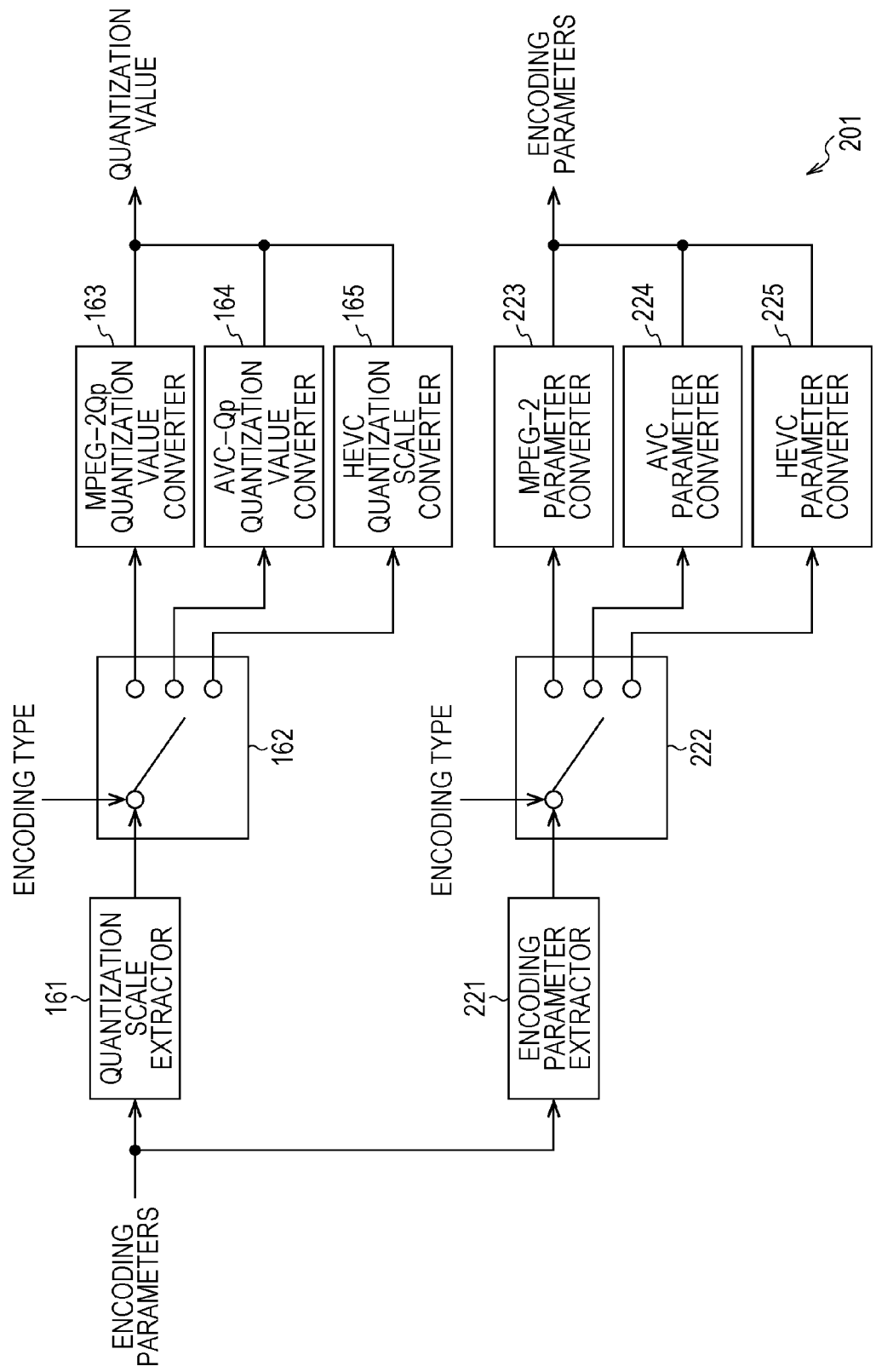
FIG. 21 is a block diagram showing an example structure of the parameter converter.

FIG. 21 is a block diagram showing an example structure of the parameter converter.

Like the parameter converter 151 shown in FIG. 11, the parameter converter 201 shown in FIG. 21 includes a quantization scale value extractor 161, a selector 162, an MPEG-2 QP quantization value converter 163, an AVC-Qp quantization value converter 164, and an HEVC quantization scale converter 165.

The parameter converter 201 shown in FIG. 21 differs from the parameter converter 151 shown in FIG. 11 in further including an encoding parameter extractor 221, a selector 222, an MPEG-2 parameter converter 223, an AVC parameter converter 224, and an HEVC parameter converter 225.

The encoding parameter extractor 221 extracts, from the encoding parameters supplied from the decoding unit 53, encoding parameters that can be used in detecting a moving object, other than a quantization scale value. The encoding parameter extractor 221 supplies the extracted encoding parameters to the selector 222.

As the encoding parameters, a macroblock type, a motion vector, a coded block pattern, and the like are extracted.

The selector 222 supplies the above mentioned encoding parameters to a converter (not shown) compatible with the encoding type indicating the type of the encoding used in generation of an encoded stream supplied from outside.

Specifically, in a case where the encoding type indicates MPEG2, the selector 222 supplies the encoding parameters to the MPEG-2 parameter converter 223. In a case where the encoding type indicates AVC, the selector 222 supplies the encoding parameters to the AVC parameter converter 224. In a case where the encoding type indicates HEVC, the selector 222 supplies the encoding parameters to the HEVC parameter converter 225.

The MPEG-2 parameter converter 223, the AVC parameter converter 224, and the HEVC parameter converter 225 each perform correction on the input encoding parameters, with respect to DCT block size, calculation accuracy, an encoding method difference, and the like. The MPEG-2 parameter converter 223, the AVC parameter converter 224, and the HEVC parameter converter 225 supplies the corrected encoding parameters to the moving object region protector 154.

[Example Structure of the Image Feature Quantity Detector]

Figure 22:
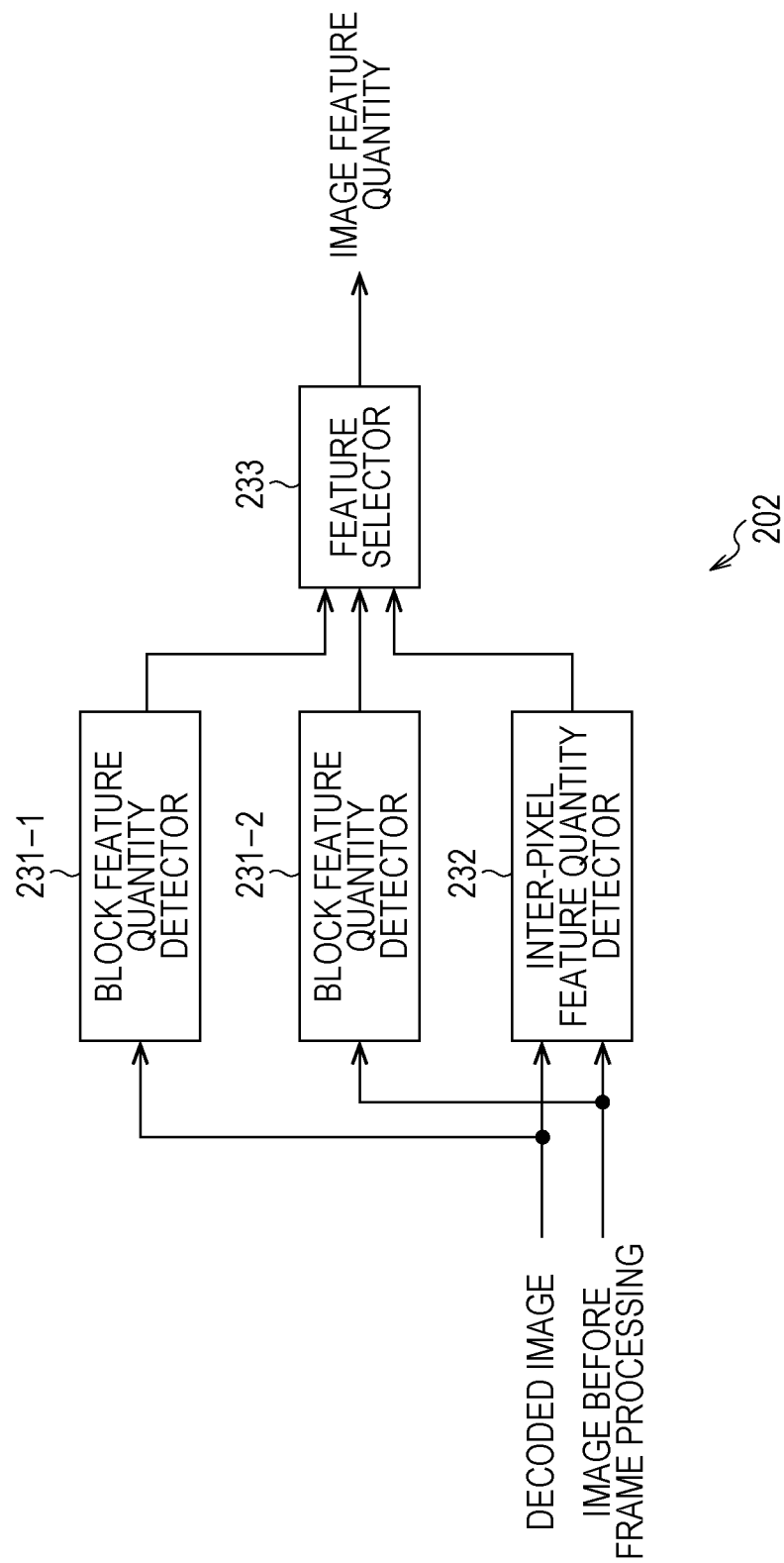
FIG. 22 is a block diagram showing an example structure of the image feature quantity detector.

FIG. 22 is a block diagram showing an example structure of the image feature quantity detector.

In the example shown in FIG. 22, the image feature quantity detector 202 is designed to include block feature quantity detectors 231-1 and 231-2, an inter-pixel feature quantity detector 232, and a feature selector 233.

A decoded image from the decoding unit 53 is input to the block feature quantity detector 231-1 and the inter-pixel feature quantity detector 232. A processed image of the previous frame from the frame buffer 155 is input to the block feature quantity detector 231-2 and the inter-pixel feature quantity detector 232.

The block feature quantity detectors 231-1 and 231-2 detect the average, the dispersion, the dynamic range, the edge strength of the pixel values of each block in the decoded image and the processed image of the previous frame, respectively. The block feature quantity detectors 231-1 and 231-2 supply the detected block-based image feature quantities to the feature selector 233.

The inter-pixel feature quantity detector 232 calculates the sum of differences between the decoded image and the processed image of the previous frame, the average difference value, the sum of absolute difference values, the edge strength in a difference image, the dispersion in the difference image, and the like, and supplies the calculated inter-pixel feature quantities to the feature selector 233.

Based on the image feature quantities supplied from the block feature quantity detectors 231-1 and 231-2 and the inter-pixel feature quantity detector 232, the feature selector 233 labels the respective blocks as stationary regions, moving object regions, moving object boundary regions, and the like. The feature selector 233 supplies the image feature quantities (region labels) to the adjustment value selector 203.

[Example Structure of the Adjustment Value Selector]

Figure 23:
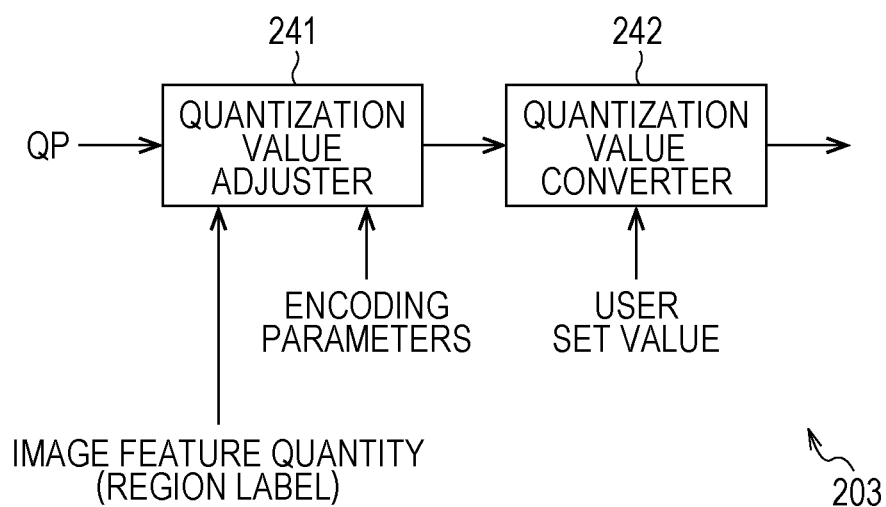
FIG. 23 is a block diagram showing an example structure of the adjustment value selector.

FIG. 23 is a block diagram showing an example structure of the adjustment value selector.

In the example shown in FIG. 23, the adjustment value selector 203 is designed to include a quantization value adjuster 241 and a quantization value converter 242.

A quantization value QP and encoding parameters supplied from the parameter converter 201, and region labels indicating image feature quantities supplied from the image feature quantity detector 202 are input to the quantization value adjuster 241.

Using the region label and the encoding parameters, the quantization value adjuster 241 adjusts the quantization value supplied from the parameter converter 201, and outputs the adjusted quantization value to the quantization value converter 242.

Specifically, as shown in FIG. 24, the quantization value adjuster 241 adjusts the quantization value based on the image feature quantities and the encoding parameters such as a macroblock type (MB Type), a motion vector, and a coded block pattern.

Image feature quantities are classified into the three types of region labels of stationary regions, moving object regions, and vicinities of moving object boundaries. Macroblock types are classified into the two types of intra prediction and inter prediction. Motion vectors are classified into the two types of zero vectors (stationary) and non-zero vectors (dynamic). Coded block patterns are classified into the two types of patterns with coefficient transmission and patterns with no coefficient transmission.

Cases where an input is QP are now described in order from the top of FIG. 24. In a case where the region label is "stationary", and the macroblock type is "intra", the quantization value adjuster 241 performs adjustment so that the adjusted quantization value becomes QP/2. In a case where the region label is "stationary", the macroblock type is "inter", the motion vector is a zero vector, and there is no coefficient transmission, the quantization value adjuster 241 performs adjustment so that the adjusted quantization value becomes QP. In a case where the region label is "stationary", the macroblock type is "inter", the motion vector is a non-zero vector, and there is no coefficient transmission, the quantization value adjuster 241 performs adjustment so that the adjusted quantization value becomes QP.

In a case where the region label is "stationary", the macroblock type is "inter", the motion vector is a non-zero vector, and there is coefficient transmission, the quantization value adjuster 241 performs adjustment so that the adjusted quantization value becomes QP/2. In a case where the region label is "vicinity of a moving object boundary", and the macroblock type is "intra", the quantization value adjuster 241 performs adjustment so that the adjusted quantization value becomes 0. In a case where the region label is "vicinity of a moving object boundary", the macroblock type is "inter", the motion vector is a zero vector, and there is no coefficient transmission, the quantization value adjuster 241 performs adjustment so that the adjusted quantization value becomes QP.

In a case where the region label is "vicinity of a moving object boundary", the macroblock type is "inter", the motion vector is a non-zero vector, and there is no coefficient transmission, the quantization value adjuster 241 performs adjustment so that the adjusted quantization value becomes QP/2. In a case where the region label is "vicinity of a moving object boundary", the macroblock type is "inter", the motion vector is a non-zero vector, and there is coefficient transmission, the quantization value adjuster 241 performs adjustment so that the adjusted quantization value becomes QP/4. In a case where the region label is "moving object", and the macroblock type is "intra", the quantization value adjuster 241 performs adjustment so that the adjusted quantization value becomes 0.

In a case where the region label is "moving object", the macroblock type is "inter", the motion vector is a zero vector, and there is no coefficient transmission, the quantization value adjuster 241 performs adjustment so that the adjusted quantization value becomes QP/2.

In a case where the region label is "vicinity of a moving object boundary", the macroblock type is "inter", the motion vector is a non-zero vector, and there is no coefficient transmission, the quantization value adjuster 241 performs adjustment so that the adjusted quantization value becomes QP/4. In a case where the region label is "moving object", the macroblock type is "inter", the motion vector is a non-zero vector, and there is coefficient transmission, the quantization value adjuster 241 performs adjustment so that the adjusted quantization value becomes 0.

It should be noted that those encoding parameters such as the macroblock type (MB Type), the motion vector, and the coded block pattern vary with encoding types. Those encoding parameters are corrected by the MPEG-2 parameter converter 223, the AVC parameter converter 224, and the HEVC parameter converter 225 shown in FIG. 21.

Although the encoding parameters described above are a macroblock type, a motion vector, and a coded block pattern, it is possible to use parameters other than the above.

Referring back to FIG. 23, the quantization value converter 242 performs a conversion process on the quantization value adjusted by the quantization value adjuster 241, in accordance with user set values that are set through an operation input unit or the like (not shown). This conversion process is expressed by the following equation (5).

[Mathematical Formula 5]

$$\text{Adjusted } QP = \min(\max(QP - \text{Offset}, \text{Min}QP), \text{Max}QP) \quad (5)$$

Here, Offset (offset value), MaxQP (maximum quantization value), and MinQP (minimum quantization value) are the user set values. With this, a user can control the quantization scale value. It is possible to use user set values other than the above.

The quantization value converter 242 supplies the converted quantization value to the moving object region protector 154.

The moving object region protector 154 receives the adjusted quantization value supplied from the adjustment value selector 203, and performs the same moving object protection process as in the case shown in FIG. 10. However, when the value of QP=0 is input, the output value completely matches the decoded image. Therefore, where QP=0, the moving object region protector 154 does not perform the above process, but may be made to perform an alternative process to ignore a decoded image.

[Example of the Filtering Process]

Figure 25:
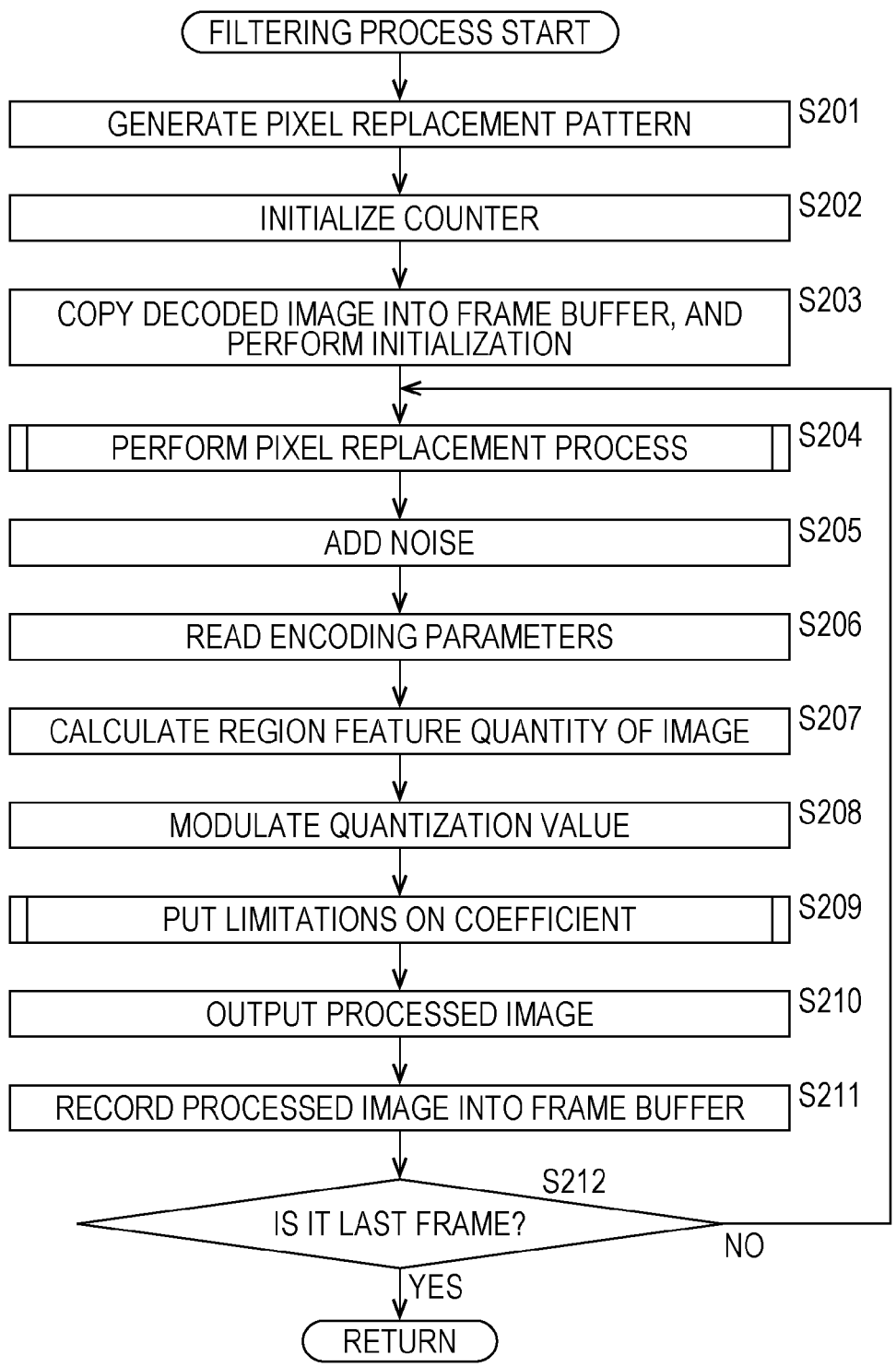
FIG. 25 is a flowchart for explaining a filtering process to be performed by the filtering unit shown in FIG. 20.

Referring now to the flowchart in FIG. 25, the filtering process to be performed by the filtering unit 54 shown in FIG. 20 is described. This process is another example of the filtering process in step S54 in FIG. 15, which has been described above with reference to FIG. 17.

A pixel replacement cycle is supplied from outside (not shown) to the replacement pattern generator 171 and the frame counter 173. In step S201, the replacement pattern generator 171 generates a pixel replacement pattern for the respective pixels of the image based on the replacement cycle that has been set from outside. The replacement pattern generator 171 records the generated pixel replacement pattern into the pixel replacement pattern recording buffer 172.

In step S202, the frame counter 173 performs initialization (a reset process) on the internal counter.

In step S203, the frame buffer 155 performs initialization by copying the pixel value of the initial frame of the decoded image, for example.

In step S204, the pixel selector 174 performs a pixel replacement process. This pixel replacement process is basically the same as the pixel replacement process described above with reference to FIG. 18; therefore, explanation thereof is not repeated herein. Through the procedure in step S204, a pixel-replaced image is output to the noise adder 153.

In step S205, the adder 182 of the noise adder 153 adds noise supplied from the noise generator 181 to the input pixel-replaced image, and supplies the noise-added image to the moving object region protector 154.

In step S206, the parameter converter 201 reads, from the encoding parameters supplied from the decoding unit 53, encoding parameters such as a quantization scale value, a macroblock type, a motion vector, and a coded block pattern.

In accordance with the encoding type, the parameter converter 201 converts the input quantization scale value into the quantization value to be used by the moving object region protector 154 in a later stage to quantize DCT coefficients. The parameter converter 201 also performs correction on the input encoding parameters, with respect to DCT block size, calculation accuracy, an encoding method difference, and the like.

The quantization value that has been read and converted and the encoding parameters that have been read and corrected in step S206 are supplied to the moving object region protector 154.

In step S207, using the decoded image from the decoding unit 53 and the processed image of the previous frame from the frame buffer 155, the image feature quantity detector 202 calculates image feature quantities corresponding to the DCT size of the moving object region protector 154.

Specifically, the block feature quantity detectors 231-1 and 231-2 detect the average, the dispersion, the dynamic range, the edge strength of the pixel values of each block in the decoded image and the processed image of the previous frame, respectively. The inter-pixel feature quantity detector 232 calculates the sum of differences between the decoded image and the processed image of the previous frame, the average difference value, the sum of absolute difference values, the edge strength in a difference image, the dispersion in the difference image, and the like.

Based on the image feature quantities supplied from the block feature quantity detectors 231-1 and 231-2 and the inter-pixel feature quantity detector 232, the feature selector 233 labels the respective blocks as stationary regions, moving object regions, moving object boundary regions, and the like. The feature selector 233 supplies the image feature quantities (region labels) to the adjustment value selector 203.

In step S208, the adjustment value selector 203 modulates the quantization value supplied from the parameter converter 201. Specifically, the quantization value adjuster 241 of the adjustment value selector 203 adjusts the quantization value supplied from the parameter converter 201, using the image feature quantities from the image feature quantity detector 202 and the encoding parameters from the parameter converter 201, as described above with reference to FIG. 24. Also, the quantization value converter 242 of the adjustment value selector 203 converts the quantization value supplied from the parameter converter 201 according to the above equation (5), using user set values that are set through an operating unit or the like (not shown). The converted quantization value is supplied to the moving object region protector 154.

In step S209, the moving object region protector 154 puts limitations on coefficients, to protect moving object regions. This coefficient limitation process is basically the same as the coefficient limitation process described above with reference to FIG. 19; therefore, explanation thereof is not repeated herein. The DCT coefficients on which coefficient limitations have been put through the procedure in step S209 are then subjected to IDCT conversion, and an image is reconstructed.

In step S210, the moving object region protector 154 outputs the reconstructed processed image to the display control unit 55 shown in FIG. 2. In step S211, the processed image is recorded into the frame buffer 155.

In step S212, the pixel replacer 152 determines whether the frame being currently processed is the last frame. If the frame being currently processed is determined not to be the last frame in step S212, the process returns to step S204, and the procedures thereafter are repeated.

If the frame being currently processed is determined to be the last frame in step S212, the filtering process shown in FIG. 25 is ended, and the process returns to step S54 in FIG. 15 and then moves on to step S55.

As described above, motion (image feature quantities) is detected, encoding parameters other than the quantization scale are extracted, and the quantization value to be used in clipping DCT coefficients is adjusted by using the detected motion and the extracted encoding parameters. Accordingly, higher accuracy can be achieved.

Although a pixel replacement pattern is generated and used in the above described example, a pixel replacement pattern is set and transmitted from the encoding side, and is received and used on the decoding side in the example described below.

Third Embodiment

[Example Structure of an Encoding Device]

Figure 26:
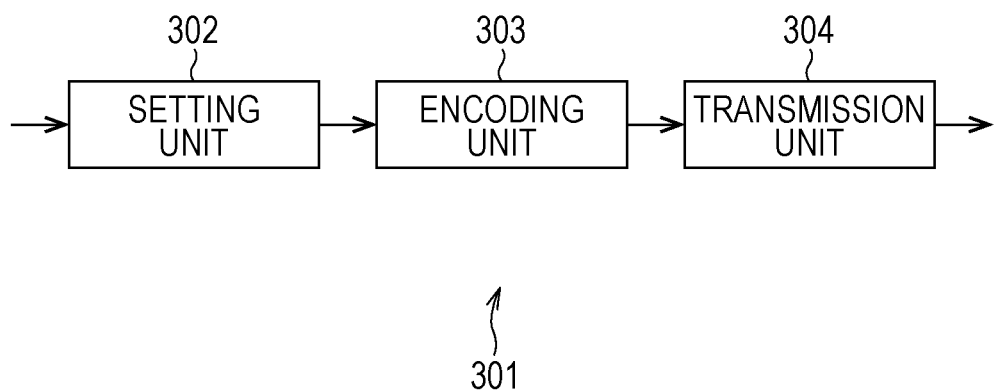
FIG. 26 is a block diagram showing an example structure of an encoding device to which the present technique is applied.

FIG. 26 is a block diagram showing an example structure of an encoding device as an image processing device to which the present technique is applied.

The encoding device 301 shown in FIG. 26 includes a setting unit 302, an encoding unit 303, and a transmission unit 304, and encodes images such as captured images by the HEVC method.

Specifically, an image such as a frame-based captured image is input as an input signal to the setting unit 302 of the encoding device 301. The setting unit 302 sets an SPS, a PPS, VUI, SEI, and the like. At this point, for a decoded image to be used on the decoding side, a pixel replacement pattern indicating a pixel value variation distribution is generated based on a replacement cycle that is set from outside, and the pixel replacement pattern is set in the SEI, for example. As described above, the replacement cycle is the intraframe appearance cycle (GOP cycle) or is longer than the intraframe appearance cycle.

The setting unit 302 supplies the encoding unit 303 with the SPS, the PPS, the VUI, and the SEI, which have been set, as well as the image. The SPS, the PPS, the VUI, the SEI, and the like may be encoded at the setting unit 302 as necessary.

The encoding unit 303 refers to the SPS, the PPS, the VUI, the SEI, and the like, which have been set by the setting unit 302, and encodes the input signal by the HEVC method. The encoding unit 303 then generates an encoded stream from the resultant encoded data, the SPS, the PPS, the VUI, and the SEI, and supplies the generated encoded stream to the transmission unit 304. The transmission unit 304 transmits the encoded stream supplied from the encoding unit 303 to the decoding device 50 shown in FIG. 31, which will be described later.

[Example Structure of the Encoding Unit]

Figure 27:
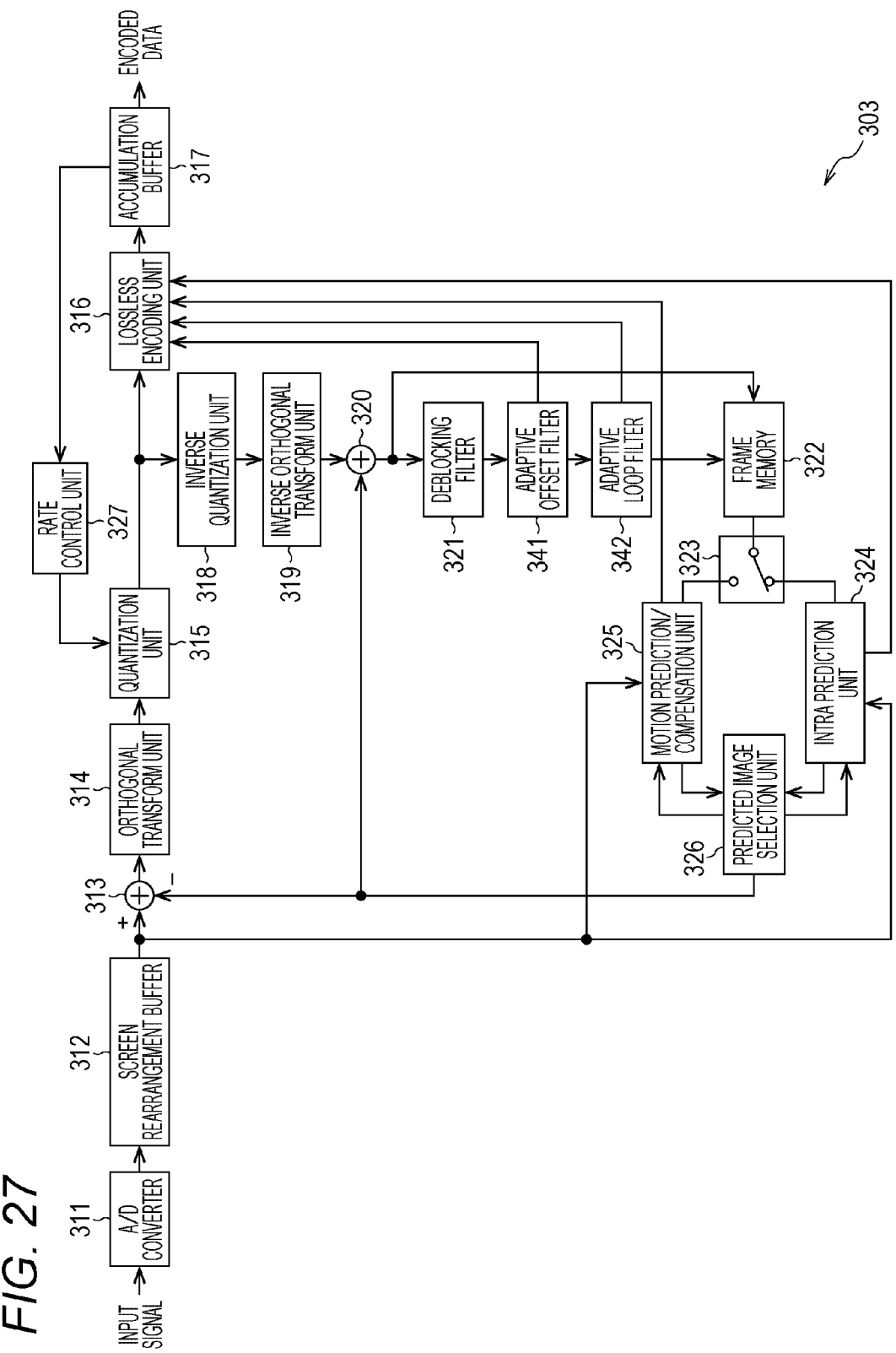
FIG. 27 is a block diagram showing an example structure of the encoding unit.

FIG. 27 is a block diagram showing an example structure of the encoding unit 303 shown in FIG. 26. The encoding unit 303 refers to the SPS, the PPS, the VUI, the SEI, and the like, which have been set by the setting unit 302, as necessary, and encodes an input signal by the HEVC method.

The encoding unit 303 shown in FIG. 26 is designed to include an A/D converter 311, a screen rearrangement buffer 312, an arithmetic operation unit 313, an orthogonal transform unit 314, a quantization unit 315, a lossless encoding unit 316, an accumulation buffer 317, an inverse quantization unit 318, an inverse orthogonal transform unit 319, an addition unit 320, a deblocking filter 321, a frame memory 322, a switch 323, an intra prediction unit 324, a motion prediction/compensation unit 325, a predicted image selection unit 326, and a rate control unit 327.

An adaptive offset filter 341 and an adaptive loop filter 342 are further provided between the deblocking filter 321 and the frame memory 322.

Specifically, the A/D converter 311 of the encoding unit 303 performs A/D conversion on a frame-based image input as an input signal, and outputs and stores the image into the screen rearrangement buffer 312. The screen rearrangement buffer 312 rearranges the frames of the image stored in displaying order, so that the frames of the image are arranged in encoding order in accordance with the GOP (Group of Pictures) structure. The rearranged frame-based image is output to the arithmetic operation unit 313, the intra prediction unit 324, and the motion prediction/compensation unit 325.

The arithmetic operation unit 313 performs encoding by calculating a difference between a predicted image supplied from the predicted image selection unit 326 and an encoding target image output from the screen rearrangement buffer 312. Specifically, the arithmetic operation unit 313 performs encoding by subtracting a predicted image supplied from the predicted image selection unit 326 from an encoding target image output from the screen rearrangement buffer 312. The arithmetic operation unit 313 outputs the resultant image as residual error information to the orthogonal transform unit 314. When any predicted image is not supplied from the predicted image selection unit 326, the arithmetic operation unit 313 outputs an image read from the screen rearrangement buffer 312 as residual error information to the orthogonal transform unit 314.

The orthogonal transform unit 314 performs orthogonal transform on the residual error information supplied from the arithmetic operation unit 313, and supplies the coefficients obtained as a result of the orthogonal transform to the quantization unit 315.

The quantization unit 315 quantizes the coefficients supplied from the orthogonal transform unit 314. The quantized coefficients are input to the lossless encoding unit 316.

The lossless encoding unit 316 acquires, from the intra prediction unit 324, information indicating the optimum intra prediction mode (hereinafter referred to as the intra prediction mode information). The lossless encoding unit 316 also acquires, from the motion prediction/compensation unit 325, information indicating the optimum inter prediction mode (hereinafter referred to as the inter prediction mode information), a motion vector, information for identifying a reference image, and the like. The lossless encoding unit 316 also acquires, from the adaptive offset filter 341, a storage flag, an index or offset, and type information as offset filter information, and acquires filter coefficients from the adaptive loop filter 342.

The lossless encoding unit 316 performs lossless encoding, such as variable-length encoding (CAVLC (Context-Adaptive Variable Length Coding), for example) or arithmetic encoding (CABAC (Context-Adaptive Binary Arithmetic Coding), for example), on the quantized coefficients supplied from the quantization unit 315.

The lossless encoding unit 316 also performs lossless encoding on encoding parameters related to encoding, such as the intra prediction mode information or the inter prediction mode information, the motion vector, the information for identifying a reference image, the offset filter information, and the filter coefficients. The lossless encoding unit 316 supplies the accumulation buffer 317 with the encoding parameters and the coefficients subjected to the lossless encoding as the encoded data to be accumulated. The encoding parameters subjected to the lossless encoding may be set as header information about the coefficients subjected to the lossless encoding.

The accumulation buffer 317 temporarily stores the encoded data supplied from the lossless encoding unit 316. The accumulation buffer 317 supplies the stored encoded data to the setting unit 302 shown in FIG. 3.

The quantized coefficients that are output from the quantization unit 315 are also input to the inverse quantization unit 318, and after inversely quantized, are supplied to the inverse orthogonal transform unit 319.

The inverse orthogonal transform unit 319 performs inverse orthogonal transform on the coefficients supplied from the inverse quantization unit 318, and supplies the resultant residual error information to the addition unit 320.

The addition unit 320 obtains a locally decoded image by adding the residual error information supplied as the decoding target image from the inverse orthogonal transform unit 319 to a predicted image supplied from the predicted image selection unit 326. If any predicted image is not supplied from the predicted image selection unit 326, the addition unit 320 sets the residual error information supplied from the inverse orthogonal transform unit 319 as a locally decoded image. The addition unit 320 supplies the locally decoded image to the deblocking filter 321, and also supplies and stores the locally decoded image into the frame memory 322.

The deblocking filter 321 performs filtering on the locally decoded image supplied from the addition unit 320, to remove block distortions. The deblocking filter 321 supplies the resultant image to the adaptive offset filter 341.

The adaptive offset filter 341 performs an adaptive offset filtering (SAO: Sample Adaptive Offset) process on the image subjected to the adaptive deblocking filtering process by the deblocking filter 321, mainly to remove ringing.

More specifically, the adaptive offset filter 341 determines a type of an adaptive offset filtering process for each LCU (Largest Coding Unit) as the largest unit of encoding, and calculates the offset to be used in the adaptive offset filtering process. Using the calculated offset, the adaptive offset filter 341 performs the adaptive offset filtering process of the determined type on the image subjected to the adaptive deblocking filtering process. The adaptive offset filter 341 then supplies the adaptive loop filter 342 with the image subjected to the adaptive offset filtering process.

The adaptive offset filter 341 includes a buffer that stores offsets. The adaptive offset filter 341 determines, for each LCU, whether the offset used in the adaptive deblocking filtering process is already stored in the buffer.

If the offset used in the adaptive deblocking filtering process is determined to be already stored in the buffer, the adaptive offset filter 341 sets the storage flag, which indicates whether an offset is stored in the buffer, to the value ("1" in this example) indicating that an offset is stored in the buffer.

The adaptive offset filter 341 then supplies, for each LCU, the lossless encoding unit 316 with the storage flag set to "1", the index indicating the storage location of the offset in the buffer, and the type information indicating the type of the performed adaptive offset filtering process.

If the offset used in the adaptive deblocking filtering process is not yet stored in the buffer, on the other hand, the adaptive offset filter 341 sequentially stores the offset into the buffer. The adaptive offset filter 341 also sets the storage flag to the value ("0" in this example) indicating that the offset is not stored in the buffer. The adaptive offset filter 341 then supplies, for each LCU, the lossless encoding unit 316 with the storage flag set to "0", the offset, and the type information.

For each LCU, for example, the adaptive loop filter 342 performs an adaptive loop filtering (ALF) process on the image that is supplied from the adaptive offset filter 341 and has been subjected to the adaptive offset filtering process. As the adaptive loop filtering process, a process involving a two-dimensional Wiener filter is performed, for example. It is of course possible to use a filter other than a Wiener filter.

Specifically, for each LCU, the adaptive loop filter 342 calculates the filter coefficients to be used in the adaptive loop filtering process, so as to minimize the residual error between the original image that is the image output from the screen rearrangement buffer 312 and the image subjected to the adaptive loop filtering process. Using the calculated filter coefficients, the adaptive loop filter 342 performs, for each LCU, the adaptive loop filtering process on the image subjected to the adaptive offset filtering process.

The adaptive loop filter 342 supplies the frame memory 322 with the image subjected to the adaptive loop filtering process. The adaptive loop filter 342 also supplies the filter coefficients to the lossless encoding unit 316.

Although the adaptive loop filtering process is performed for each LCU in this example, the unit of processing in the adaptive loop filtering process is not limited to LCU. However, processing can be efficiently performed where the adaptive offset filter 341 and the adaptive loop filter 342 use the same unit of processing.

The images accumulated in the frame memory 322 are output as reference images to the intra prediction unit 324 or the motion prediction/compensation unit 325 via the switch 323.

Using the reference image that has been read from the frame memory 322 via the switch 323 and has not been filtered with the deblocking filter 321, the intra prediction unit 324 performs an intra prediction process in all candidate intra prediction modes for each tile and each slice.

Based on the image read from the screen rearrangement buffer 312 and the predicted images generated as a result of the intra prediction process, the intra prediction unit 324 calculates cost function values (described later in detail) of all the candidate intra prediction modes. The intra prediction unit 324 then determines the intra prediction mode with the smallest cost function value to be the optimum intra prediction mode.

The intra prediction unit 324 supplies the predicted image generated in the optimum intra prediction mode and the corresponding cost function value to the predicted image selection unit 326. When notified of the selection of the predicted image generated in the optimum intra prediction mode by the predicted image selection unit 326, the intra prediction unit 324 supplies the intra prediction mode information to the lossless encoding unit 316.

It should be noted that a cost function value is also called a RD (Rate Distortion) cost, and is calculated by the technique of High Complexity mode or Low Complexity mode, as specified in the JM (Joint Model), which is the reference software in H.264/AVC, for example.

Specifically, where the High Complexity mode is used as a method of calculating cost function values, operations ending with the lossless encoding are provisionally performed in all candidate prediction modes, and a cost function value expressed by the following equation (6) is calculated for each of the prediction modes.

[Mathematical Formula 6]

$$\text{Cost(Mode)} = D + \lambda \cdot R \quad (6)$$

D represents the difference (distortion) between the original image and the decoded image, R represents the bit generation rate including the orthogonal transform coefficient, and $\lambda$ represents the Lagrange multiplier given as the function of a quantization parameter QP.

Where the Low Complexity mode is used as the method of calculating cost function values, on the other hand, decoded images are generated, and header bits such as information indicating a prediction mode are calculated in all the candidate prediction modes. A cost function value expressed by the following equation (7) is then calculated for each of the prediction modes.

[Mathematical Formula 7]

$$\text{Cost(Mode)} = D + Q P \text{toQuant}(QP) \cdot \text{Header\_Bit} \quad (7)$$

D represents the difference (distortion) between the original image and the decoded image, Header_Bit represents the header bit corresponding to the prediction mode, and QPtoQuant is the function given as the function of the quantization parameter QP.

In the Low Complexity mode, decoded images are simply generated in all the prediction modes, and there is no need to perform lossless encoding. Accordingly, the amount of calculation is small.

The motion prediction/compensation unit 325 performs, for each tile and each slice, a motion prediction/compensation process in all candidate inter prediction modes. Specifically, the motion prediction/compensation unit 325 detects, for each tile and each slice, motion vectors of all the candidate inter prediction modes based on the image supplied from the screen rearrangement buffer 312 and the filtered reference image read from the frame memory 322 via the switch 323. The motion prediction/compensation unit 325 then performs, for each tile and each slice, a compensation process on the reference image based on the motion vectors, and generates predicted images.

At this point, the motion prediction/compensation unit 325 calculates cost function values of all the candidate inter prediction modes based on the image supplied from the screen rearrangement buffer 312 and the predicted images, and determines the inter prediction mode with the smallest cost function value to be the optimum inter prediction mode. The motion prediction/compensation unit 325 then supplies the cost function value of the optimum inter prediction mode and the corresponding predicted image to the predicted image selection unit 326. When notified of the selection of the predicted image generated in the optimum inter prediction mode by the predicted image selection unit 326, the motion prediction/compensation unit 325 outputs the inter prediction mode information, the corresponding motion vector, the information for identifying the reference image, and the like to the lossless encoding unit 316.

Based on the cost function values supplied from the intra prediction unit 324 and the motion prediction/compensation unit 325, the predicted image selection unit 326 determines the optimum prediction mode that is the optimum intra prediction mode or the optimum inter prediction mode, whichever has the smaller cost function value. The predicted image selection unit 326 then supplies the predicted image in the optimum prediction mode to the arithmetic operation unit 313 and the addition unit 320. The predicted image selection unit 326 also notifies the intra prediction unit 324 or the motion prediction/compensation unit 325 of the selection of the predicted image in the optimum prediction mode.

Based on the encoded data accumulated in the accumulation buffer 317, the rate control unit 327 controls the quantization operation rate of the quantization unit 315 so as not to cause an overflow or underflow.

[Description of Processing to be Performed by the Encoding Device]

Figure 28:
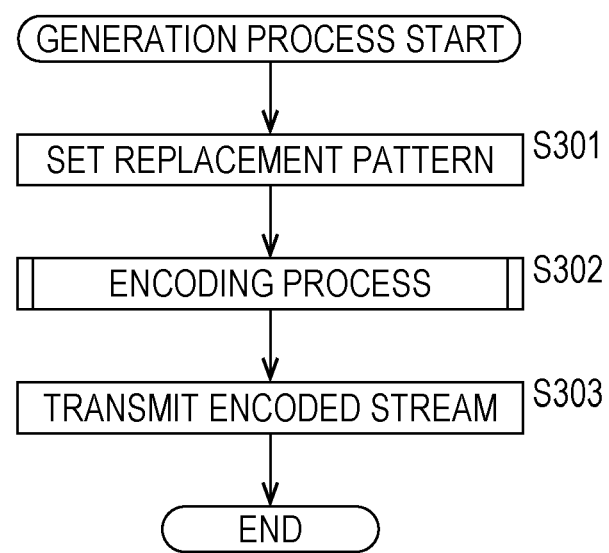
FIG. 28 is a flowchart for explaining a generation process to be performed by the encoding device shown in FIG. 26.

FIG. 28 is a flowchart for explaining a generation process to be performed by the encoding device 301 shown in FIG. 26.

An image such as a frame-based captured image is input as an input signal to the setting unit 302 of the encoding device 301. In step S301 in FIG. 28, the setting unit 302 sets a pixel replacement pattern. Specifically, the setting unit 302 sets an SPS, a PPS, VUI, SEI, and the like. At this point, for the decoded image to be used on the decoding side, the setting unit 302 generates a pixel replacement pattern indicating a pixel value variation distribution, and sets the pixel replacement pattern in the SEI, for example.

For example, the above mentioned equations (1) and (2) or the like are used to generate the pixel replacement pattern.

The setting unit 302 supplies the encoding unit 303 with the SPS, the PPS, the VUI, and the SEI, which have been set, as well as the image.

In step S302, the encoding unit 303 refers to the SPS, the PPS, the VUI, and the SEI, which have been set by the setting unit 302, and encodes an input signal by the HEVC method. This encoding process will be described later in detail, with reference to FIGS. 29 and 30.

The encoding unit 303 then generates an encoded stream from the resultant encoded data, the SPS, the PPS, the VUI, and the SEI, and supplies the generated encoded stream to the transmission unit 304.

In step S303, the transmission unit 304 transmits the encoded stream supplied from the setting unit 302 to the decoding device 50 shown in FIG. 31, which will be described later, and the process comes to an end.

[Example of the Encoding Process]

Figure 29:
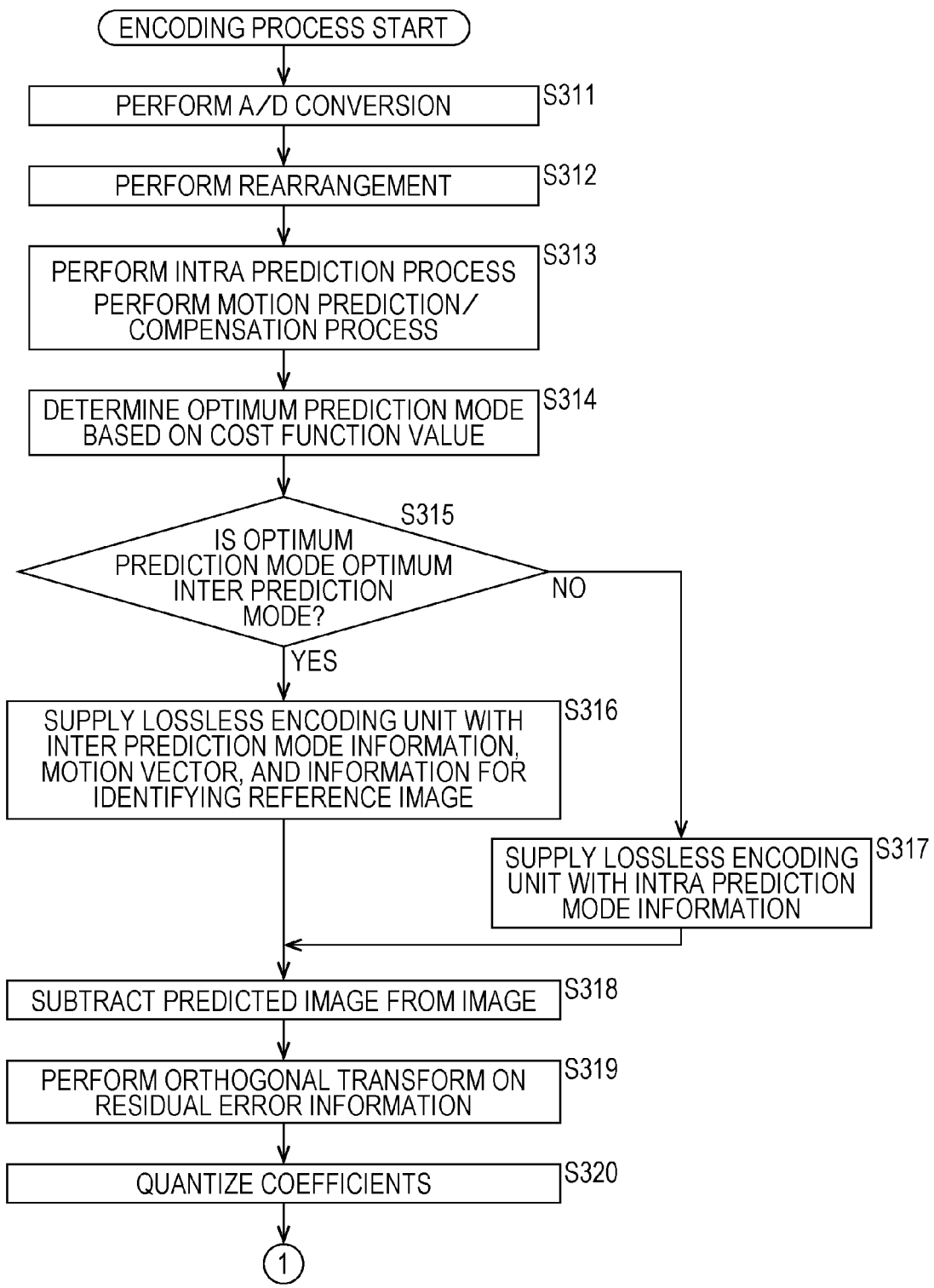
FIG. 29 is a flowchart for explaining an encoding process.
Figure 30:
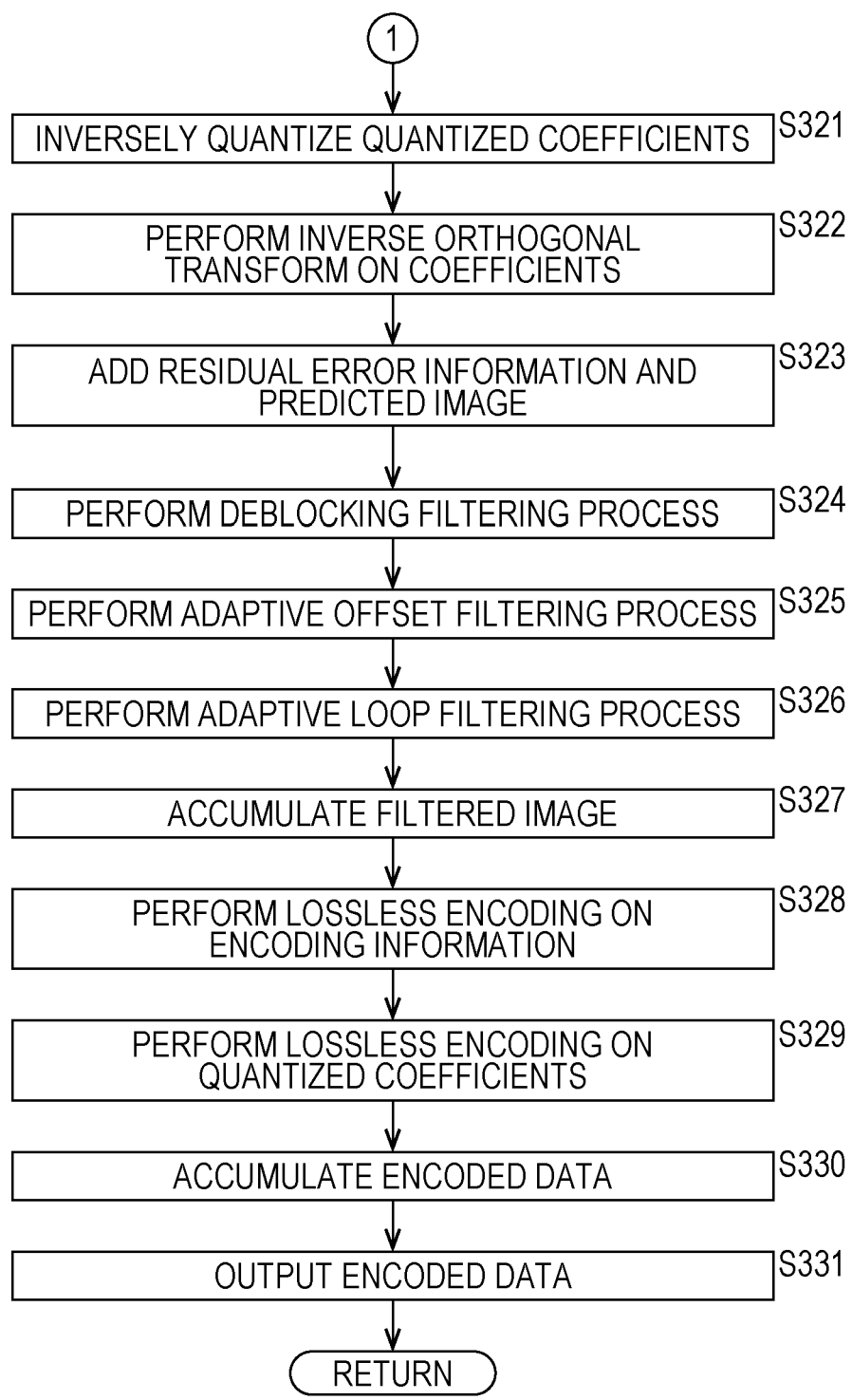
FIG. 30 is a flowchart for explaining the encoding process.

Referring now to the flowchart in FIGS. 29 and 30, the encoding process in step S302 in FIG. 28 is described in detail.

In step S311 in FIG. 29, the A/D converter 311 of the encoding unit 303 performs A/D conversion on a frame-based image input as an input signal, and outputs and stores the image into the screen rearrangement buffer 312.

In step S312, the screen rearrangement buffer 312 rearranges the frames of the image stored in displaying order, so that the frames of the image are arranged in encoding order in accordance with the GOP (Group of Pictures) structure. The screen rearrangement buffer 312 supplies the rearranged frame-based image to the arithmetic operation unit 313, the intra prediction unit 324, and the motion prediction/compensation unit 325. It should be noted that the procedures in steps S313 through S331 described below are carried out for each CU (Coding Unit), for example.

In step S313, the intra prediction unit 324 performs an intra prediction process in all candidate intra prediction modes. Based on the image read from the screen rearrangement buffer 312 and the predicted images generated as a result of the intra prediction process, the intra prediction unit 324 calculates cost function values of all the candidate intra prediction modes. The intra prediction unit 324 then determines the intra prediction mode with the smallest cost function value to be the optimum intra prediction mode. The intra prediction unit 324 supplies the predicted image generated in the optimum intra prediction mode and the corresponding cost function value to the predicted image selection unit 326.

The motion prediction/compensation unit 325 performs a motion prediction/compensation process in all candidate inter prediction modes. The motion prediction/compensation unit 325 also calculates cost function values of all the candidate inter prediction modes based on the image supplied from the screen rearrangement buffer 312 and the predicted images, and determines the inter prediction mode with the smallest cost function value to be the optimum inter prediction mode. The motion prediction/compensation unit 325 then supplies the cost function value of the optimum inter prediction mode and the corresponding predicted image to the predicted image selection unit 326.

In step S314, based on the cost function values supplied from the intra prediction unit 324 and the motion prediction/compensation unit 325 through the procedure in step S313, the predicted image selection unit 326 determines the optimum prediction mode that is the optimum intra prediction mode or the optimum inter prediction mode, whichever has the smaller cost function value. The predicted image selection unit 326 then supplies the predicted image in the optimum prediction mode to the arithmetic operation unit 313 and the addition unit 320.

In step S315, the predicted image selection unit 326 determines whether the optimum prediction mode is the optimum inter prediction mode. If the optimum prediction mode is determined to be the optimum inter prediction mode in step S315, the predicted image selection unit 326 notifies the motion prediction/compensation unit 325 of selection of the predicted image generated in the optimum inter prediction mode.

In step S316, the motion prediction/compensation unit 325 supplies the lossless encoding unit 316 with the inter prediction mode information, the corresponding motion vector, and the information for identifying the reference image. The process then moves on to step S318.

If the optimum prediction mode is determined not to be the optimum inter prediction mode in step S315, or if the optimum prediction mode is the optimum intra prediction mode, on the other hand, the predicted image selection unit 326 notifies the intra prediction unit 324 of selection of the predicted image generated in the optimum intra prediction mode.

In step S317, the intra prediction unit 324 supplies the intra prediction mode information to the lossless encoding unit 316. The process then moves on to step S318.

In step S318, the arithmetic operation unit 313 performs encoding by subtracting the predicted image supplied from the predicted image selection unit 326 from the image supplied from the screen rearrangement buffer 312. The arithmetic operation unit 313 outputs the resultant image as residual error information to the orthogonal transform unit 314.

In step S319, the orthogonal transform unit 314 performs orthogonal transform on the residual error information supplied from the arithmetic operation unit 313, and supplies the resultant coefficients to the quantization unit 315.

In step S320, the quantization unit 315 quantizes the coefficients supplied from the orthogonal transform unit 314. The quantized coefficients are input to the lossless encoding unit 316 and the inverse quantization unit 318.

In step S321 in FIG. 30, the inverse quantization unit 318 inversely quantizes the quantized coefficients supplied from the quantization unit 315.

In step S322, the inverse orthogonal transform unit 319 performs inverse orthogonal transform on the coefficients supplied from the inverse quantization unit 318, and supplies the resultant residual error information to the addition unit 320.

In step S323, the addition unit 320 adds the residual error information supplied from the inverse orthogonal transform unit 319 to the predicted image supplied from the predicted image selection unit 326, and obtains a locally decoded image. The addition unit 320 supplies the obtained image to the deblocking filter 321, and also supplies the obtained image to the frame memory 322.

In step S324, the deblocking filter 321 performs a deblocking filtering process on the locally decoded image supplied from the addition unit 320. The deblocking filter 321 supplies the resultant image to the adaptive offset filter 341.

In step S325, the adaptive offset filter 341 performs, for each LCU, an adaptive offset filtering process on the image supplied from the deblocking filter 321. The adaptive offset filter 341 supplies the resultant image to the adaptive loop filter 342. The adaptive offset filter 341 also supplies the lossless encoding unit 316 with the storage flag, the index or offset, and the type information as the offset filter information for each LCU.

In step S326, the adaptive loop filter 342 performs, for each LCU, an adaptive loop filtering process on the image supplied from the adaptive offset filter 341. The adaptive loop filter 342 supplies the resultant image to the frame memory 322. The adaptive loop filter 342 also supplies the lossless encoding unit 316 with the filter coefficients used in the adaptive loop filtering process.

In step S327, the frame memory 322 accumulates the filtered image and the unfiltered image. Specifically, the frame memory 322 accumulates the image supplied from the addition unit 320 and the image supplied from the adaptive loop filter 342. The images accumulated in the frame memory 322 are output as reference images to the intra prediction unit 324 or the motion prediction/compensation unit 325 via the switch 323.

In step S328, the lossless encoding unit 316 performs lossless encoding on encoding parameters, such as the intra prediction mode information or the inter prediction mode information, the motion vector, the information for identifying a reference image, the offset filter information, and the filter coefficients.

In step S329, the lossless encoding unit 316 performs lossless encoding on the quantized coefficients supplied from the quantization unit 315. The lossless encoding unit 316 then generates encoded data from the encoding parameters subjected to the lossless encoding and the coefficients subjected to the lossless encoding through the procedure in step S328.

In step S330, the lossless encoding unit 316 supplies the encoded data to the accumulation buffer 317 and causes the accumulation buffer 317 to accumulate the encoded data.

In step S331, the accumulation buffer 317 generates an encoded stream from the accumulated encoded data, the SPS, the PPS, the VUI, and the SEI, and supplies the generated encoded stream to the transmission unit 304 shown in FIG. 26. The process then returns to step S302 in FIG. 28, and moves on to step S303.

For ease of explanation, the intra prediction process and the motion prediction/compensation process are constantly performed in the encoding process shown in FIGS. 29 and 30. In practice, however, there are cases where only one of the processes is performed depending on a picture type or the like.

[Another Example Structure of the Decoding Device]

Figure 31:
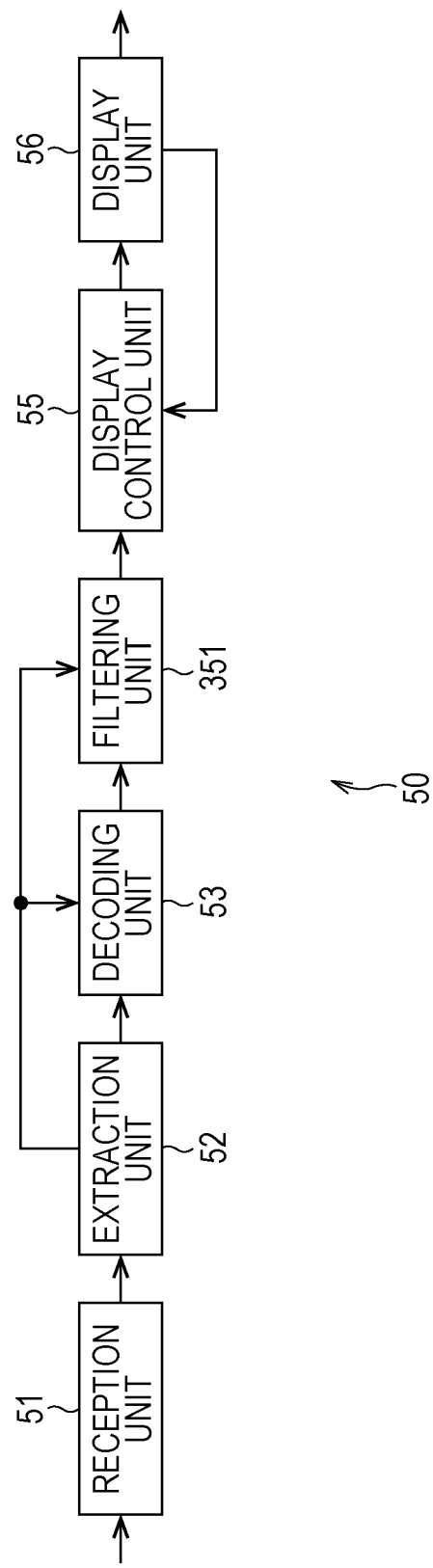
FIG. 31 is a block diagram showing another example structure of a decoding device to which the present technique is applied.

FIG. 31 is a block diagram showing an example structure of the decoding device that decodes an encoded stream transmitted from the encoding device 301 shown in FIG. 26, the decoding device being an image processing device to which the present technique is applied. That is, the decoding device shown in FIG. 31 is another example structure of the decoding device shown in FIG. 2.

Like the decoding device 50 shown in FIG. 2, the decoding device 50 shown in FIG. 31 includes a reception unit 51, an extraction unit 52, a decoding unit 53, a display control unit 55, and a display unit 56. The decoding device 50 shown in FIG. 31 differs from the decoding device 50 shown in FIG. 2 in that the filtering unit 54 is replaced with a filtering unit 351.

Specifically, the reception unit 51 receives an encoded stream transmitted from the encoding device 301 shown in FIG. 26, and supplies the encoded stream to the extraction unit 52. In the SEI of this encoded stream, a pixel replacement pattern is set. The extraction unit 52 extracts an SPS, a PPS, VUI, SEI, encoded data, and the like from the encoded stream supplied from the reception unit 51. At this point, pixel replacement pattern information is also extracted from the SEI, and is supplied to the filtering unit 351.

Based on the SPS, the PPS, the VUI, and the SEI supplied from the extraction unit 52, and the encoding parameters and the like supplied from the decoding unit 53, the filtering unit 351 performs pixel-replacing filtering on a decoded image supplied as an output signal from the decoding unit 53, using the replacement pattern information supplied from the extraction unit 52. The filtering unit 351 supplies the image, which has been subjected to the filtering, to the display control unit 55.

[Another Example Structure of the Filtering Unit]

Figure 32:
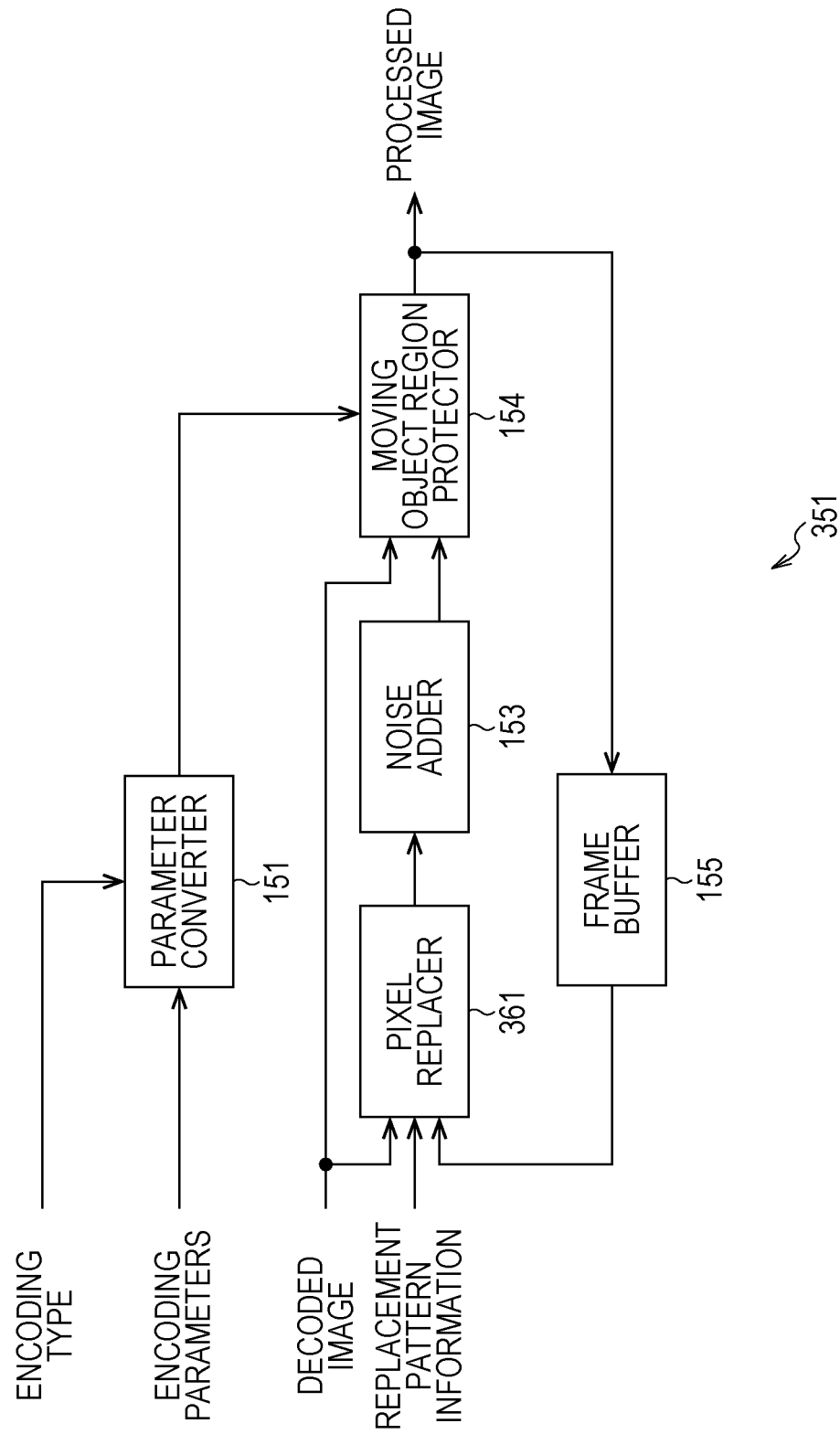
FIG. 32 is a block diagram showing an example structure of the filtering unit shown in FIG. 31.

FIG. 32 is a block diagram showing an example structure of the filtering unit shown in FIG. 31.

Like the filtering unit 54 shown in FIG. 10, the filtering unit 351 shown in FIG. 32 includes a parameter converter 151, a pixel replacer 152, a noise adder 153, a moving object region protector 154, and a frame buffer 155. The filtering unit 351 shown in FIG. 32 differs from the filtering unit 54 shown in FIG. 10 in that the pixel replacer 152 is replaced with a pixel replacer 361.

Specifically, while the pixel replacer 152 shown in FIG. 10 generates a pixel replacement pattern, the pixel replacer 361 shown in FIG. 32 receives the pixel replacement pattern information that is set in the encoded stream supplied from the encoding device 301 and is extracted by the extraction unit 52. Using the pixel replacement pattern information, the pixel replacer 361 shown in FIG. 32 performs a process of replacing the pixels of a processed image of the previous frame with the pixels of the decoded image in a constant cycle. The pixel replacer 361 supplies the processed image to the noise adder 153.

[Another Example Structure of the Pixel Replacer]

Figure 33:
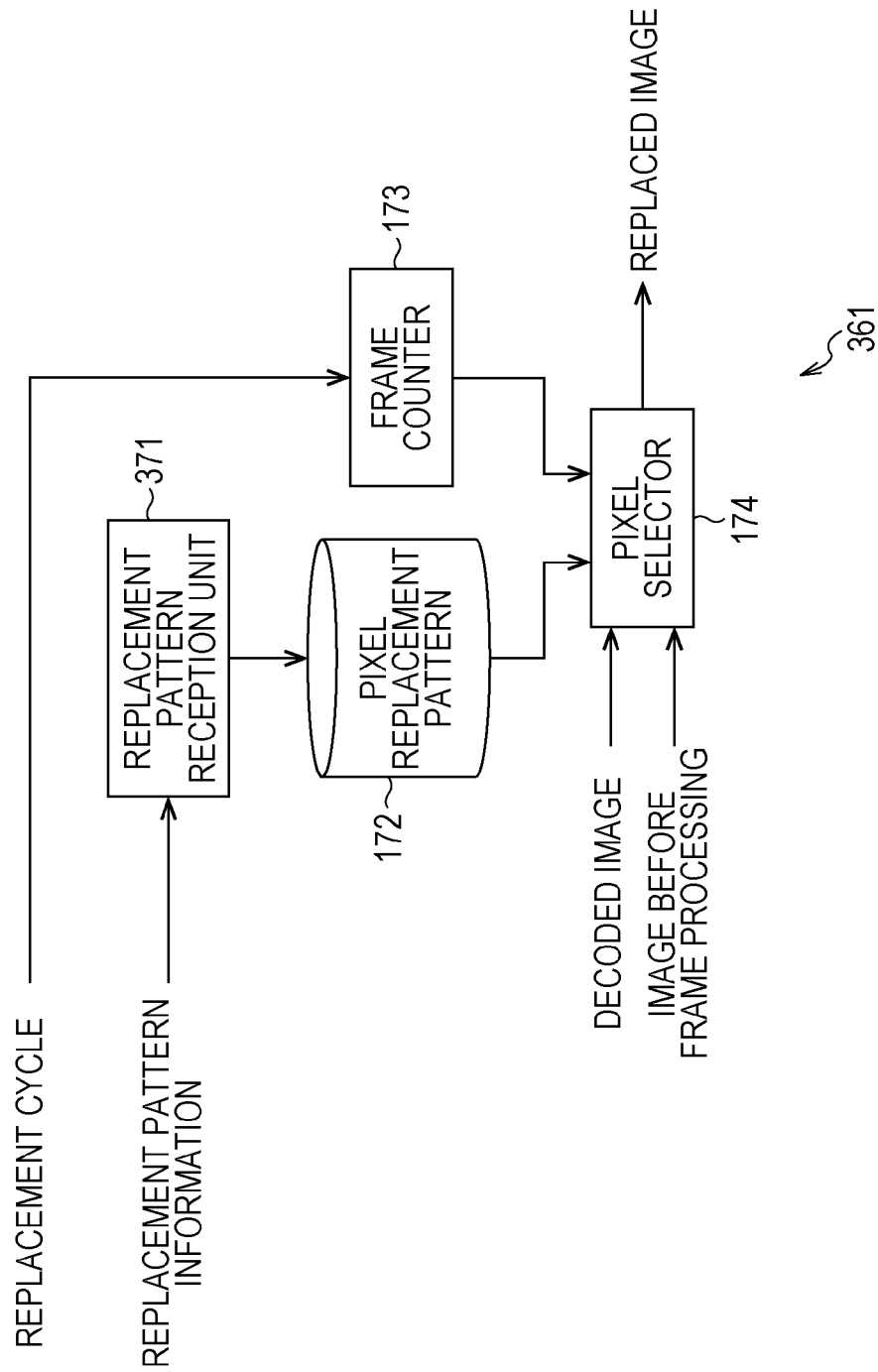
FIG. 33 is a block diagram showing an example structure of the pixel replacer.

FIG. 33 is a block diagram showing another example structure of the pixel replacer shown in FIG. 32.

Like the pixel replacer 152 shown in FIG. 12, the pixel replacer 361 shown in FIG. 33 includes a pixel replacement pattern recording buffer 172, a frame counter 173, and a pixel selector 174. The pixel replacer 361 shown in FIG. 33 differs from the pixel replacer 152 shown in FIG. 12 in that the replacement pattern generator 171 is replaced with a replacement pattern reception unit 371.

Specifically, the replacement pattern reception unit 371 receives the pixel replacement pattern information extracted from the encoding parameters by the extraction unit 52 shown in FIG. 31. The replacement pattern reception unit 371 records the received pixel replacement pattern into the pixel replacement pattern recording buffer 172.

Using this pixel replacement pattern, the pixel selector 174 performs a pixel replacement process.

[Operation of the Decoding Device]

Figure 34:
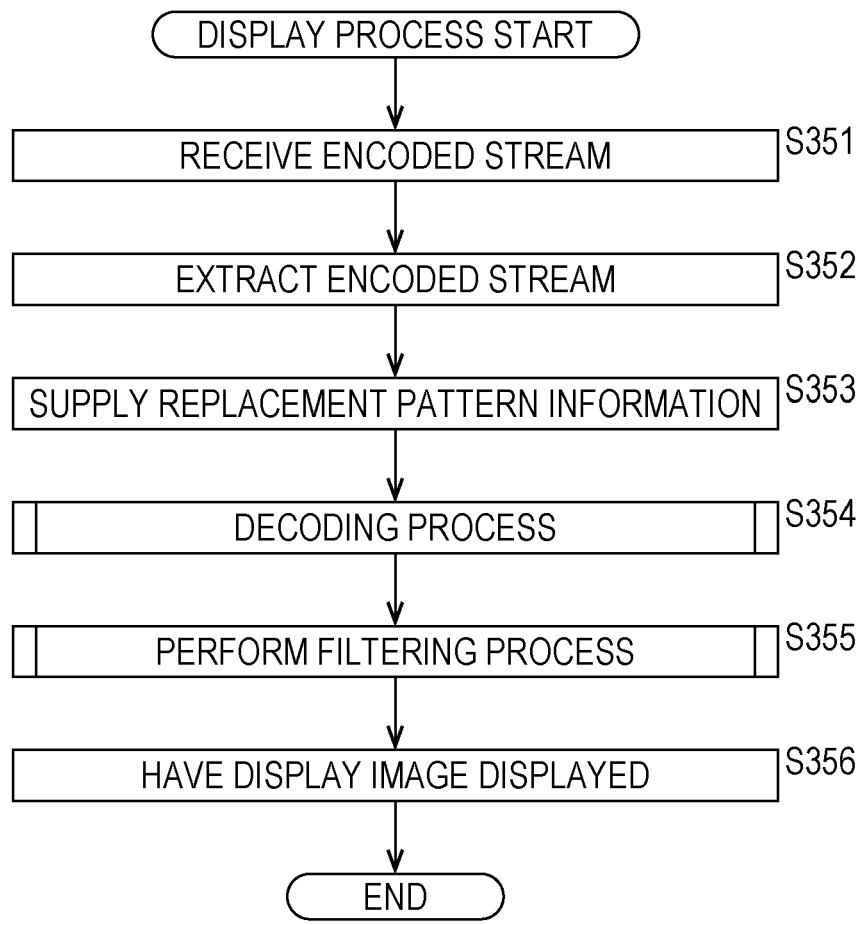
FIG. 34 is a flowchart for explaining a display process to be performed by the decoding device shown in FIG. 31.

Referring now to the flowchart in FIG. 34, a display process to be performed by the decoding device 50 shown in FIG. 31 is described. This display process is another example of the display process described above with reference to FIG. 15.

In step S351, the reception unit 51 shown in FIG. 31 receives an encoded stream transmitted from the encoding device 301 shown in FIG. 26, and supplies the encoded stream to the extraction unit 52.

In step S352, the extraction unit 52 extracts an SPS, a PPS, VUI, and SEI, encoded data, and the like from the encoded stream supplied from the reception unit 51. In doing so, the extraction unit 52 extracts the pixel replacement pattern information from the SEI. The extraction unit 52 supplies the encoded data to the decoding unit 53. The extraction unit 52 also supplies the SPS, the PPS, the VUI, the SEI, and the like to the decoding unit 53 and the filtering unit 54 as necessary.

In step S353, the extraction unit 52 supplies the pixel replacement pattern information extracted from the SEI to the filtering unit 351.

In step S354, the decoding unit 53 refers to the SPS, the PPS, the VUI, the SEI, and the like supplied from the extraction unit 52 as necessary, and performs a decoding process to decode the encoded data supplied from the extraction unit 52 by the HEVC method. This decoding process is basically the same as the decoding process described above with reference to FIG. 16; therefore, explanation thereof is not repeated herein. The decoding unit 53 supplies the filtering unit 54 with the decoded image subjected to the decoding process and the encoding parameters used in the encoding.

In step S355, based on the SPS, the PPS, the VUI, and the SEI supplied from the extraction unit 52, and the encoding parameters and the like supplied from the decoding unit 53, the filtering unit 54 performs pixel-replacing filtering on the decoded image supplied as an output signal from the decoding unit 53, using the replacement pattern supplied in step S353. This filtering process will be described later in detail with reference to FIG. 35. The filtering unit 54 supplies the image, which has been subjected to the filtering, to the display control unit 55.

In step S356, based on the image supplied from the filtering unit 54, the display control unit 55 generates a display image, and supplies the generated display image to the display unit 56, to cause the display unit 56 to display the display image. The process then comes to an end.

[Example of the Filtering Process]

Figure 35:
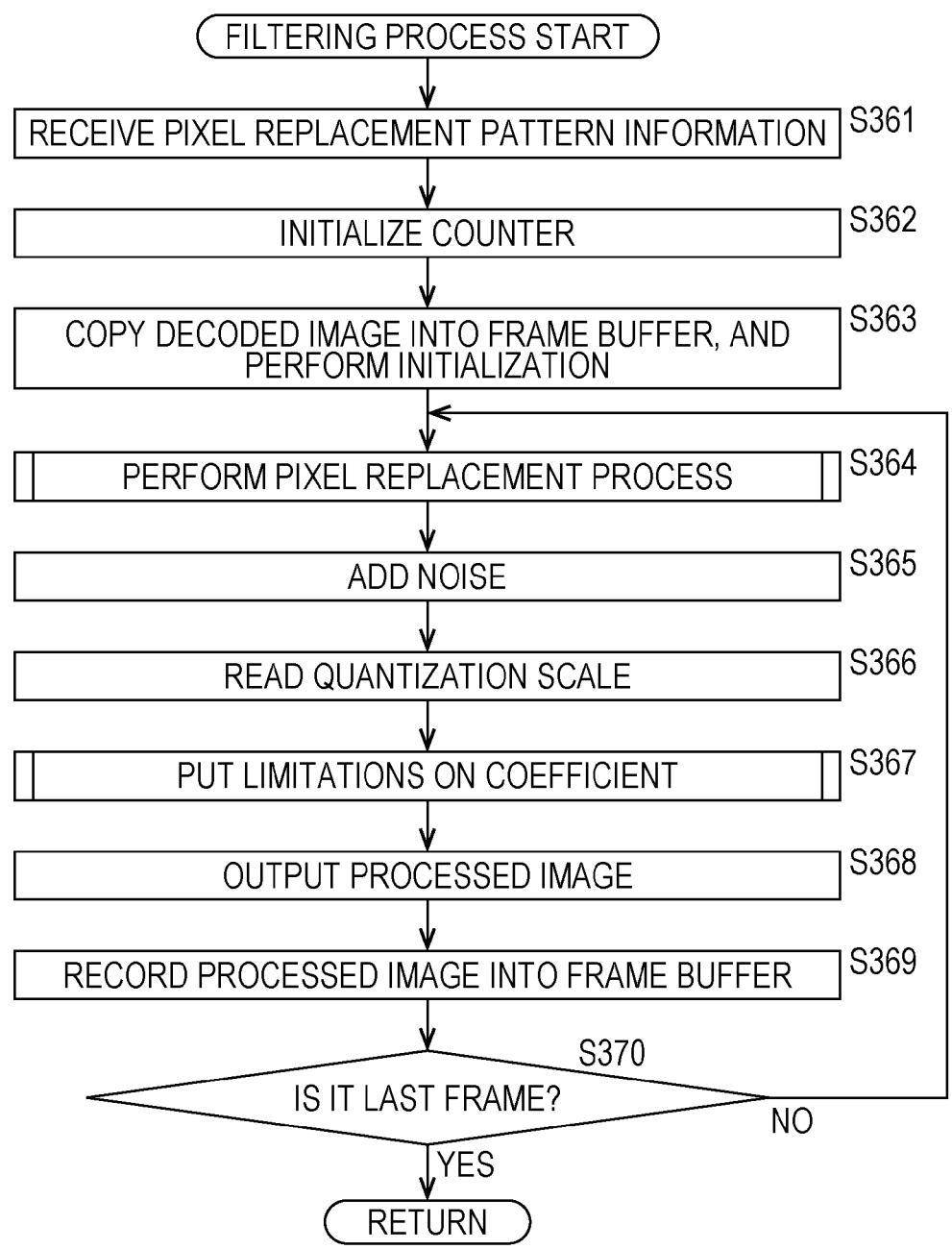
FIG. 35 is a flowchart for explaining a filtering process to be performed by the filtering unit shown in FIG. 32.

Referring now to the flowchart in FIG. 35, the filtering process in step S355 in FIG. 34 is described.

The pixel replacement pattern information is supplied in step S353 in FIG. 34. In step S361, the replacement pattern reception unit 371 receives the pixel replacement pattern information. The replacement pattern reception unit 371 records the received pixel replacement pattern into the pixel replacement pattern recording buffer 172.

Steps S362 through S370 in FIG. 35 are basically the same procedures as those in steps S132 through S140 in FIG. 17; therefore, explanation of them is not repeated herein.

As described above, the pixel replacement pattern information that is generated and set on the encoding side can be received and used on the decoding side.

Although the generated or received pixel replacement pattern is recorded and then used in the above described example, pixels may be replaced totally at random.

As described above, the present technique can reduce heartbeat noise, or noise that is generated in synchronization with the intraframe appearance cycle, without causing a subjective feeling of strangeness. Also, through the moving object protection using bit stream information, moving objects can be prevented from breaking.

Furthermore, as the moving object protection (the clipping process) is performed, the results of processing can be made to fall within a certain variation range with respect to a decoded image, even if a relatively large change or image quality adjustment is made to the image.

With this, block noise and mosquito noise can also be reduced. Also, texture can be improved at flat portions and portions where texture is degraded by compression.

The present technique may be combined with noise reduction in a temporal direction.

Although the HEVC method is basically used as the encoding method in the above described example, the present technique is a technique involving display, and is not limited to the encoding method. Therefore, in the present technique, not only the HEVC method but also some other encoding/decoding method can be used. For example, the present invention can be applied to devices that perform an encoding/decoding process by the AVC method as described below.

Fourth Embodiment

[Another Example Structure of the Decoding Unit]

Figure 36:
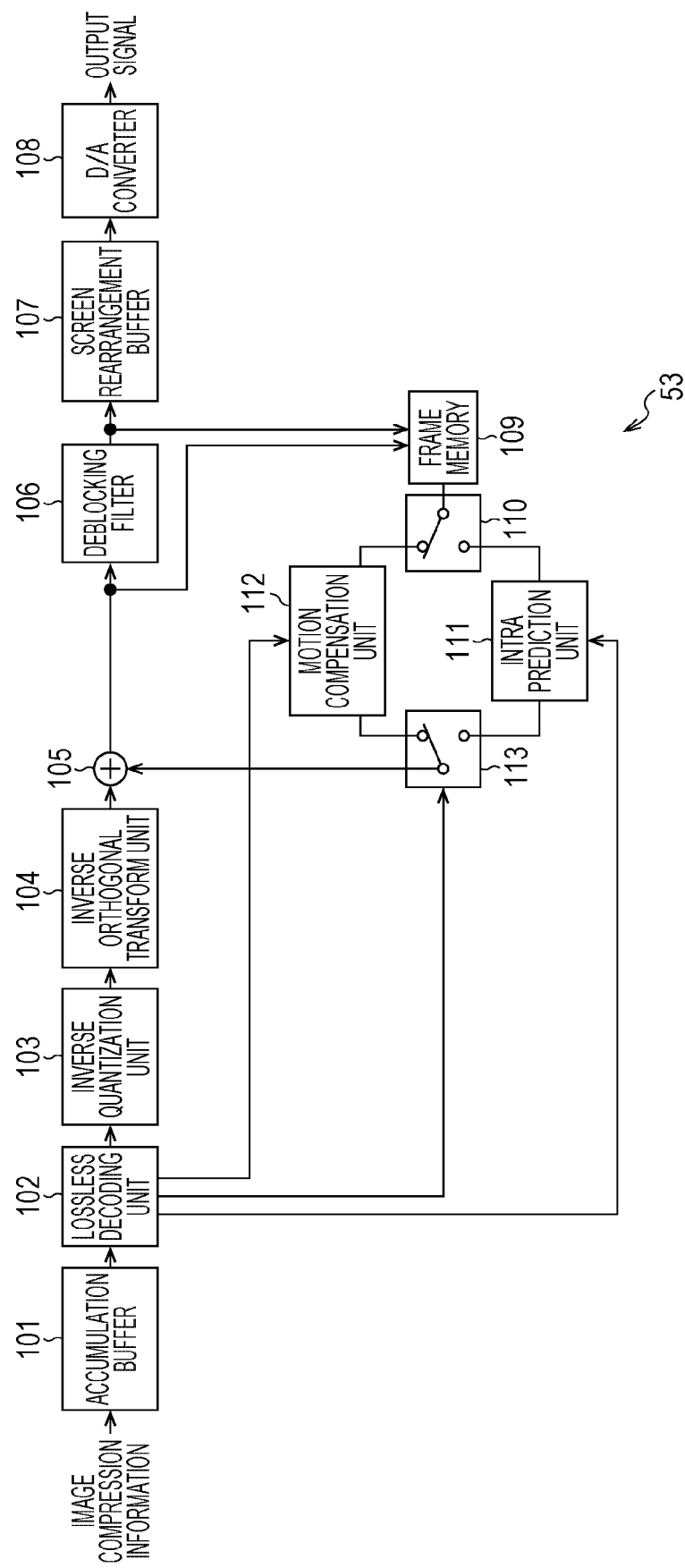
FIG. 36 is a block diagram showing yet another example structure of a decoding device to which the present technique is applied.

FIG. 36 is a block diagram showing another example structure of the decoding unit shown in FIG. 2. The decoding unit 53 shown in FIG. 36 differs from the decoding unit 53 shown in FIG. 3 only in performing a decoding process according to the AVC method.

In the structure shown in FIG. 36, the same components as those in FIG. 3 are denoted by the same reference numerals as those in FIG. 3. The explanations that have already been made will not be repeated.

The decoding unit 53 shown in FIG. 36 includes an accumulation buffer 101, a lossless decoding unit 102, an inverse quantization unit 103, an inverse orthogonal transform unit 104, an addition unit 105, a deblocking filter 106, a screen rearrangement buffer 107, a D/A converter 108, a frame memory 109, a switch 110, an intra prediction unit 111, a motion compensation unit 112, and a switch 113.

The structure of the decoding unit 53 shown in FIG. 36 differs from the structure shown in FIG. 3 only in that the adaptive offset filter 141 and the adaptive loop filter 142 are not included, and the lossless decoding unit 102 performs decoding not by the HEVC method but by the AVC method. Therefore, in the decoding unit 53, a decoding process is performed not on a CU-by-CU basis but on a block-by-block basis.

The objects to be subjected to the decoding process by the lossless decoding unit 102 are basically the same as those in the case of the lossless decoding unit 102 shown in FIG. 3, except for the parameters of the adaptive offset filter and the adaptive loop filter. Specifically, like the lossless decoding unit 102 shown in FIG. 3, the lossless decoding unit 102 obtains quantized coefficients and encoding parameters by performing lossless decoding such as variable-length decoding or arithmetic decoding on encoded data supplied from the accumulation buffer 101. The lossless decoding unit 102 supplies the quantized coefficients to the inverse quantization unit 103.

Like the lossless decoding unit 102 shown in FIG. 3, the lossless decoding unit 102 also supplies the intra prediction unit 111 with intra prediction mode information as an encoding parameter and the like, and supplies the motion compensation unit 112 with a motion vector, information for identifying a reference image, inter prediction mode information, and the like. The lossless decoding unit 102 further supplies the switch 113 with the intra prediction mode information or the inter prediction mode information as an encoding parameter. The encoding parameters are also supplied to the filtering unit 54 in a later stage.

The deblocking filter 106 performs filtering on the image supplied from the addition unit 105, to remove block distortions. The deblocking filter 106 supplies the resultant image to the frame memory 109 and the screen rearrangement buffer 107.

The present technique can also be applied to a decoding device that includes such a decoding unit 53 of an AVC type.

[Another Example Structure of the Encoding Unit]

Figure 37:
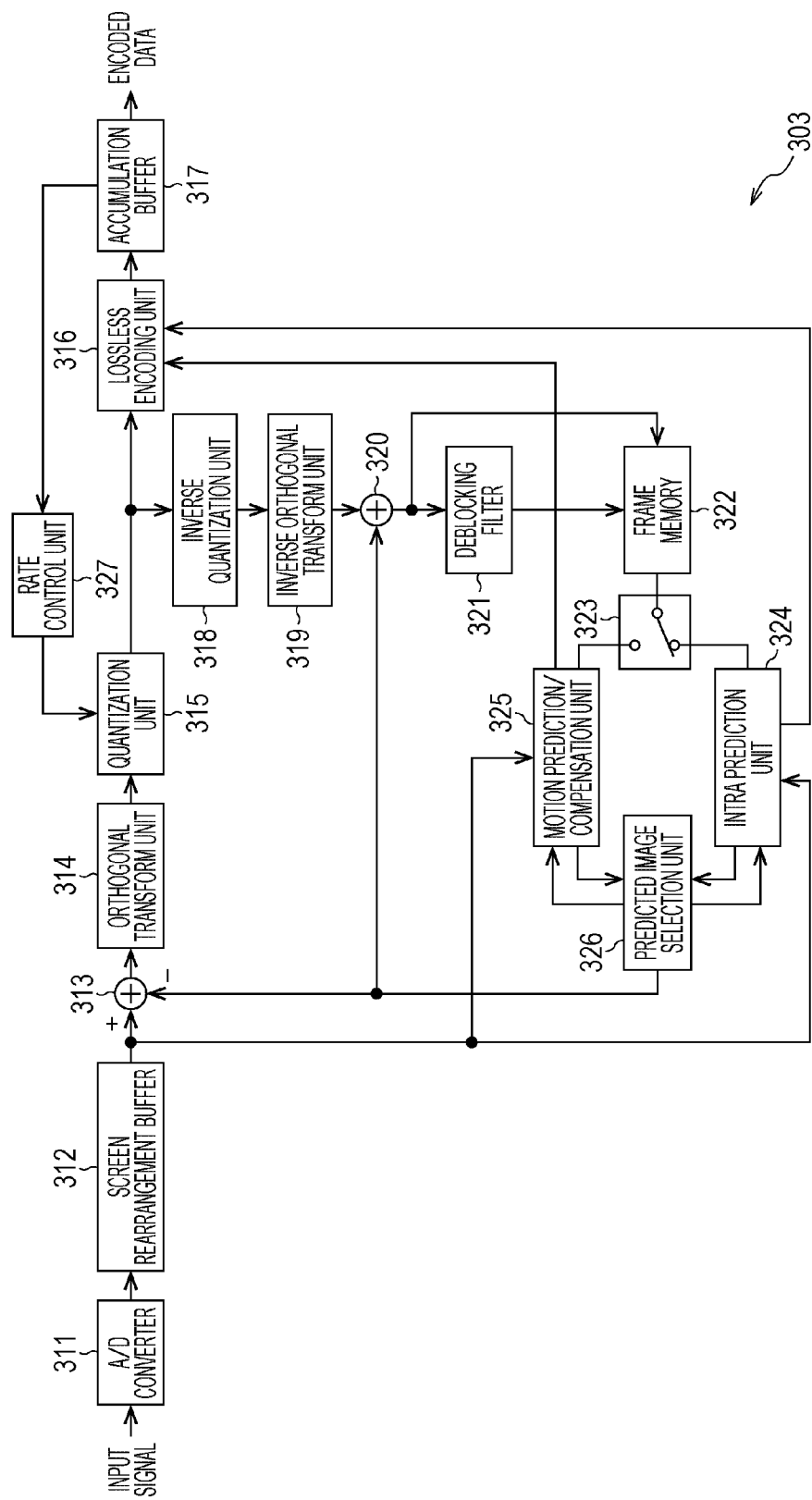
FIG. 37 is a block diagram showing another example structure of an encoding device to which the present technique is applied.

FIG. 37 is a block diagram showing another example structure of the encoding unit shown in FIG. 26. The encoding unit 303 shown in FIG. 37 differs from the encoding unit 303 shown in FIG. 27 only in performing an encoding process according to the AVC method.

In the structure shown in FIG. 37, the same components as those in FIG. 27 are denoted by the same reference numerals as those in FIG. 27. The explanations that have already been made will not be repeated.

The encoding unit 303 shown in FIG. 37 is designed to include an A/D converter 311, a screen rearrangement buffer 312, an arithmetic operation unit 313, an orthogonal transform unit 314, a quantization unit 315, a lossless encoding unit 316, an accumulation buffer 317, an inverse quantization unit 318, an inverse orthogonal transform unit 319, an addition unit 320, a deblocking filter 321, a frame memory 322, a switch 323, an intra prediction unit 324, a motion prediction/compensation unit 325, a predicted image selection unit 326, and a rate control unit 327.

The structure of the encoding unit 303 shown in FIG. 37 differs from the structure shown in FIG. 27 only in that the adaptive offset filter 341 and the adaptive loop filter 342 are not included, and the lossless encoding unit 316 performs encoding not by the HEVC method but by the AVC method. Therefore, in the encoding unit 303, an encoding process is performed not on a CU-by-CU basis but on a block-by-block basis.

The objects to be subjected to the encoding process by the lossless encoding unit 316 are basically the same as those in the case of the lossless encoding unit 316 shown in FIG. 27, except for the parameters of the adaptive offset filter and the adaptive loop filter. Specifically, like the lossless encoding unit 316 shown in FIG. 27, the lossless encoding unit 316 acquires intra prediction mode information from the intra prediction unit 324. The lossless encoding unit 316 also acquires, from the motion prediction/compensation unit 325, inter prediction mode information, a motion vector, information for identifying a reference image, and the like.

Like the lossless encoding unit 316 shown in FIG. 27, the lossless encoding unit 316 performs lossless encoding such as variable-length encoding (CAVLC, for example) or arithmetic encoding (CABAC, for example) on the quantized coefficients supplied from the quantization unit 315.

Like the lossless encoding unit 316 shown in FIG. 27, the lossless encoding unit 316 also performs lossless encoding on encoding parameters related to encoding, such as the intra prediction mode information or the inter prediction mode information, the motion vector, the information for identifying a reference image, the offset filter information, and the filter coefficients. The lossless encoding unit 316 supplies the accumulation buffer 317 with the encoding parameters and the coefficients subjected to the lossless encoding as the encoded data to be accumulated. The encoding parameters subjected to the lossless encoding may be set as header information about the coefficients subjected to the lossless encoding.

The deblocking filter 321 performs filtering on the locally decoded image supplied from the addition unit 320, to remove block distortions. The deblocking filter 321 supplies and stores the resultant image into the frame memory 322.

The images accumulated in the frame memory 322 are output as reference images to the intra prediction unit 324 or the motion prediction/compensation unit 325 via the switch 323.

The present technique can also be applied to an encoding device that includes such an encoding unit 303 of an AVC type.

Although heartbeat noise is reduced in the above described examples, a processed image of the previous frame is required in reducing heartbeat noise as described above. Therefore, in a case where the filtering unit 54 shown in FIG. 10 is formed with hardware, for example, the frame buffer 155 serving as the storage unit to accumulate required processed images of the previous frame is prepared in a DRAM (Dynamic Random Access Memory) outside the chip. When a processed image of the previous frame is used, the DRAM is accessed, resulting in an increase in the DRAM bandwidth. In terms of hardware, the cost of access to the DRAM is increased.

With attention being paid to the fact that heartbeat noise concentrates mainly in the low-frequency component in an image, an image is separated into the high-frequency component (high-frequency image) and the low-frequency component (low-frequency image), and a heartbeat noise reduction process is performed only on the low-frequency component (low-frequency image). This example of the present technique is described below.

Fifth Embodiment

[Another Example Structure of the Filtering Unit]

Figure 38:
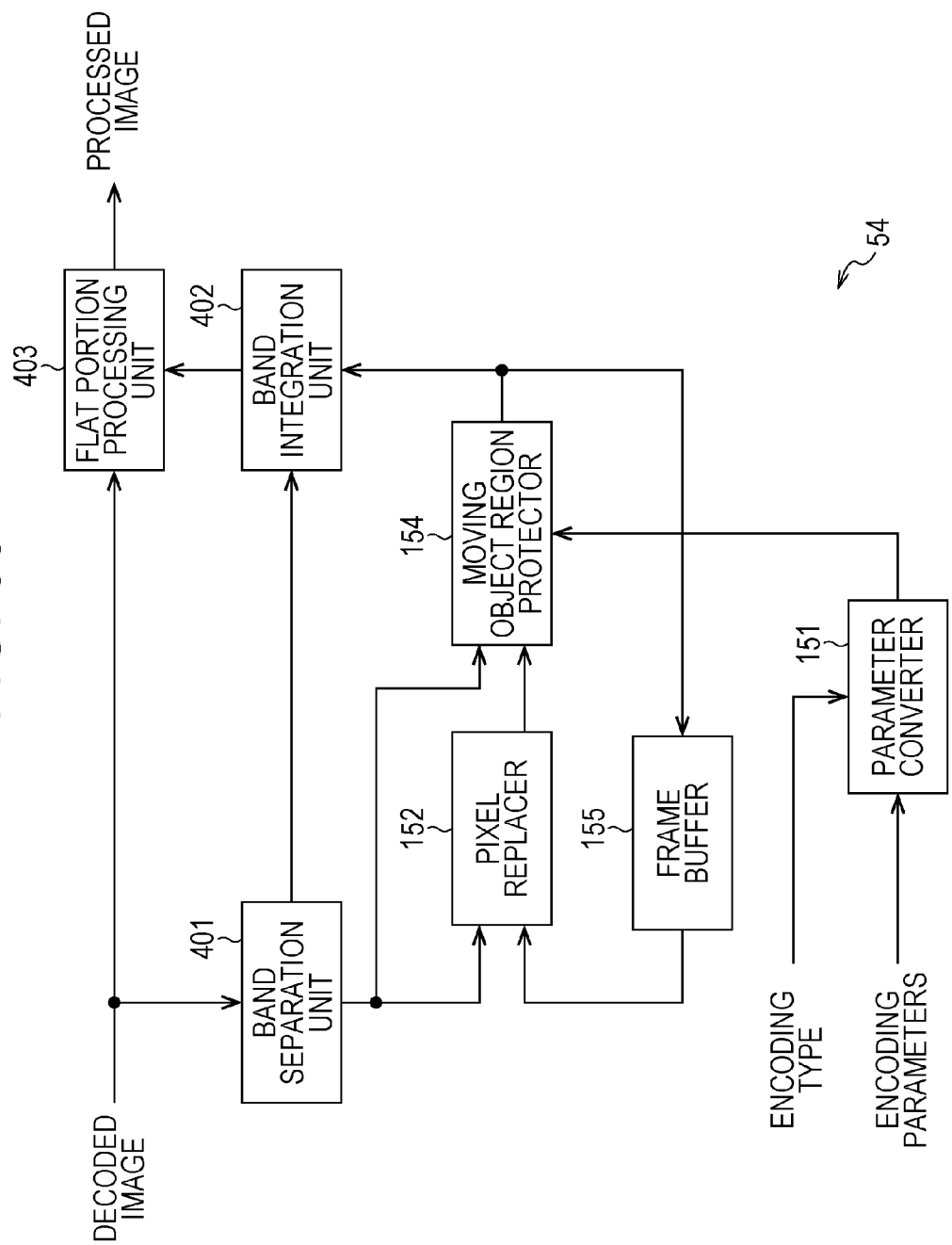
FIG. 38 is a block diagram showing yet another example structure of the filtering unit.

FIG. 38 is a block diagram showing an example structure of the filtering unit 54 shown in FIG. 2.

The filtering unit 54 shown in FIG. 38 differs from the filtering unit 54 shown in FIG. 10 in that the noise adder 153 is not included, and a band separation unit 401, a band integration unit 402, and a flat portion processing unit 403 are added. Like the filtering unit 54 shown in FIG. 10, the filtering unit 54 shown in FIG. 38 includes a parameter converter 151, a pixel replacement unit 152, a moving object region protector 154, and a frame buffer 155. The noise addition unit 153 is not included for ease of explanation, and the noise addition unit 153 may be included.

Specifically, an encoding type from outside and encoding parameters from the decoding unit 53 shown in FIG. 2 are input to the parameter converter 151.

Like the parameter converter 151 shown in FIG. 10, the parameter converter 151 converts the encoding parameters (particularly, the quantization scale) of the decoding unit 53 in accordance with the encoding type indicating the type of the encoding used in encoded stream generation. The parameter converter 151 supplies the converted encoding parameters to the moving object region protector 154.

A decoded image from the decoding unit 53 is input to the band separation unit 401 and the flat portion processing unit 403. The band separation unit 401 separates the input decoded image into the high-frequency component and the low-frequency component.

The low-frequency component is expressed by a low-resolution image having a reduced number of pixels. For example, where LD represents the input decoded image, LDl represents the low-frequency component of the image, and LDh represents the high-frequency component, the low-frequency component and the high-frequency component are generated according to the following equation (8).

[Mathematical Formula 8]

$$LDl_{m,n} = (\Sigma_{i=m\times 4}^{m\times 4+3} \Sigma_{j=n}^{n\times 4+3} \times 4^{n\times 4+3} LD_{i,j} + 8) >> 4$$

$$LDh_{m,n} = LD_{m,n} - LDl_{m>>2, n>>2} \qquad (8)$$

This method of separating the low-frequency component and the high-frequency component is merely an example, and the low-frequency component and the high-frequency component can be separated according to some other arithmetic expression. In the example shown in the equation (8), LDl is generated by assigning the average value of 4×4 pixels, and LDh is generated by enlarging LDl four times in vertical and horizontal directions according to the nearest neighbor method, and calculating the difference from LD.

In this example shown in the equation (8), the low-frequency component has a resolution that is ¼ of the resolution of the decoded image in the vertical direction and is ¼ of the resolution of the decoded image in the horizontal direction as described above, and the number of pixels is 1/16 of the number of pixels of the actual decoded image.

The band separation unit 401 supplies the generated low-frequency component of the decoded image to the pixel replacer 152 and the moving object region protector 154. The band separation unit 401 also supplies the generated high-frequency component of the decoded image to the band integration unit 402.

The low-frequency component of a processed image of the previous frame is accumulated in the frame buffer 155, and is input to the pixel replacer 152.

In the same manner as the pixel replacer 152 shown in FIG. 10 does, the pixel replacer 152 performs a pixel replacement process on the low-frequency component of the image supplied from the band separation unit 401. Specifically, the pixel replacer 152 performs initialization at the start of the process, and generates an image replacement pattern for the respective pixels of the image (low-frequency component) based on a replacement cycle that has been set from outside. Using the generated replacement pattern, the pixel replacer 152 performs a process of replacing the pixels of the processed image (low-frequency component) of the previous frame supplied from the frame buffer 155 with the pixels of the decoded image (low-frequency component) in a constant cycle. The pixel replacer 152 supplies the processed image (low-frequency component) to the moving object region protector 154.

The moving object region protector 154 performs a moving object region protection process on the processed image (low-frequency component) from the pixel replacer 152 in the same manner as the moving object region protector 154 shown in FIG. 10 does. That is, when the output image (low-frequency component) from the pixel replacer 152 differs from the low-frequency component from the band separation unit 401, the moving object region protector 154 corrects the output image (low-frequency component) from the pixel replacer 152.

Specifically, using a QP (quantization value) as a parameter from the parameter converter 151 and the DCT coefficients of the processed image (low-frequency component) from the pixel replacer 152, the moving object region protector 154 performs a clipping process on the DCT coefficients generated from the decoded image, or performs a coefficient limitation process.

The DCT coefficients on which the coefficient limitations have been put are then subjected to IDCT conversion and are reconstructed into an image, and are then output as a processed image (low-frequency component) to the band integration unit 402. The processed image (low-frequency component) from the moving object region protector 154 is to be used in the next frame; therefore, it is also supplied and accumulated into the frame buffer 155.

The band integration unit 402 generates an image with the same resolution as the resolution of the input decoded image by integrating bands, using the processed image (low-frequency component) supplied from the moving object region protector 154 and the high-frequency component of the decoded image supplied from the band separation unit 401.

Specifically, where LDh represents the high-frequency component, and NRl represents the low-frequency component output from the moving object region protector 154, for example, the image to be generated by enlarging NRl according to the nearest neighbor method and adding the enlarged NRl to the high-frequency component can be calculated according to the equation (9).

[Mathematical Formula 9]

$$Out_{m,n}=clip(LDh_{m,n}+NRl_{m>>2,n>>2},0,255) \quad (9)$$

In this case, the filter for enlarging the low-frequency component needs to be the same as the enlarging filter used on the low-frequency component of the image at the time of generation of the high-frequency component in the band separation process.

As described above, the band integration unit 402 generates an image by adding the high-frequency component and the enlarged low-frequency component, and rounding the result to an expressible bit precision, and supplies the generated image to the flat portion processing unit 403.

The flat portion processing unit 403 performs a smoothing process with a low-pass filter or the like on the flat portions in the image supplied from the band integration unit 402. Since the image generated through the process ending with procedure carried out by the band integration unit 402 might lack smoothness at flat portions, the flat portion processing unit 403 performs a smoothing process using a low-pass filter or the like on the flat portions.

Specifically, the flat portion processing unit 403 detects regions with certain flatness from an input image, for example, and performs a smoothing process on the regions detected from the input image in the image supplied from the band integration unit 402. After the smoothing process, dithering might be performed on the image as necessary. The flat portion processing unit 403 outputs the smoothed image as a processed image to the display control unit 55 (FIG. 2) in the next stage.

[Example of the Filtering Process]

Figure 39:
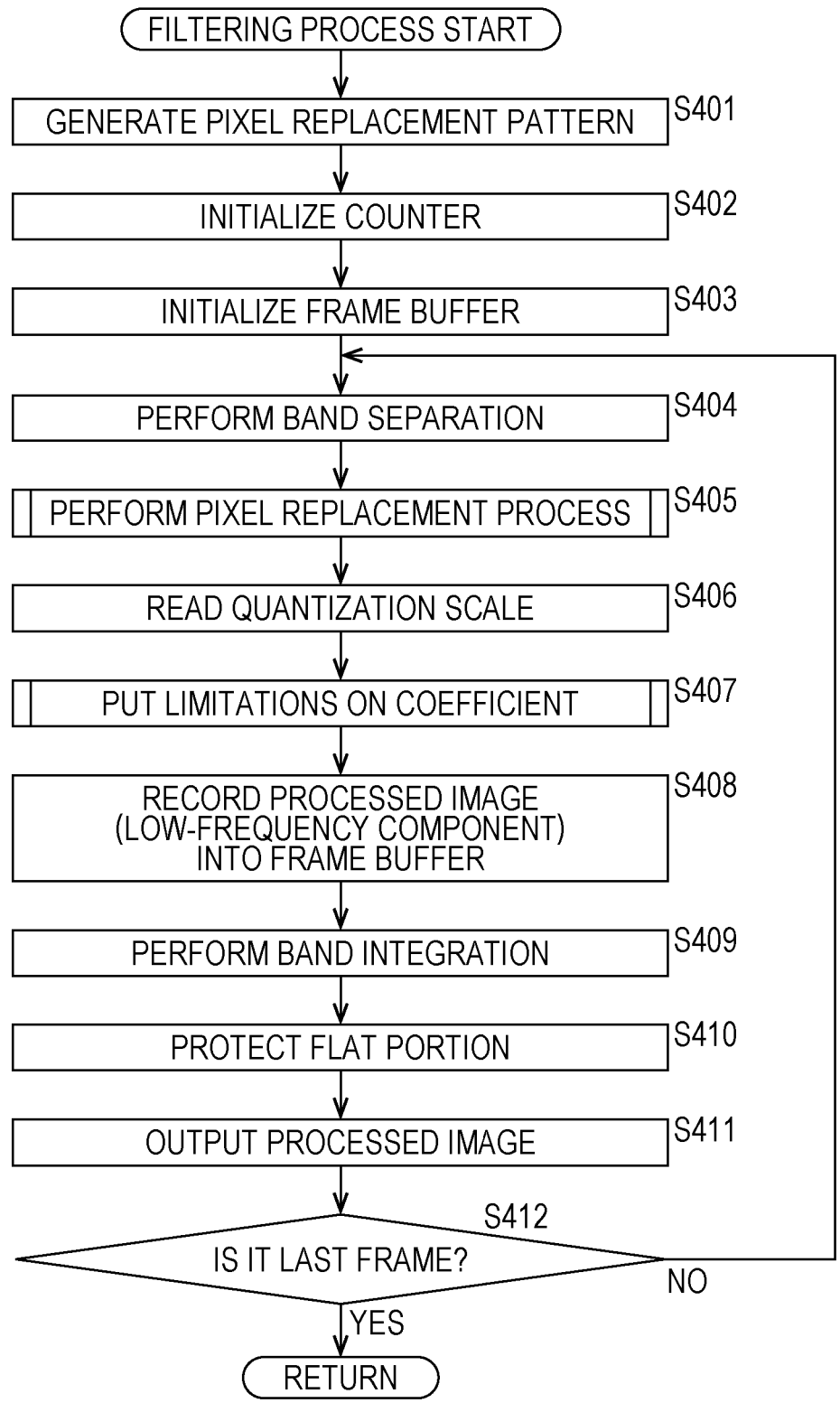
FIG. 39 is a flowchart for explaining a filtering process to be performed by the filtering unit shown in FIG. 38.

Referring now to the flowchart in FIG. 39, the filtering process in step S54 in FIG. 15 is described. This filtering process is another example of the filtering process described above with reference to FIG. 17.

A pixel replacement cycle is supplied from outside (not shown) to the replacement pattern generator 171 and the frame counter 173. In step S401, the replacement pattern generator 171 generates a pixel replacement pattern for the respective pixels of the image based on the replacement cycle that has been set from outside. The replacement pattern generator 171 records the generated pixel replacement pattern into the pixel replacement pattern recording buffer 172.

In step S402, the frame counter 173 performs initialization (a reset process) on the internal counter.

In step S403, the frame buffer 155 performs initialization by copying the pixel value of the low-frequency component of the initial frame of the decoded image, for example.

A decoded image from the decoding unit 53 is input to the band separation unit 401 and the flat portion processing unit 403. In step S404, the band separation unit 401 performs band separation on the input decoded image, and separates the image into the high-frequency component and the low-frequency component.

The band separation unit 401 supplies the generated low-frequency component of the decoded image to the pixel replacer 152 and the moving object region protector 154. The band separation unit 401 also supplies the generated high-frequency component of the decoded image to the band integration unit 402.

In step S405, the pixel selector 174 performs a pixel replacement process, using the low-frequency component of the image supplied from the band separation unit 401. This pixel replacement process is the same as the process described above with reference to FIG. 18, except that the current image is the low-frequency component of the image. Therefore, explanation thereof is not repeated herein. Through the procedure in step S405, a pixel-replaced image (low-frequency component) is output to the moving object region protector 154.

In step S406, the parameter converter 151 reads the quantization scale value from the encoding parameters supplied from the decoding unit 53. In accordance with the encoding type, the parameter converter 151 converts the input quantization scale value into the quantization value to be used by the moving object region protector 154 in a later stage to quantize DCT coefficients. The converted quantization value is supplied to the moving object region protector 154.

In step S407, the moving object region protector 154 puts limitations on coefficients, to protect moving object regions. This coefficient limitation process is the same as the process described above with reference to FIG. 19, except that the current image is the low-frequency component of the image. Therefore, explanation thereof is not repeated herein. The DCT coefficients on which coefficient limitations have been put through the procedure in step S407 are then subjected to IDCT conversion, and an image is reconstructed. The moving object region protector 154 outputs the reconstructed processed image (low-frequency component) to the band integration unit 402.

In step S408, the moving object region protector 154 records the processed image (low-frequency component) to the frame buffer 155.

In step S409, the band integration unit 402 performs band integration. Specifically, the band integration unit 402 generates an image with the same resolution as the resolution of the input decoded image by integrating bands, using the processed image (low-frequency component) supplied from the moving object region protector 154 and the high-frequency component of the decoded image supplied from the band separation unit 401. After that, the band integration unit 402 generates an image by adding the high-frequency component and the enlarged low-frequency component, and rounding the result to an expressible bit precision, and supplies the generated image to the flat portion processing unit 403.

In step S410, the flat portion processing unit 403 performs flat portion protection. Specifically, the flat portion processing unit 403 performs a smoothing process with a low-pass filter or the like on the flat portions in the image supplied from the band integration unit 402. In step S411, the flat portion processing unit 403 outputs the processed image subjected to the flat portion protection, to the display control unit 55 in the next stage.

In step S412, the pixel replacer 152 determines whether the frame being currently processed is the last frame. If the frame being currently processed is determined not to be the last frame in step S412, the process returns to step S404, and the procedures thereafter are repeated.

If the frame being currently processed is determined to be the last frame in step S412, the filtering process shown in FIG. 39 is ended, and the process returns to step S54 in FIG. 15 and then moves on to step S55.

As described above, according to the present technique, heartbeat noise concentrates mainly in the low-frequency component in an image; therefore, processing is performed with the low-frequency component of the image. As a result, the low-frequency component of the previous frame is accumulated in the frame buffer 115 as a storage unit.

Accordingly, with the present technique, the data accumulation in the storage unit (DRAM) and the cost accompanying data access can be reduced while the same performance as that in a case where an image not subjected to band separation is processed is maintained.

Also, as processing is performed on the low-frequency component (reduced image) of an image, the processing load accompanying pixel value replacement can be made smaller than that in a case where processing is performed on an image not subjected to band separation.

Sixth Embodiment

[Example Structure of a Computer]

The above described series of processes can be performed by hardware, and can also be performed by software. When the series of processes are to be performed by software, the program that forms the software is installed into a computer. Here, the computer may be a computer incorporated into special-purpose hardware, or may be a general-purpose personal computer that can execute various kinds of functions as various kinds of programs are installed thereinto.

Figure 40:
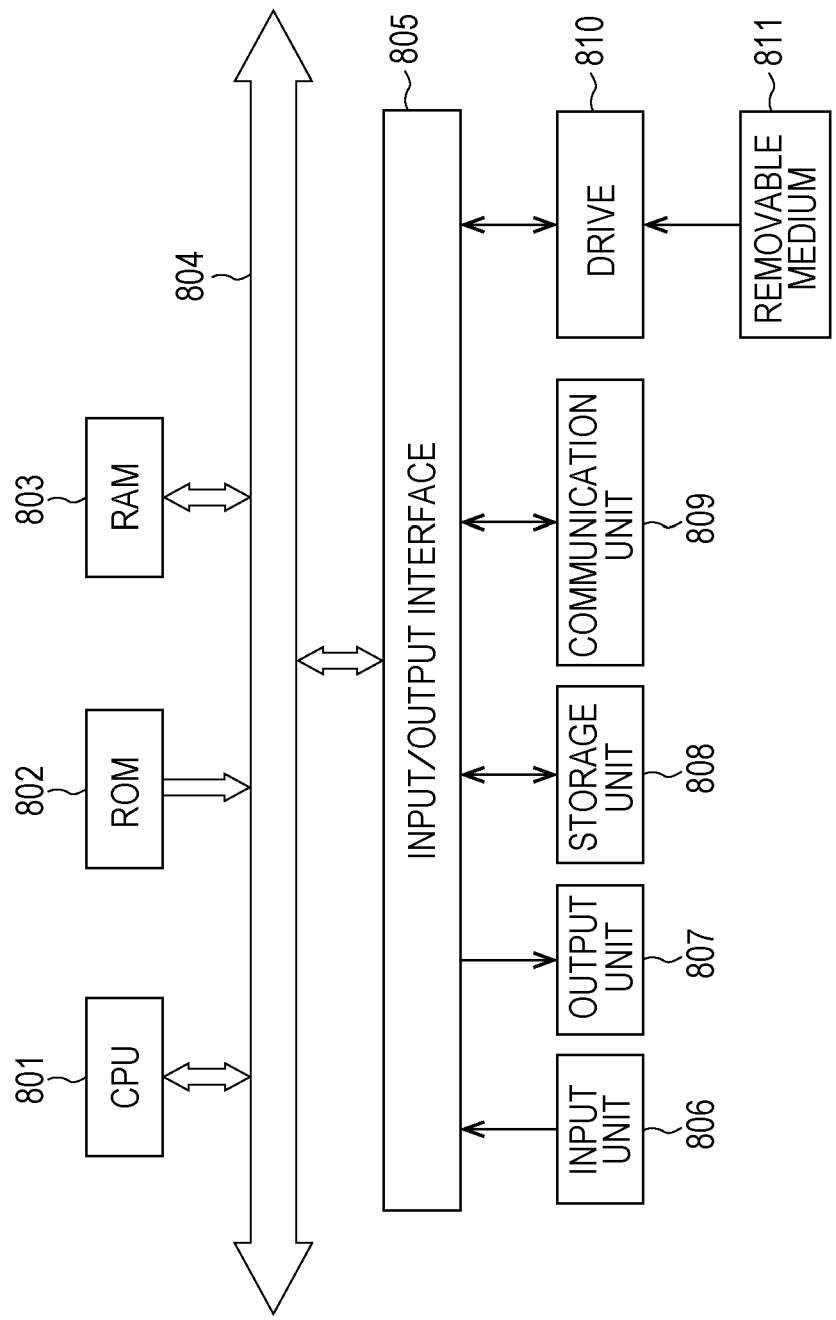
FIG. 40 is a block diagram showing a typical example structure of a computer.

FIG. 40 is a block diagram showing an example structure of the hardware of a computer that performs the above described series of processes in accordance with a program.

In the computer 800, a CPU (Central Processing Unit) 801, a ROM (Read Only Memory) 802, and a RAM (Random Access Memory) 803 are connected to one another by a bus 804.

An input/output interface 805 is further connected to the bus 804. An input unit 806, an output unit 807, a storage unit 808, a communication unit 809, and a drive 810 are connected to the input/output interface 805.

The input unit 806 is formed with a keyboard, a mouse, a microphone, and the like. The output unit 807 is formed with a display, a speaker, and the like. The storage unit 808 is formed with a hard disk, a nonvolatile memory, or the like. The communication unit 809 is formed with a network interface or the like. The drive 810 drives a removable medium 811 such as a magnetic disk, an optical disk, a magnetooptical disk, or a semiconductor memory.

In the computer having the above described structure, the CPU 801 loads a program stored in the storage unit 808 into the RAM 803 via the input/output interface 805 and the bus 804, for example, and executes the program, so that the above described series of processes are performed.

The program to be executed by the computer 800 (the CPU 801) may be recorded on the removable medium 811 as a package medium to be provided, for example. Alternatively, the program can be provided via a wired or wireless transmission medium such as a local area network, the Internet, or digital satellite broadcasting.

In the computer, the program can be installed into the storage unit 808 via the input/output interface 805 when the removable medium 811 is mounted on the drive 810. The program can also be received by the communication unit 809 via a wired or wireless transmission medium, and be installed into the storage unit 808. Alternatively, the program may be installed beforehand into the ROM 802 or the storage unit 808.

The program to be executed by the computer may be a program for performing processes in chronological order in accordance with the sequence described in this specification, or may be a program for performing processes in parallel or performing a process when necessary, such as when there is a call.

In this specification, steps describing the program to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the function of the system as a whole are substantially the same. That is, the present technique is not limited to the embodiments described above, but various modifications may be made thereto without departing from the scope of the technique.

It should be noted that embodiments of the present technique are not limited to the above described embodiments, and various modifications may be made to them without departing from the scope of the present technique.

For example, the display control unit 55 and the display unit 56 shown in FIG. 2 may be placed outside the decoding device 50.

The present technique can also be embodied in a cloud computing structure in which one function is shared among devices via a network, and processing is performed by the devices cooperating with one another, for example.

The respective steps described with reference to the above described flowcharts can be carried out by one device or can be shared among devices.

In a case where more than one process is included in one step, the processes included in the step can be performed by one device or can be shared among devices.

In this specification, examples in which various information pieces such as pixel replacement pattern information are multiplexed with an encoded stream and are transmitted from the encoding side to the decoding side have been described. However, the method of transmitting the information is not limited to the above examples. For example, the information pieces may be transmitted or recorded as separate data associated with an encoded bit stream, without being multiplexed with the encoded bit stream. Note that the term "associate" means to allow images (which may be part of images such as slices or blocks) contained in a bit stream to be linked to the information corresponding to the images at the time of decoding. That is, the information may be transmitted via a transmission path different from that for the images (or the bit stream). Alternatively, the information may be recorded in a recording medium (or in a different area in the same recording medium) other than the recording medium for the images (or the bit stream). Furthermore, the information and the images (or the bit stream) may be associated with each other in any units such as in units of some frames, one frame or part of a frame.

While preferred embodiments of the present disclosure have been described above with reference to the accompanying drawings, the present disclosure is not limited to those examples. It is apparent that those who have ordinary skills in the art can make various changes or modifications within the scope of the technical spirit claimed herein, and it should be understood that those changes or modifications are within the technical scope of the present disclosure.

The present technique can also be in the following forms.

(1) An image processing device including:
 a decoding unit that generates an image by performing a decoding process on a bit stream; and
 a replacement unit that replaces pixels of the image generated by the decoding unit, using a replacement pattern indicating a pixel value variation distribution.

(2) The image processing device of (1), wherein the replacement pattern is randomly generated.

(3) The image processing device of (1) or (2), wherein the cycle of the replacement pattern is determined based on an intraframe appearance cycle.

(4) The image processing device of any of (1) through (3), further including
 a coefficient limitation unit that performs a clipping process on a coefficient obtained through frequency transform performed on the image having pixels replaced by the replacement unit, using a coefficient obtained through frequency transform performed on the image generated by the decoding unit and a quantization parameter obtained from the bit stream, the coefficient limitation unit reconstructing an image from the coefficient subjected to the clipping process.

(5) The image processing device of (4), further including
 a noise addition unit that adds noise to the image having pixels replaced by the replacement unit,
 wherein the coefficient limitation unit performs the clipping process on a coefficient obtained through frequency transform performed on the image having the noise added thereto by the noise addition unit, using the coefficient obtained through the frequency transform performed on the image generated by the decoding unit and the quantization parameter obtained from the bit stream.

(6) The image processing device of (4), further including:
 a feature quantity detection unit that detects a feature quantity from the image generated by the decoding unit; and
 a parameter adjustment unit that adjusts the value of the quantization parameter obtained from the bit stream, using the feature quantity detected by the feature quantity detection unit and an encoding parameter obtained from the bit stream,
 wherein the coefficient limitation unit performs the clipping process on the coefficient obtained through the frequency transform performed on the image having pixels replaced by the replacement unit, using the coefficient obtained through the frequency transform performed on the image generated by the decoding unit and the quantization parameter having the value adjusted by the parameter adjustment unit, the coefficient limitation unit reconstructing an image from the coefficient subjected to the clipping process.

(7) The image processing device of (4), further including:
a parameter adjustment unit that adjusts the value of the quantization parameter obtained from the bit stream, in accordance with a user operation,
wherein the coefficient limitation unit performs the clipping process on the coefficient obtained through the frequency transform performed on the image having pixels replaced by the replacement unit, using the coefficient obtained through the frequency transform performed on the image generated by the decoding unit and the quantization parameter having the value adjusted by the parameter adjustment unit, the coefficient limitation unit reconstructing an image from the coefficient subjected to the clipping process.

(8) The image processing device of (4), further including a storage unit that stores a previous frame image reconstructed by the coefficient limitation unit,
wherein the replacement unit replaces pixels of the previous frame image stored in the storage unit with pixels of the image generated by the decoding unit, using the replacement pattern.

(9) The image processing device of (8), further including:
a band separation unit that separates the image generated by the decoding unit into a low-frequency image and a high-frequency image; and
a band integration unit that integrates the low-frequency image and the high-frequency image separated by the band separation unit,
wherein
the storage unit stores a previous frame low-frequency image reconstructed by the coefficient limitation unit,
the replacement unit replaces pixels of the previous frame low-frequency image stored in the storage unit with pixels of the low-frequency image separated by the band separation unit, using the replacement pattern,
the clipping process is performed on a coefficient obtained through frequency transform performed on the low-frequency image having pixels replaced by the replacement unit, using a coefficient obtained through frequency transform performed on the low-frequency image separated by the band separation unit and the quantization parameter obtained from the bit stream, and the low-frequency image being reconstructed from the coefficient subjected to the clipping process, and
the band integration unit integrates the low-frequency image reconstructed by the coefficient limitation unit and the high-frequency image.

(10) The image processing device of (9), further including a flat portion processing unit that performs a smoothing process on a flat portion in the image integrated by the band integration unit.

(11) The image processing device of any of (1) through (10), further including
a replacement pattern generation unit that generates the replacement pattern,
wherein the replacement unit replaces pixels of the image generated by the decoding unit, using the replacement pattern generated by the replacement pattern generation unit.

(12) The image processing device of any of (1) through (10), further including
a reception unit that receives the bit stream and the replacement pattern,
wherein
the decoding unit generates an image by performing the decoding process on the bit stream received by the reception unit, and
the replacement unit replaces pixels of the image generated by the decoding unit, using the replacement pattern received by the reception unit.

(13) An image processing method implemented in an image processing device,
the image processing method including:
generating an image by performing a decoding process on a bit stream; and
replacing pixels of the generated image, using a replacement pattern indicating a pixel value variation distribution.

(14) An image processing device including:
a setting unit that sets a replacement pattern indicating a pixel value variation distribution, the replacement pattern being to be used in replacing pixels of an image generated through a decoding process performed on a bit stream;
an encoding unit that generates the bit stream by performing an encoding process on an image; and
a transmission unit that transmits the bit stream generated by the encoding unit and the replacement pattern set by the setting unit.

(15) An image processing method implemented in an image processing device,
the image processing method including:
setting a replacement pattern indicating a pixel value variation distribution, the replacement pattern being to be used in replacing pixels of an image generated through a decoding process performed on a bit stream;
generating the bit stream by performing an encoding process on an image; and
transmitting the generated bit stream and the set replacement pattern.

REFERENCE SIGNS LIST

50 Decoding device
51 Reception unit
52 Extraction unit
53 Decoding unit
54 Filtering unit
55 Display control unit
56 Display unit
151 Parameter converter
152 Pixel replacer
153 Noise adder
154 Moving object region protector
155 Frame buffer
161 Quantization scale extraction unit
162 Selector
163 MPEG-2 Qp quantization value converter
164 AVC-Qp quantization value converter
165 HEVC quantization scale converter
171 Replacement pattern generator
172 Pixel replacement pattern recording buffer
173 Frame counter
174 Pixel selector
181 Noise generator
182 Addition unit
191
192 DCT converter
193 Coefficient limiter
194 IDCT converter
201 Parameter converter
202 Image feature quantity detector
203 Adjustment value selector
221 Encoding parameter extractor 222 Selector
223 MPEG-2 parameter converter
224 AVC parameter converter
225 HEVC parameter converter
231-1, 231-2 Block feature quantity detector
232 Inter-pixel feature quantity detector
233 Feature selector
241 Quantization value adjuster
242 Quantization value converter
301 Encoding device
302 Setting unit
303 Encoding unit
304 Transmission unit
351 Filtering unit
361 Pixel replacer
371 Replacement pattern reception unit
401 Band separation unit
402 Band integration unit
403 Flat portion processing unit

The invention claimed is:

1. An image processing device, comprising:
one or more processors and one or more memories configured to:
decode a bit stream to generate a first image;
replace a pixel of the first image based on a replacement pattern that indicates a pixel value variation distribution;
clip a first coefficient by a clipping process, wherein the first coefficient is obtained by frequency transform on the first image having the pixel replaced, wherein the clipping process is based on a second coefficient and a quantization parameter obtained from the bit stream, and wherein the second coefficient is obtained by the frequency transform on the first image; and
reconstruct a second image from the first coefficient subjected to the clipping process.

2. The image processing device according to claim 1, wherein the replacement pattern is randomly generated.

3. The image processing device according to claim 1, wherein a cycle of the replacement pattern is determined based on an intraframe appearance cycle.

4. The image processing device according to claim 1, wherein the one or more processors are further configured to smooth a flat portion of an integrated image by a smoothing process.

5. The image processing device according to claim 1, wherein the one or more processors are further configured to generate the replacement pattern.

6. The image processing device according to claim 1, wherein the one or more processors are further configured to:
receive the bit stream and the replacement pattern;
generate the first image; and
replace the pixel of the first image based on the received replacement pattern.

7. An image processing method, comprising:
decoding a bit stream for generating a first image;
replacing a pixel of the generated first image based on a replacement pattern indicating a pixel value variation distribution;
clipping a first coefficient by a clipping process, wherein the first coefficient is obtained by frequency transform on the first image having the pixel replaced, wherein the clipping process is based on a second coefficient and a quantization parameter obtained from the bit stream, and wherein the second coefficient is obtained by the frequency transform on the first image; and
reconstructing a second image from the first coefficient subjected to the clipping process.

8. An image processing device, comprising:
one or more processors and one or more memories configured to:
decode a bit stream to generate a first image;
set a replacement pattern that indicates a pixel value variation distribution, wherein the replacement pattern is used in replacement of a pixel of the first image;
generate the bit stream by an encoding process on the first image;
transmit the generated bit stream and the replacement pattern,
wherein a first coefficient is clipped by a clipping process, wherein the first coefficient is obtained frequency transform on the first image having the pixel replaced, wherein the clipping process is based on a second coefficient and a quantization parameter, and wherein the second coefficient is obtained by the frequency transform on the first image; and
reconstruct a second image from the first coefficient subjected to the clipping process.

9. An image processing method, comprising:
in an image processing device:
decoding a bit stream to generate a first image;
setting a replacement pattern indicating a pixel value variation distribution, wherein the replacement pattern is used in replacing the pixel of the first image;
generating the bit stream by an encoding process on the first image; and
transmitting the generated bit stream and the replacement pattern,
wherein the decoding of the bit stream comprising clipping a first coefficient by a clipping process, wherein the first coefficient is obtained by frequency transform on the first image having the pixel replaced, wherein the clipping process is based on a second coefficient and a quantization parameter, and wherein the second coefficient is obtained by the frequency transform on the first image; and
reconstructing a second image from the first coefficient subjected to the clipping process.

* * * * *